(12) United States Patent      (10) Patent No.:    US 12,615,010 B2

Cramer      (45) Date of Patent:     Apr. 28, 2026

(54) SYSTEM AND METHOD OF AMPLIFYING SOLAR PANEL OUTPUT

(71) Applicant: Hyperstealth Biotechnology Corporation, Maple Ridge (CA)

(72) Inventor: Guy Cramer, Maple Ridge (CA)

(73) Assignee: Hyperstealth Biotechnology Corporation

( * ) Notice: Subject to any disclaimer, the term of this patent is extended or adjusted under 35 U.S.C. 154(b) by 6 days.

(21) Appl. No.: 18/426,008

(22) Filed: Jan. 29, 2024

(65) Prior Publication Data

US 2024/0291426 A1     Aug. 29, 2024

Related U.S. Application Data

(62) Division of application No. 16/957,012, filed as application No. PCT/CA2018/000242 on Dec. 21, 2018, now Pat. No. 11,894,803.

(60) Provisional application No. 62/609,425, filed on Dec. 22, 2017.

(51) Int. Cl.
    *H02S 40/22*        (2014.01)
    *G02B 5/18*        (2006.01)

(52) U.S. Cl.
    CPC ............ *H02S 40/22* (2014.12); *G02B 5/1814* (2013.01)

(58) Field of Classification Search
    CPC ............. H10F 77/30–496; H02S 20/10; H02S 40/20–22
    USPC ................................................. 136/243–265
    See application file for complete search history.

(56) References Cited

U.S. PATENT DOCUMENTS

| | | | |
|---|---|---|---|
| 2012/0234668 A1* | 9/2012 | King .................... | F24S 10/73 |
| | | | 422/186 |
| 2013/0027949 A1* | 1/2013 | Hsieh .................... | G02B 3/08 |
| | | | 362/327 |

* cited by examiner

*Primary Examiner* — Bach T Dinh
(74) *Attorney, Agent, or Firm* — McMillan LLP

(57) ABSTRACT

A method and system of amplifying output power produced by a solar panel having a shadow cast upon a portion of a surface thereof are presented. The system and method utilize refractive-reflective sheets such as lenticular sheet, and/or diffraction grating sheets to diffuse sunlight to illuminate the shadow and thus amplify the output power of the solar panel. Alternatively, when no shadow is cast upon the panel, the sheets reflect additional sunlight onto the panel increasing its output power. The sheets may be used to refract, reflect, or both refract and reflect sunlight onto the panel. The sheets may be used in combination with bright or reflective panels to reflect additional sunlight onto said panels to further amplify the output. The system and method are applicable to various types of solar panels such as thin film, microcrystalline and polycrystalline solar panels as well as solar roof tiles or other solar radiation collectors.

4 Claims, 49 Drawing Sheets

SYSTEM AND METHOD OF AMPLIFYING SOLAR PANEL OUTPUT

RELATED APPLICATIONS

This application is a divisional of U.S. Ser. No. 16/957,012 with a 371(c) date of Dec. 21, 2021, which was a national entry of PCT application PCT/CA2018/000242 with international filing date of Dec. 21, 2021, which in turn claims priority from U.S. Provisional Application No. 62/609,425, filed on Dec. 22, 2017, and the contents of all such applications are herein incorporated in their entirety by reference.

FIELD OF THE INVENTION

The present invention relates generally to solar power generation, and more specifically to a system and method of amplifying a solar panel output.

BACKGROUND OF THE INVENTION

A solar cell, or photovoltaic cell, is an electric device that converts the energy of light directly into electricity by the photovoltaic effect, which is a physical and chemical phenomenon. A solar cell is a form of photoelectric cell, a device whose electrical characteristics such as voltage, current, or resistance vary when exposed to light. A thin-film solar cell is a second generation solar cell that is made by depositing one or more thin layers or thin film of photovoltaic material on a substrate, such as glass, plastic or metal. Thin-film technology is cheaper but less efficient than conventional crystalline silicon solar cells.

Solar panels absorb the sunlight as a source of energy to generate electricity or heat. A photovoltaic module is a packaged, connected assembly of photovoltaic solar cells. Most photovoltaic modules use crystalline silicon solar cells or thin-film cells. Photovoltaic modules are typically rated by their direct current (DC) output power.

A problem arises with solar panels wherein a shadow that obscures even a portion of the surface of the panel may reduce power output by up to 90%. Another problem with solar panels is that in cities with less sun exposure, and low solar energy due to being away from the equator, solar panels are costly and the energy produced is insufficient to practically recoup the cost of the panels within a reasonable time frame.

A lenticular sheet is a translucent plastic sheet, made by distinctive and precise extrusion with slope and curve on its sheet with a series of vertically aligned, plano-convex, cylindrical lenses called lenticules on one side and a flat surface on the other side. The lenticules help transform a 2D image into a variety of visual illusions wherein a viewer may see lenticular special effects when the orientation of a lenticular sheet is changed. A lenticular sheet may be made from: acrylic, APET, PETG, polycarbonate, polypropylene, PVC or polystyrene. Each of those different materials has a different level of sensitivity to temperature and UV light.

An important characteristic of a lenticular sheet is the density of lenses. The density of lenses is expressed as a lens-per-inch (LPI). The thickness of a lenticular sheet is reversely correlated to the LPI; the lower the LPI the thicker the lenticular sheet is. Another important characteristic of a lenticular sheet is the viewing angle. The viewing angle of a lenticular sheet is a v-shaped region within which lenticular images may be viewed clearly. Other characteristics of lenticular sheets can be found on the website lenticular-sheets.lpceurope.eu, the contents of which are herein incorporated in their entirety by reference. Printing on lenticular sheets may be done via Inkjet printers, in an interlaced manner, as described in the article "Choosing the Right Lenticular Sheet for Inkjet Printer" by CG Sheng, published on the domain ViCGI.com, and the contents of which are herein incorporated in their entirety by reference. Lenticular sheets may also be used to display stereoscopic images as described in the article "History of Lenticular and Related Autostereoscopic Methods" by David E. Roberts as published on the domain outeraspect.com, and the contents of which are herein incorporated in their entirety by reference.

Integral imaging is a true auto-stereo method (stereo imagery viewable without the requirement of special glasses). An integral image consists of a tremendous number closely packed distinct micro-images that are viewed by an observer through an array of spherical convex lenses, one lens for every micro-image. This special type of lens array is known as a fly's-eye or integral lens array, described in detail in "The History of Integral Print Methods" on the site lenticulartechnology.com, the contents of which are herein incorporated in their entirety by reference. Fly's eye lens sheets are commercially available such as those available at lenticular.mobi, the contents of which are herein incorporated in their entirety by reference.

Prism film, such as EverRay® LC, DCS, BK, LF made by Kolon Industries and shown at kolonindustries.com condenses light from a light source, such as LCD BLU, by forming fine prism structures on a polyester film. Similarly, linear prism sheets such as those made by Ingemann and shown at ingemanncomponents.com impresses by its optimized ability to de-glare lamps on both main axis.

In the paper "Geometric optics analysis on light transmission and reflection characteristics of metallic prism sheets" by Hwi Kim and Byoungho Lee (*Opt. Eng.* 45(8), 084004 (Aug. 22, 2006). doi:10.1117/1.2335871), the contents of which are herein incorporated in their entirety by reference, light transmission and reflection characteristics of metallic prism sheets are investigated based on a geometric optics approach. An analytic method is presented for finding the radiant intensity profiles of light transmitted through and reflected by a single metallic prism sheet for an incident light with arbitrary radiant intensity profile. With a simple interaction model between adjacent prism sheets, the analysis method for a single prism sheet is generalized for analyzing prism sheet layers composed of several prism sheets. Light transmission and reflection characteristics of a single prism sheet and prism sheet layers are compared. It is seen that the metallic prism sheet can be appropriately applicable to transflective devices or brightness enhancement film for liquid crystal displays.

The paper "High-quality integral videography using a multiprojector" by Hongen Liao, Makoto Iwahara, Nobuhiko Hata, and Takeyoshi Dohi (Optics Express Vol. 12, Issue 6, pp. 1067-1076 (2004), the contents of which are herein incorporated in their entirety by reference, discloses the use of a micro lens array for integral videography.

The article "Ray-optical negative refraction and pseudoscopic imaging with Dove-prism arrays" by Johannes Courtial and John Nelson, available at iopscience.iop.org and the contents of which are herein incorporated in their entirety by reference, shows that a sheet consisting of an array of small, aligned Dove prisms can locally (on the scale of the width of the prisms) invert one component of the ray direction.

In the article "FLAT-PANEL DISPLAYS: Wavy prism sheet makes LCDs look better", dated Sep. 1, 2007 and available on laserfocusworld.com, the contents of each of which is herein incorporated by reference in its entirety, the use of Wavy prism sheet to make LCDs look better is discussed.

U.S. Pat. No. 4,414,316 to Conley, the contents of which are herein incorporated in their entirety by reference, discloses a flexible, composite transparent lenticular screen sheet suitable for use in producing three-dimensional optical effects and characterized by having a uniform overall thickness and having lenticular formations of uniform fine definition and quality. The lenticular formations have a uniform focal length precisely correlated with the overall thickness of the composite sheet to provide uniform high quality three-dimensional optical effects throughout the lenticular screen sheet.

U.S. Pat. No. 6,995,914 to Conley et al, the contents of which are herein incorporated in their entirety by reference, discloses methods of producing a lenticular sheet having anisotropic optical properties.

U.S. Pat. No. 7,731,813 to Raymond et al, the contents of which are herein incorporated in their entirety by reference, discloses a method for fabricating a device for displaying an interlaced image. The method includes providing a film of transparent material and creating a lens array in the firm by forming parallel lens sets on a first side of the film, and then bonding an interlaced image including sets of elongate image elements to a second side of the film.

U.S. Pat. No. 8,411,363 to Niemuth, the contents of which are herein incorporated in their entirety by reference, discloses a lenticular sheet including a first surface having at least two portions, an opposing second surface, and a plurality of lenticular lenses formed in the first surface. Each portion of the first surface includes a number of lenticular lenses per centimeter that is different from the number of lenticular lenses per centimeter of an adjacent portion of the first surface.

U.S. Patent Publication number 2004/0136079 and U.S. Patent Publication Number 2005/0286134 to Goggins, the contents of each of which are herein incorporated in their entirety by reference, discloses a lenticular lens and method for manufacturing the lens, and in particular when the lens is a lenticular lens web, such that finishing operations and various end-use applications of the lens can be achieved or accommodated in-line with the manufacture of the lens web.

A diffraction grating is a plate of glass, plastic or metal ruled with very close parallel lines, producing a spectrum by diffraction and interference of light. It is an optical component with a periodic structure that splits and diffracts light into several beams travelling in different directions. The emerging coloration is a form of structural coloration. The directions of the beams depend on the spacing of the grating and the wavelength of the light so that the grating acts as the dispersive element. Holographic diffraction gratings are highly efficient embossed Holographic Optical Elements (HOE). Diffraction gratings are used for the direct viewing and analysis of spectra from different gas tubes and other light sources.

The invention attempts to utilize: refractive-reflective structures, such as lenticular sheets or cylinders; reflective panels such as mirrors; and diffraction grating sheets to solve at least some of the aforementioned problems identified with solar panels.

SUMMARY OF THE INVENTION

According to one aspect of the present invention, there is provided a system for amplifying a solar panel's output, comprising: a solar panel having a light receiving surface and a frame having an upper edge and a lower edge; and a first refractive-reflective sheet having: a first side including a plurality of refracting elements, and a second side. The first refractive-reflective sheet is disposed to the front of and near said lower edge for reflecting sunlight onto said light receiving surface of said solar panel thus amplifying said output.

In one embodiment the second side of the first refractive-reflective sheet also has a plurality of refracting elements.

The first refractive-reflective sheet may be one of: a lenticular sheet, a linear prism sheet, an array prism sheet, and an array prism sheet comprising a plurality of spherical lenses.

In one embodiment, the first refractive-reflective sheet comprises a lenticular sheet, and wherein said plurality of refracting elements comprise a plurality of linear lenticular lenses.

The solar panel may be a thin film solar panel, a polycrystalline solar panel, or a monocrystalline silicon solar cell.

In one embodiment, the first refractive reflective sheet is disposed such that the plurality of linear lenticular lenses run in a direction perpendicular to said light receiving surface of said solar panel.

In one embodiment, the system further comprises a second refractive-reflective sheet similar to said first refractive-reflective sheet and disposed adjacent thereto for reflecting additional sunlight onto said light receiving surface of said solar panel thus further amplifying said output.

In one embodiment, the system for amplifying a solar panel's output further comprises a second refractive-reflective sheet disposed on top of said first refractive-reflective sheet for reflecting additional sunlight onto said light receiving surface of said solar panel thus further amplifying said output.

In one embodiment, the system for amplifying a solar panel's output further comprises a second refractive-reflective sheet similar to said first refractive-reflective sheet disposed generally above said top edge of said solar panel and oriented for reflecting additional sunlight onto said light receiving surface of said solar panel thus further amplifying said output.

In one embodiment, the system for amplifying a solar panel's output further comprises an upstanding refractive-reflective sheet positioned to the front of said solar panel and oriented such that sunlight: passes through the refractive-reflective sheet, and diffuses by action of said refracting elements to fall onto said surface of said solar panel thus illuminating a shadow on said light receiving surface of said solar panel and further amplifying said output that was reduced as a result of said shadow.

In one embodiment, the upstanding refractive-reflective sheet is coated with an antireflection coating or comprises an antireflection film for allowing more sunlight to pass therethrough.

In one embodiment, the second side of the first refractive-reflective sheet has a smooth surface coated with a color or a reflective medium for reflecting additional sunlight onto said light receiving surface of said solar panel thus further amplifying said output.

In one embodiment, the system for amplifying a solar panel's output further comprises a reflective panel disposed under said first refractive-reflective sheet for reflecting additional sunlight onto said light receiving surface of said solar panel for further amplifying said output while also preventing burning of said solar panel.

In one embodiment, the system for amplifying a solar panel's output further comprises a reflective panel disposed under said first refractive-reflective sheet for reflecting additional sunlight onto said light receiving surface of said solar panel for further amplifying said output while also preventing burning of said solar panel.

In one embodiment, said reflective panel comprises a panel having a bright colored surface, or a mirror.

In one embodiment, the system for amplifying a solar panel's output further comprises a first curved supporting surface disposed under said first refractive-reflective sheet.

In one embodiment, the system for amplifying a solar panel's output further comprises a first and a second curved supporting surface disposed under said first refractive-reflective sheet and said second refractive-reflective sheet, respectively.

In one embodiment, the system for amplifying a solar panel's output further comprises a transparent curved supporting surface disposed above the reflective panel and supporting the first refractive-reflective sheet.

In one embodiment, the system for amplifying a solar panel's output further comprises a right and a left upstanding refractive-reflective sheets positioned to the right and the left of said solar panel and oriented for reflecting additional sunlight onto said light receiving surface of said solar panel for further amplifying said output.

In one embodiment, the system for amplifying a solar panel's output further comprises a right and a left upstanding reflective panels positioned to the right and the left of said solar panel and oriented for reflecting additional sunlight onto said light receiving surface of said solar panel for further amplifying said output.

In one embodiment, the system for amplifying a solar panel's output further comprises a top, a left, and a right reflective panels disposed around said solar panel and oriented for reflecting additional sunlight onto said light receiving surface of said solar panel thus further amplifying said output.

In one embodiment, the system for amplifying a solar panel's output further comprises: a right and a left upstanding reflective panels positioned to the right and the left of said solar panel and oriented for reflecting additional sunlight onto said light receiving surface of said solar panel; a right and a left upstanding refractive-reflective sheets positioned on said right and left upstanding reflective panels, respectively for diffusing said additional sunlight onto said light receiving surface of said solar panel for further amplifying said output while also preventing burning of the solar panel.

In one embodiment, the system for amplifying a solar panel's further comprises: a right and a left upstanding refractive-reflective sheets positioned on said right and left upstanding reflective panels, respectively for diffusing said additional sunlight onto said light receiving surface of said solar panel for further amplifying said output while also preventing burning of the solar panel; and a top reflective panel, top curved supporting surface positioned below said top reflective panel, and a top refractive-reflective sheet positioned below said top supporting curved surface. Said top reflective panel, said top refractive-reflective sheet, and said top curved supporting surface are all stacked together and oriented for reflecting additional sunlight onto said light receiving surface of said solar panel for further amplifying said output while also preventing burning of the solar panel.

In one embodiment, the system for amplifying a solar panel's output further comprises at least one side strip of reflective material covered with a side strip of refractive-reflective material and oriented to reflect additional sunlight on said light receiving surface of said solar panel thus further amplifying said output while also preventing burning of the solar panel.

In one embodiment, the system for amplifying a solar panel's output further comprises a diffraction grating sheet disposed on top of said refractive-reflective sheet for diffusing reflected sunlight onto said light receiving surface of said solar panel thus further amplifying said output while also preventing burning of the solar panel.

In another aspect of the present invention, there is provided a system for amplifying a solar panel's output, comprising: a solar panel having a light receiving surface and a frame having an upper edge and a lower edge; and at least one refractive-reflective cylinder having: an outer lateral surface including a plurality of refracting elements, and an inner surface. Said at least one refractive-reflective cylinder is disposed to the front of and near said lower edge for reflecting sunlight onto said light receiving surface of said solar panel thus amplifying said output.

In one embodiment, at least one of said outer and inner surfaces of said at least one refractive-reflective cylinder is coated with a reflective material for reflecting additional sunlight onto said light receiving surface of said solar panel thus further amplifying said output.

In one embodiment, the system for amplifying a solar panel's output further comprises a reflective cylinder having a reflective lateral outer surface disposed inside said at least one refractive-reflective cylinder for reflecting additional sunlight onto said light receiving surface of said solar panel thus further amplifying said output.

In yet another aspect of the present invention, there is provided a system for amplifying a solar panel's output, comprising: a solar panel having a light receiving surface and a frame having an upper edge and a lower edge; a bottom, a right, and a left reflective panels oriented for reflecting additional sunlight on said light receiving surface of said solar panel thus amplifying said output; and a refractive-reflective sheet positioned to the front of said light receiving surface for diffusing reflected sunlight from said bottom, right, and left reflective panels for preventing burning of said solar panel.

In one embodiment, the system for amplifying a solar panel's output further comprises a top reflective panel oriented for reflecting additional sunlight on said light receiving surface of said solar panel thus further amplifying said output.

In yet another aspect of the present invention, there is provided a system for amplifying a solar panel's output, comprising: a solar panel having a light receiving surface and a frame having an upper edge and a lower edge; and a diffraction grating sheet for reflecting and diffusing sunlight onto said light receiving surface of said solar panel thus amplifying said output.

In one embodiment, the system for amplifying a solar panel's output according further comprises a reflective panel disposed under said diffraction grating sheet for reflecting additional sunlight onto said light receiving surface of said solar panel thus amplifying the output power produced by the solar panel. In another embodiment, the bottom side of said diffraction grating is coated with a reflective material for reflecting additional sunlight onto said light receiving surface of said solar panel thus amplifying said output power produced by said solar panel . . . .

According to yet another aspect of the present invention, there is provided a method of amplifying power produced by a solar panel having a shadow cast upon a portion of a surface thereof, the method comprising placing a refractive-reflective sheet having a first side and a second side, in proximity to and generally to the front of the solar panel such that sunlight strikes one of the first side and second side of the sheet and reflects onto the surface of the solar panel. The refractive-reflective sheet diffuses the reflected sunlight across the surface of the solar panel thus illuminating the shadow on the surface of the solar panel causing it to be less dark and accordingly amplifying the output power produced by the solar panel.

In one embodiment, the first side has a plurality of refracting elements and the second side comprises a smooth surface. In another embodiment, the first side and the second side each has a plurality of refracting elements.

In one embodiment, placing the refractive-reflective sheet comprises placing the first side having the plurality of refracting elements facing up such that sunlight strikes the first side and reflects onto the surface of the solar panel. The method may include coating the smooth surface of the second side of the refractive-reflective sheet with a color, or with a reflective medium.

In another embodiment, placing the refractive-reflective sheet comprises placing the second side having the smooth surface facing up such that sunlight strikes the second side and reflects onto the surface of the solar panel.

In one embodiment, the refractive-reflective sheet is a lenticular sheet and the plurality of refracting elements comprises a plurality of lenticules. The plurality of lenticules may be linear or non-linear.

In another embodiment, the refractive-reflective sheet is a linear prism sheet.

In yet another embodiment, the refractive-reflective sheet is an array prism sheet. The array prism sheet may comprise a plurality of spherical lenses.

In one embodiment, the refractive-reflective sheet is placed on top of a reflective panel which reflects additional sunlight through the refractive-reflective sheet and onto the surface of the solar panel. The reflective panel may comprise a panel with bright colored surface or one with a reflective surface such as a mirror.

In one embodiment, the refractive-reflective sheet is rectangular and flat. In another embodiment, the refractive-reflective sheet is formed into a cylinder. In yet another embodiment, the refractive-reflective sheet forms a concave dish for directing sunlight from multiple angles towards the solar panel. In yet another embodiment, the refractive-reflective sheet forms a convex panel to further spread the sunlight across the solar panel.

In one embodiment, the solar panel and the refractive-reflective sheet are movable for tracking sunlight. In another embodiment, the refractive-reflective sheet is directed towards the sun at key times for improving sunlight collection.

In one embodiment, the solar panel comprises a plurality of solar panels mounted on a tower.

In one embodiment, the solar panel comprises a thin film solar panel. In another embodiment, the solar panel comprises a monocrystalline silicon solar cell. In yet another embodiment, the solar panel comprises solar roof components such as solar shingles.

In another aspect of the present invention there is provided a system for amplifying output power of a solar panel, the system comprising a solar panel and a refractive-reflective sheet, for implementing any one of the aforementioned methods of amplifying output power of the solar panel.

In yet another aspect of the present invention, there is provided a method of amplifying output power produced by a solar panel having a shadow of an object cast upon a portion of a surface thereof, comprising placing a refractive-reflective sheet having a first side and a second side between the object and the solar panel such that sunlight enters the one of first side of the sheet and the second side of the sheet, and exits via the opposite side and onto the solar panel. The refractive-reflective sheet diffuses the sunlight across the surface of the solar panel thus illuminating the shadow on the surface of the solar panel causing it to be less dark and accordingly amplifying the output power produced by the solar panel.

In one embodiment, the first side has plurality of refracting elements and the second side comprises a smooth surface. In another embodiment, the first side and the second side ach has a plurality of refracting elements.

In one embodiment, placing the refractive-reflective sheet comprises placing the first side having the plurality of refractive elements facing the sunlight source such that sunlight enters the first side and leaves the second side having the smooth surface.

In another embodiment, placing the refractive-reflective sheet comprises placing the second side having the smooth surface facing the sunlight source such that sunlight enters the second side and leaves the first side having the plurality of refractive elements.

In one embodiment, the refractive-reflective sheet is a lenticular sheet and the plurality of refracting elements comprises a plurality of lenticules.

In another embodiment, the refractive-reflective sheet comprises a plurality of convex lenses.

In yet another embodiment, the refractive-reflective sheet comprises an array of Dove prisms.

In a further embodiment, the refractive-reflective sheet is a wavy prism sheet.

In one embodiment, the refractive-reflective sheet is placed generally in a parallel direction to the solar panel.

In one embodiment, the refractive-reflective sheet is coated with an antireflection coating for allowing more sunlight to pass therethrough. In another embodiment, the refractive-reflective sheet further comprises an antireflection film for allowing more sunlight to pass therethrough.

In yet another aspect of the present invention there is provided a method of amplifying an output power for a solar panel having a shadow cast upon a portion of a surface thereof, the method comprising placing a first refractive-reflective sheet having a first side and a second side between the object and the solar panel such that sunlight enters the one of first side of the sheet and the second side of the sheet, and exits via the opposite side; and placing a second refractive-reflective sheet having a first side and a second side, in proximity to and generally to the front of the solar panel such that sunlight exiting the first refractive-reflective sheet reflects off of the second refractive-reflective sheet and onto the surface of the solar panel. Each of the first and second refractive-reflective sheets diffuses sunlight across the surface of the solar panel thus illuminating the shadow on the surface of the solar panel causing it to be less dark and accordingly amplifying the output power produced by the solar panel.

In one embodiment, the method further comprises placing a reflective panel under the first refractive-reflective sheet, for reflecting additional sunlight through the first refractive-reflective sheet and onto the surface of the solar panel.

In yet another aspect of the present invention there is provided a system for amplifying the output power of a solar panel, the system comprising a solar panel, a first refractive-reflective sheet and a second refractive-reflective sheet, for implementing the aforementioned method of amplifying an output power of the solar panel.

BRIEF DESCRIPTION OF THE DRAWINGS

An embodiment will now be described, by way of example only, with reference to the attached Figures, wherein.

DETAILED DESCRIPTION OF THE EMBODIMENT

Figure 1B:
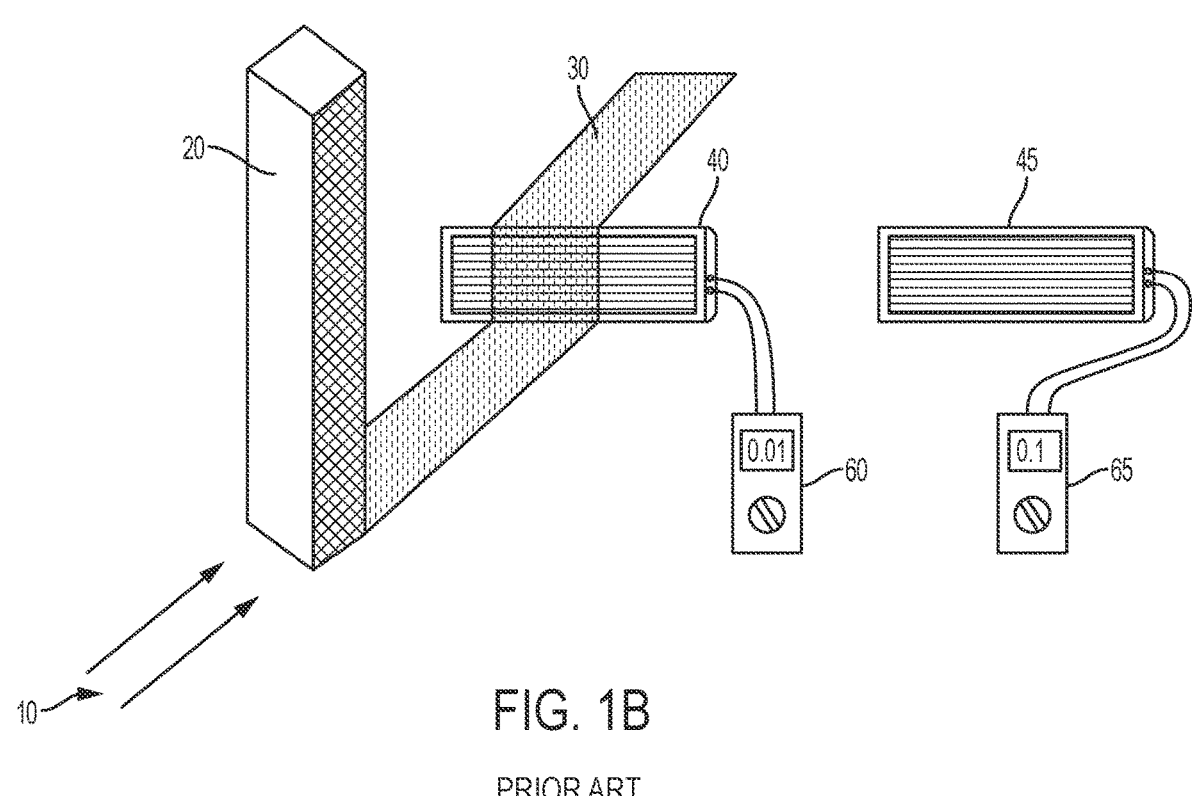
FIG. 1B is a perspective view of another system of solar panels with one panel having a shadow of an object cast thereupon.
Figure 1A:
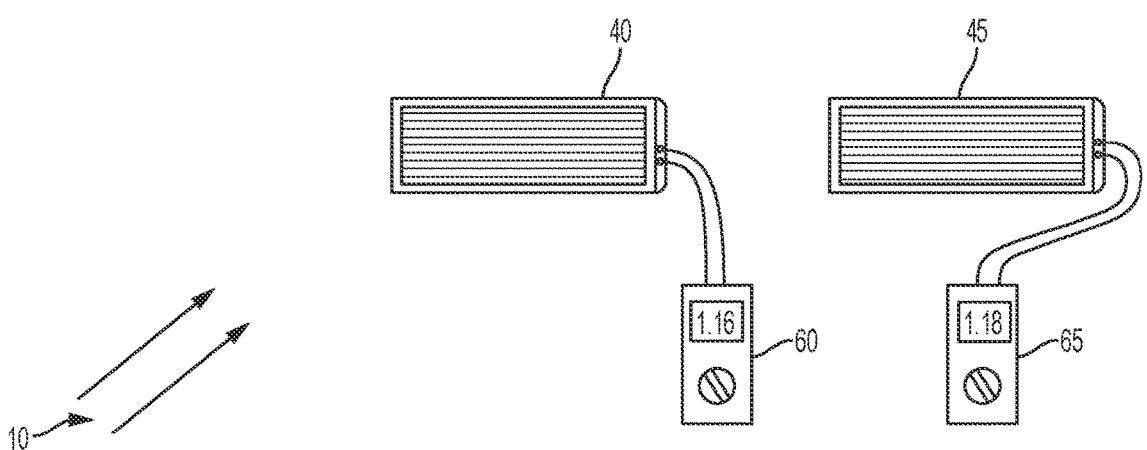
FIG. 1A is a perspective view of a system of two solar panels for illustrating the various embodiments of the present invention, shown with multimeters giving measurements of electric current produced by the solar panels.

While the Background of Invention described above has identified particular problems known in the prior art, the present invention provides, in part, a new and useful application for FIG. 1A is a perspective view of a prior art system of two 30 Watt Monocrystalline solar panels 40, 45. The output current of solar panels 40 and 45 is substantially the same making this a good system for comparing various configurations. FIG. 1B is a perspective view of another prior art system of two 2.5 Watt Amorphous (thin film) solar panels 40, 45 with one solar panel 40 having a shadow 30 of an object 20 cast thereupon as sunlight 10 is directed towards the solar panels. Two multimeters 60, 65 are used to measure the output current of solar panels 40 and 45, respectively. It has been observed that even a partial shadow obscuring a portion of the solar panel 40 has a major impact on the output current, and hence the output power thereof. In this example, panels 40 and 45 are thin-film solar panels. As shown, multimeter 65 shows an output current of 0.1 A for panel 45, whereas multimeter 60 shows an output current of 0.01 A (10 mA) for panel 40. Although only a portion of the surface of panel 40 is obscured by the shadow 30 of object 20, the drop in output current is approximately 90%.

Figure 1C:
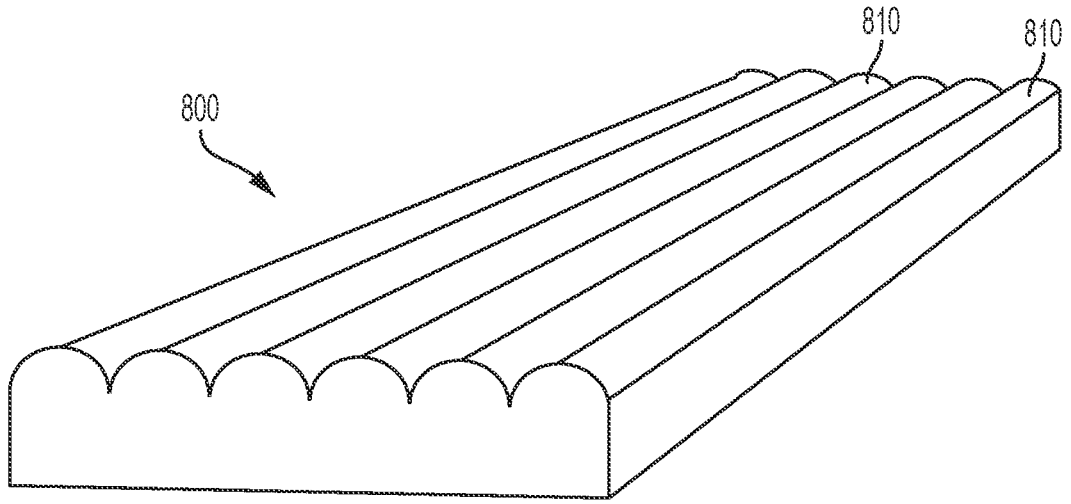
FIG. 1C is a perspective view of a refractive-reflective sheet in the form of a single-sided linear lenticular sheet, as known in the art.
Figure 1D:
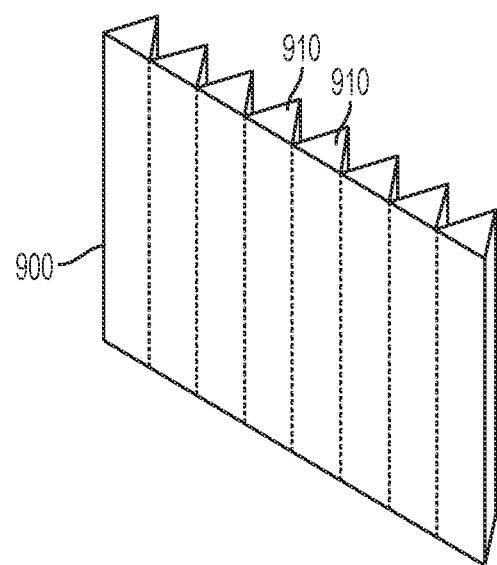
FIG. 1D is a perspective view of a refractive-reflective sheet in the form of a linear prism sheet, as known in the art.
Figure 1E:
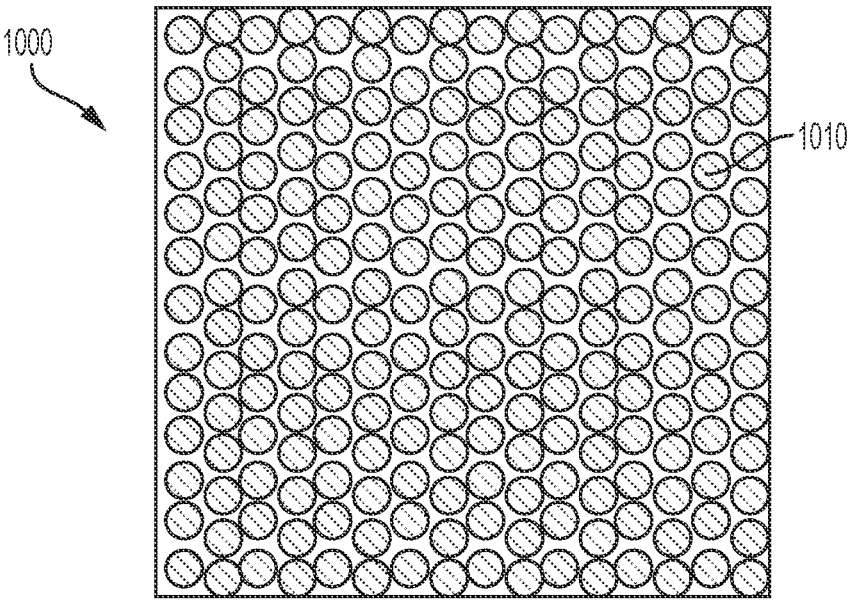
FIG. 1E is a perspective view of a refractive reflective sheet in the form of a prism array sheet comprising spherical convex lens elements, known as the fly eye lens.

FIG. 1C is a perspective view of a refractive-reflective sheet in the form of a single-sided linear lenticular sheet 800, as known in the art. Linear lenticular sheet 800 has a plurality of refracting elements on a first side thereof in the form of a plurality of linear lenticules 810. FIG. 1D is a perspective view of a refractive-reflective sheet in the form of a linear prism sheet 900, as known in the art. Linear prism sheet 900 has a plurality of refracting elements on one side thereof in the form of a plurality of linear prism elements 910. FIG. 1E is a perspective view of a refractive reflective sheet in the form of a prism array sheet comprising spherical convex lens elements, known as the fly eye lens. The array prism sheet 1000 comprises spherical elements 1010. In other embodiments (not shown), the prism elements may be conical, pyramid-shape, dove prism, or the like. In a further embodiment (not shown), the refractive-reflective sheet may be a wavy prism sheet. In any of the above embodiments, the refracting elements may also be formed or located on the second side (not shown) in addition to the first side.

The inventor has used refractive-reflective sheets has shown in FIGS. 1C-1E in conjunction with solar panels, and other reflective panels, to amplify the output of the solar panels in the presence of shadow and otherwise, as explained below.

Figure 2A:
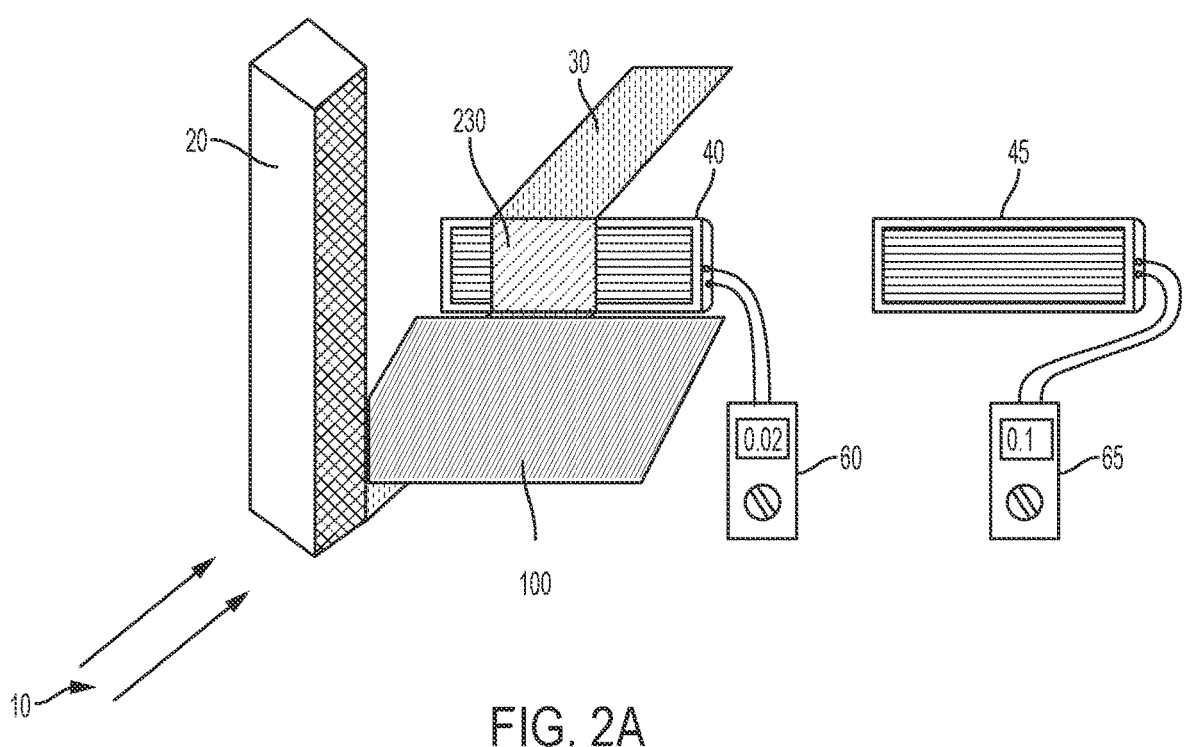
FIG. 2A is a perspective view of the system of FIG. 1B, including a refractive-reflective sheet positioned on the ground in front and near the lower edge of one of the solar panels such that sunlight reflects thereon and then onto the surface of that solar panel for amplifying the output power thereof, in accordance with an embodiment of the present invention.

FIG. 2A is a perspective view of the system of FIG. 1B, featuring a refractive-reflective sheet 100 for reducing the shadow 30, in accordance with an embodiment of the present invention. The refractive-reflective sheet 100 is placed flat on the ground generally to the front of the solar panel 40 and near the lower edge thereof. The refractive-reflective sheet 100 receives sunlight from areas around the area covered by shadow 30. The received sunlight is reflected and diffused onto the surface of solar panel 40. This results in the shadow portion 230 on panel 40 becoming more illuminated and less dark than the original shadow 30 of FIG. 1B. As a result, the output current of multimeter 60 has been observed to be around 0.02 A. Although still 80% below the output current produced by solar panel 45 (0.10A) which does not have any shadow obscuring a portion thereof, the output current of panel 40 with the refractive-reflective sheet 100 placed on the ground in front of solar panel 40, is double (i.e. up by 100%) that of solar panel 40 without the use of the refractive-reflective sheet 100, as shown in FIG. 1B. Minor variations in the output voltage were observed. Since the output power of a solar panel equals the product of the output voltage and the output current, therefore an increase in the output current produces a similar increase in the output power. Accordingly, for FIG. 2A, the use of refractive-reflective sheet 100 improves the output power of a solar panel partially obscured by a shadow by 100%.

Figure 2B:
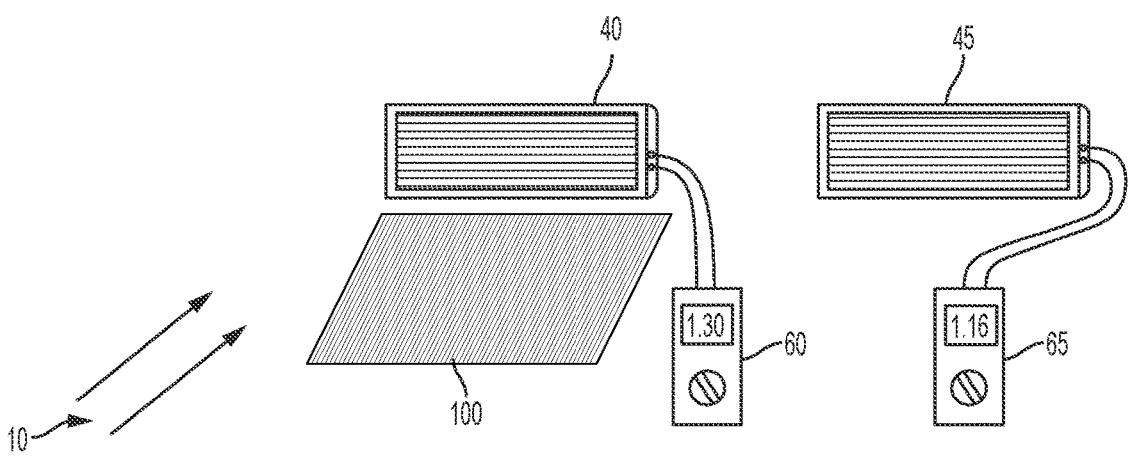
FIG. 2B is a perspective view of the system of FIG. 1A without the shadow of an object cast upon any of the two solar panels.

FIG. 2B is a perspective view of the system of FIG. 1A but with a refractive-reflective sheet 100 placed on the ground in front of solar panel 40 in the same manner as in embodiment of FIG. 2A without the shadow of an object cast upon any of the two solar panels 40 and 45. Accordingly, solar panel 45 being exposed to sunlight 10 produced a current of 1.16 A as indicated by multimeter 65. The placement of refractive-reflective sheet 100 on the ground in front of solar panel 40 and near its lower edge caused additional sunlight 10 to be reflected onto solar panel 40. As a result, the output current produced by solar panel 40, and indicated by multimeter 65 was observed to be 1.30 A which is higher than that of solar panel 45. Thus the use of refractive-reflective sheet 100 placed on the ground in front of panel 40 improves the output power by approximately 12% when subjected to the same amount of sunlight 10.

Figure 3:
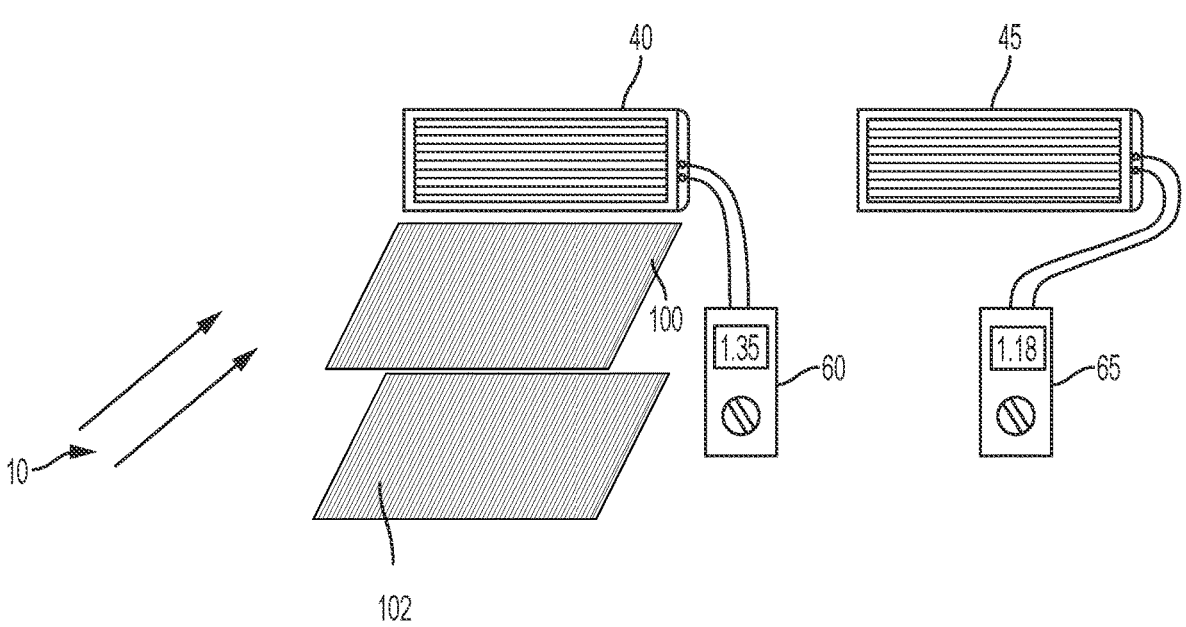
FIG. 3 is a perspective view of the system of FIG. 1A, including two adjacent refractive-reflective sheets positioned on the ground in front and near the lower edge of one of the solar panels such that sunlight reflects thereon and then onto the surface of that solar panel for amplifying the output power thereof, in accordance with an embodiment of the present invention.

FIG. 3 is a perspective view of the system of FIG. 2B, but including two adjacent refractive-reflective sheets 100, and 102 positioned on the ground in front and near the lower edge of solar panel 40 such that sunlight 10 reflects thereon and then onto the surface of solar panel 40 for amplifying the output power thereof, in accordance with an embodiment of the present invention. Refractive-reflective sheet 100 is proximal to solar panel 40 while sheet 102 is distal to solar panel 40. In this case, solar pane 45 is producing a current of 1.18 A, but solar panel 40 is producing 1.35 A. Thus the improvement in output power is about 14.4%. Accordingly, an additional refractive-reflective sheet 102 positioned distal to solar panel 40 has made an additional, albeit modest, improvement in the solar panel output power compared to a solar panel with one refractive-reflective sheets used therewith.

Figure 4:
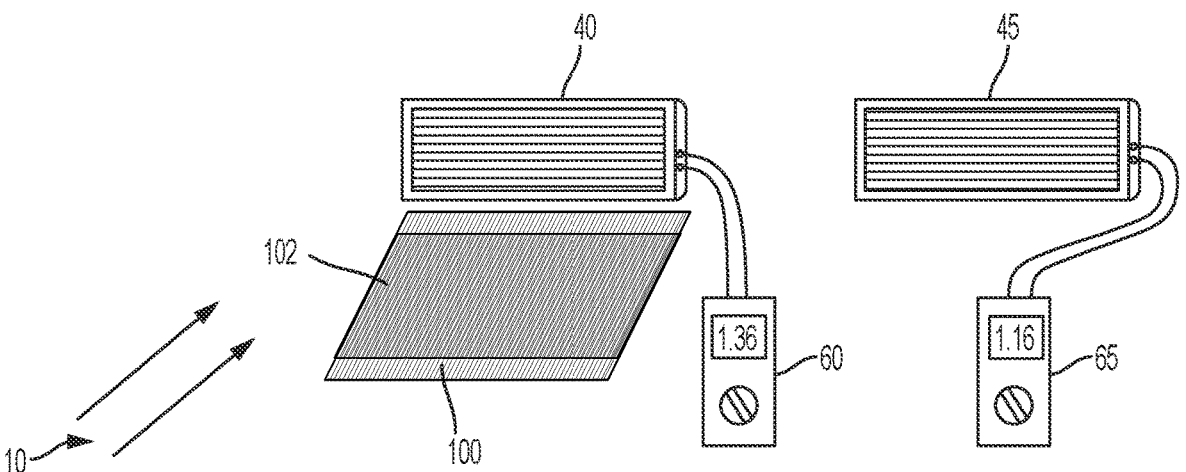
FIG. 4 is a perspective view of a system as shown in FIG. 3, except that the two refractive-reflective sheets are stacked on top of one another and positioned on the ground in front and near the lower edge of the solar panel, in accordance with an embodiment of the present invention.

FIG. 4 is a perspective view of a system as shown in FIG. 3, except that the two refractive-reflective sheets 100 and 102 are stacked on top of one another and positioned on the ground in front and near the lower edge of solar panel 40, for reflecting sunlight 10 onto the surface of solar panel 40, in accordance with an embodiment of the present invention. In this embodiment, sheets 100 and 102 are linear lenticular sheets both having linear lenticular lenses oriented in the same direction, i.e. having the same polarization. The output current of solar panel 40 was observed to be 1.36 A, compared with an output current of 1.16 A from solar panel 45. Accordingly, an improvement of over 17% was observed. Accordingly, the stacking of refractive-reflective sheet is preferred to using a single sheet and preferred to using two adjacent sheets as was done in the embodiments of FIG. 2B and FIG. 3, respectively.

Figure 5:
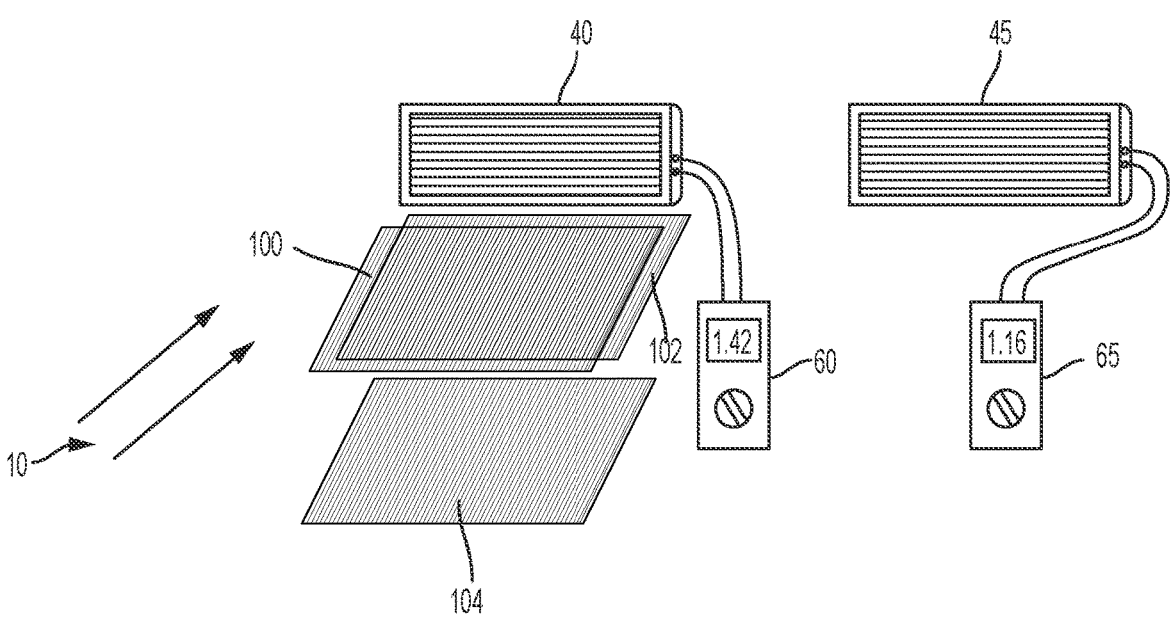
FIG. 5 is a perspective view of the system as shown in FIG. 4 but with a third refractive-reflective sheet placed on the ground adjacent the two stacked refractive-reflective sheets for reflecting additional sunlight onto the surface of the same solar panel, in accordance with an embodiment of the present invention.

FIG. 5 is a perspective view of the system as shown in FIG. 4 but with a third refractive-reflective 104 sheet placed on the ground adjacent the two stacked refractive-reflective sheets 100 and 102, for reflecting additional sunlight onto the surface of solar panel 40, in accordance with an embodiment of the present invention. The observe current generated by solar panel 40 was 1.42 A, compared to 1.16 A for solar panel 45. Accordingly, an improvement of over 20% in the output current/power can be achieved by using two stacked sheets, such as linear-lenticular sheets 100, 102 having the same polarization, and an additional adjacent sheet 104 placed distal from the stacked sheets with respect to the lower edge of the solar panel 40.

Figure 6:
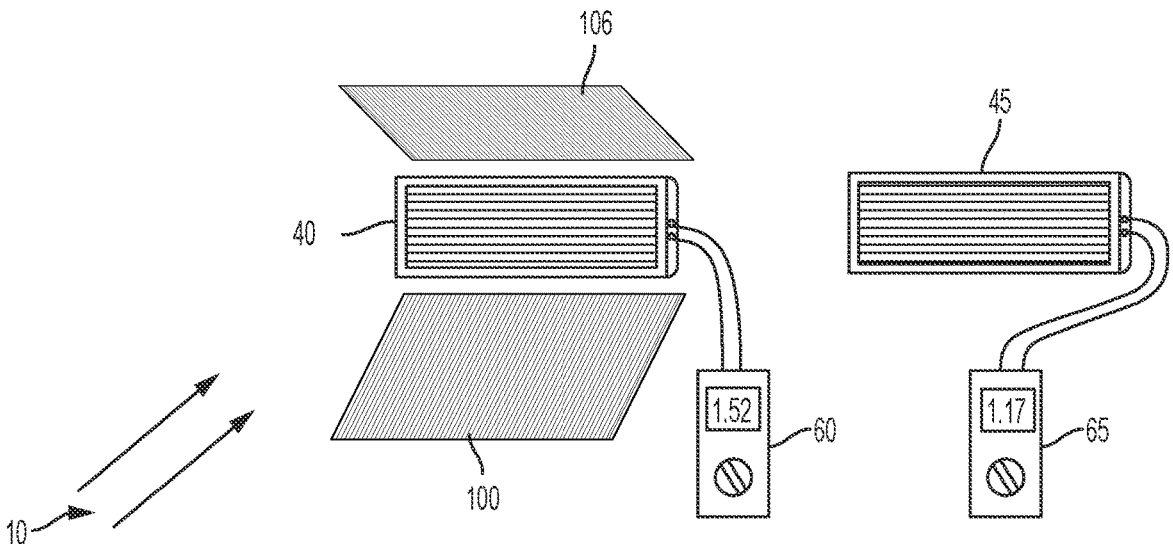
FIG. 6 is a perspective view of the system as shown in FIG. 2B but with one refractive-reflective sheet placed on the ground in front and near the lower edge of one of the solar panels, and another refractive-reflective sheet positioned near the top edge of the same solar panel and angled for reflecting sunlight onto the surface of that solar panel, in accordance with an embodiment of the present invention.

FIG. 6 is a perspective view of the system as shown in FIG. 2B but with one refractive-reflective sheet 100 placed on the ground in front and near the lower edge of solar panel 40, and another refractive-reflective sheet 106 positioned near the top edge of the same solar panel 40 and angled for reflecting sunlight onto the surface of that solar panel, in accordance with an embodiment of the present invention. The output current of panel 45 was 1.17 A while that of panel 40 was 1.52. Accordingly, the two sheets 100 and 106 increased the output current of panel 40 by reflecting more sunlight thereon. The improvement was approximately 30% in output current.

In one embodiment, the refractive-reflective sheets used each has a first side having a plurality of refracting elements, and a second side having a smooth surface. In one embodiment, the refractive-reflective sheet is placed on the ground with the side containing the refracting elements facing up for receiving and reflecting the sunlight towards the solar panel. In this embodiment, the smooth surface of the second side of the refractive-reflective sheet may be coated with a color to increase the sheet's reflectivity of sunlight. Alternatively, the smooth surface of the second side of the refractive-reflective sheet may be coated with a reflective medium. In another embodiment, the refractive-reflective sheet is placed on the ground with the smooth side facing up for receiving and reflecting the sunlight towards the solar panel.

In another embodiment, the side containing the refracting elements is facing up, and the refracting elements are coated with a reflective coating to increase the reflective amount of light to the solar panel. The coating may be part of the manufacturing process of the refractive-reflective sheet, or may be painted on the top surface of the refracting elements. The reflective paint or mirror coating may be silver, chrome, gold, platinum, bronze, red, green, blue, or any other suitable color, or combination of colors, in order to control the reflected output as well as to increase the architectural color selections. Some of these embodiments will be shown with reference to FIG. 10 and FIGS. 12-13 as described below. The resulting refractive-reflective sheet works somewhat similar to a mirror booster, but has the added benefit of dispersing the reflective light across the solar panel which avoids burn-in, as explained further below.

Figure 7A:
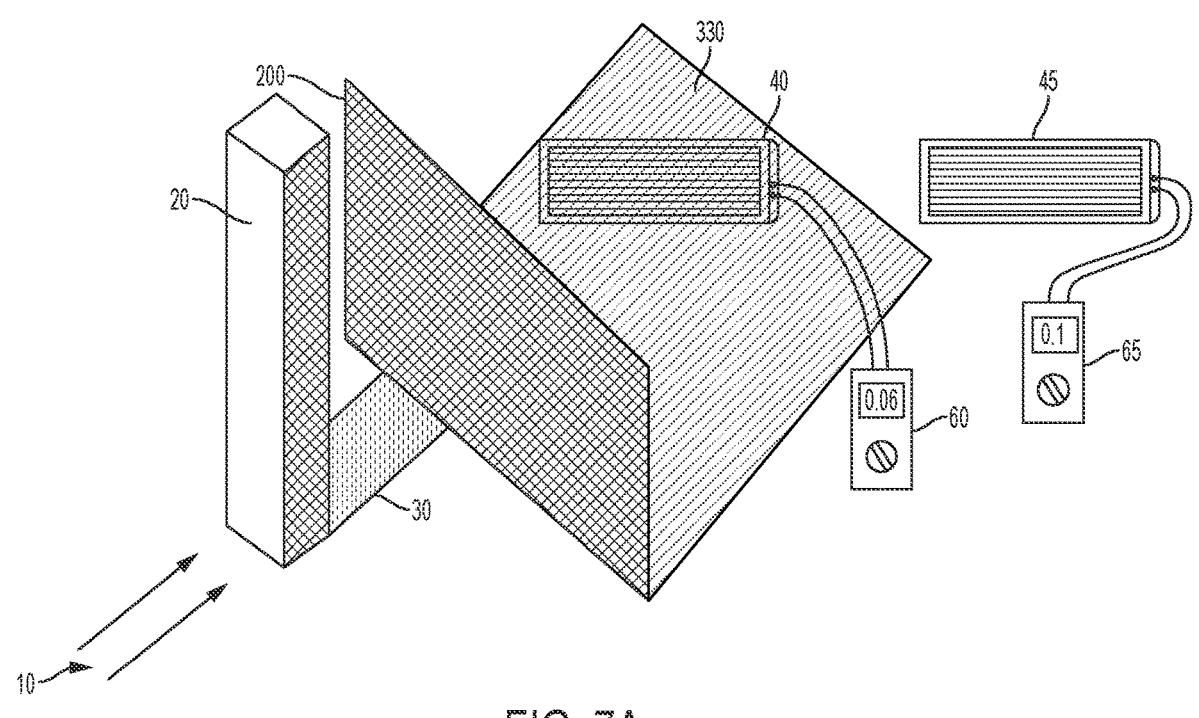
FIG. 7A is a perspective view of the system of FIG. 1B, including an upstanding refractive-reflective sheet positioned to the front of a solar panel having a shadow obscuring part of its surface, so that sunlight passes through the refractive-reflective sheet and onto the surface of that solar panel for amplifying the output power thereof, in accordance with an embodiment of the present invention.
Figure 7B:
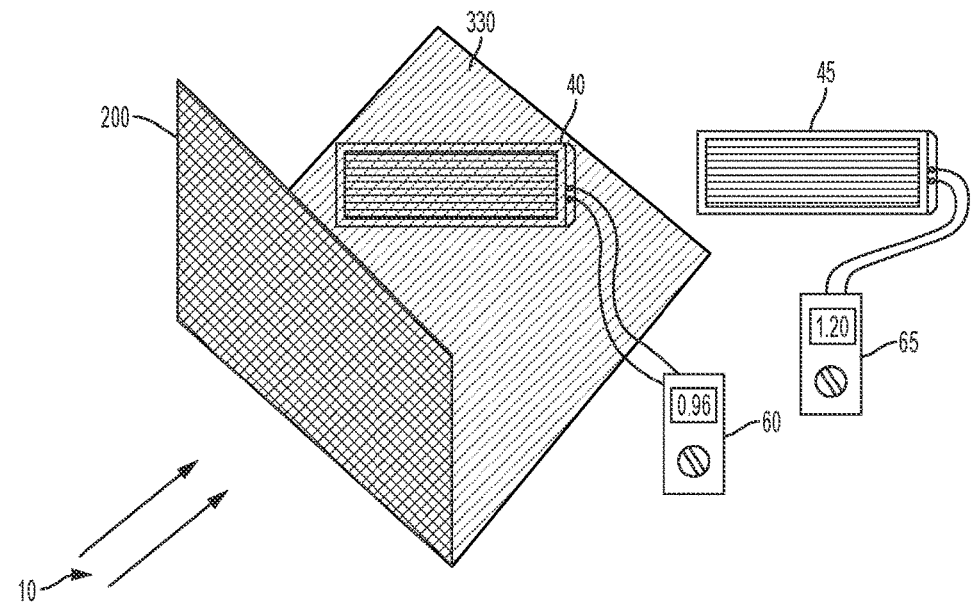
FIG. 7B is a perspective view of the system of FIG. 1A, including an upstanding refractive-reflective sheet positioned to the front of a solar panel so that sunlight passes through the refractive-reflective sheet and onto the surface of that solar panel for amplifying the output thereof, in accordance with an embodiment of the present invention.

Turning to FIG. 7A which is a perspective view of the system of FIG. 1B, featuring an upstanding refractive-reflective 200 sheet for reducing the shadow, in accordance with another embodiment of the present invention. In this embodiment, refractive-reflective sheet 200 is placed between the object 20 casting a shadow 30 on solar panel 40, and solar panel 40. The placement of the sheet 200 is such that the sunlight enters one side of the sheet and exits the opposite side and onto the solar panel. In one embodiment, placing refractive-reflective sheet 200 between the object 20 and the solar panel 40 comprises placing refractive-reflective sheet 200 such that the sunlight enters the first side having a plurality of refractive elements. In another embodiment, placing refractive-reflective sheet 200 between the object 20 and the solar panel 40 comprises placing refractive-reflective sheet 200 such that the sunlight enters the second side having a smooth surface. In another embodiment, placing refractive-reflective sheet 200 on either side of the object 20 and the solar panel 40 comprises placing refractive-reflective sheet 200 such that the sunlight enters the second side having a smooth surface. In yet another embodiment, refractive-reflective sheet 200 has a plurality of refractive elements on both sides. The refractive-reflective sheet 200 diffuses the sunlight across the surface of the solar panel thus illuminating the shadow 330 on the surface of the solar panel causing it to be less dark and accordingly amplifying the output power of the solar panel 40. As can be seen in FIG. 7A, the output current resulting from using sheet 200 is 600% that of the output current measured in the absence of sheet 200, as measured in the case of FIG. 1B. FIG. 7B is a perspective view of the embodiment of FIG. 1A with an upstanding refractive-reflective sheet 200 as in FIG. 7A. In this case the output current of solar panel 40 (at 0.96 A) is about 80% of that of solar panel 45 (at 1.2 A). The use of refractive-reflective sheet 200 thus reduces output current of a solar panel by about 20% in a shadow-free configuration, but greatly increases output current by about 800% in the case of a shadow being cast upon the solar panel. Overall, in an area where a shadow is likely to be cast upon the panel for a significant portion of the day, the average output power of a solar panel throughout the day is likely increased by using an arrangement as in FIG. 7A and FIG. 7B.

Figure 8A:
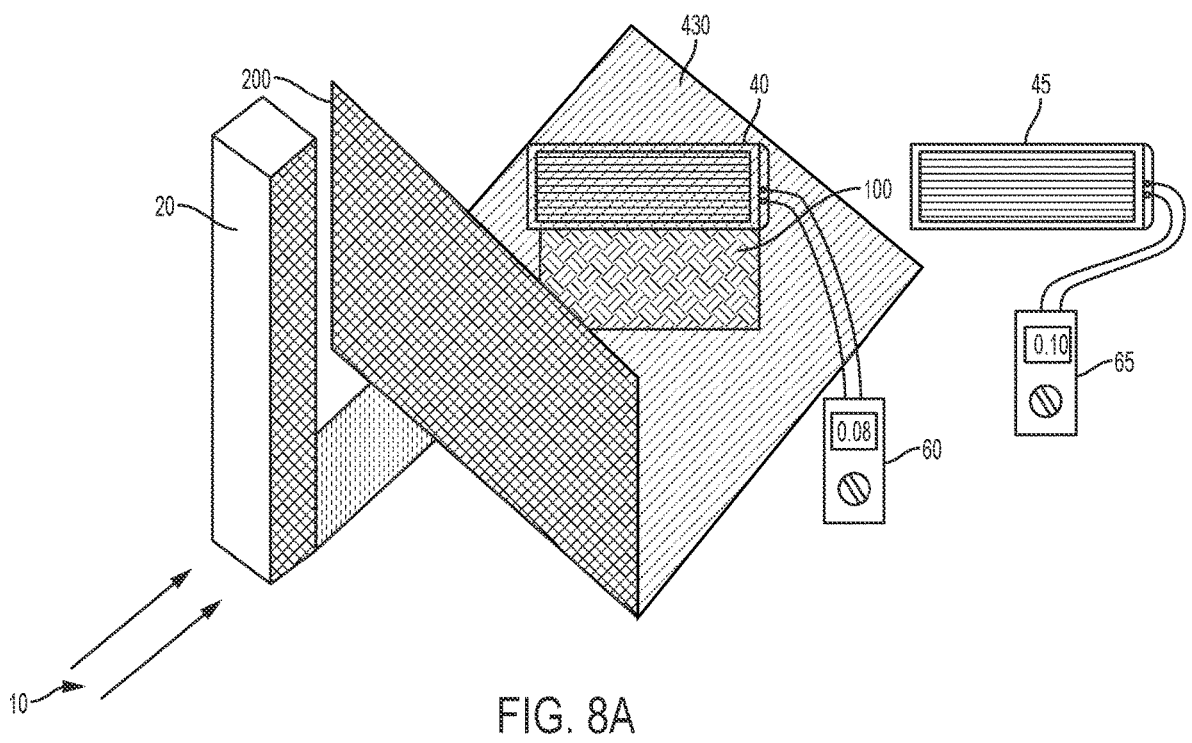
FIG. 8A is a perspective view of the system of FIG. 1B, including a first refractive-reflective sheet placed on the ground to the front of a solar panel near the lower edge thereof, and a second upstanding refractive-reflective sheet positioned in front of that solar panel, for amplifying the output power of that solar panel, in accordance with an embodiment of the present invention.
Figure 8B:
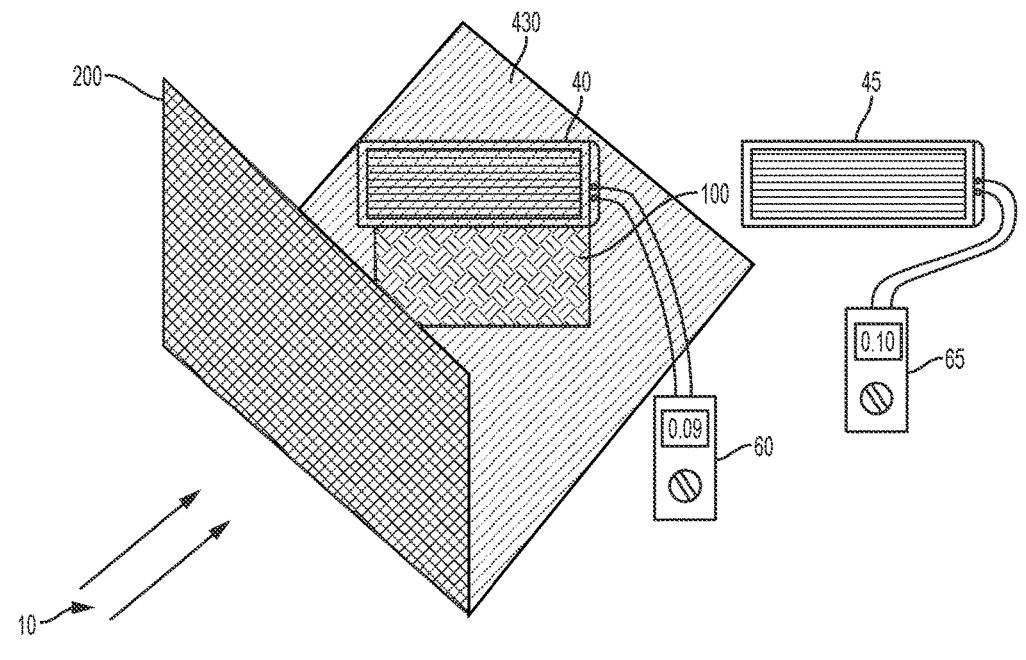
FIG. 8B is a perspective view of the embodiment of FIG. 8A without the shadow of an object cast upon any of the solar panels.

Turning now to FIG. 8A which is a perspective view of the system of FIG. 1B, featuring two refractive-reflective sheets 100 and 200, for reducing the shadow cast upon solar panel 40, in accordance with yet another embodiment of the present invention. In this embodiment sunlight 10 casts a shadow 30 of object 20 towards solar panel 40 as before. A refractive-reflective sheet 200 is placed between the object 20 and the panel 40 such that sunlight 10 enters one side of the first refractive-reflective sheet 200 and exits from the other side towards the panel 40. In addition, another refractive-reflective sheet 100 is placed on the ground in proximity to and generally to the front of solar panel 40 such that some of the sunlight exiting sheet 200 is reflected on refractive-reflective sheet 100 and onto solar panel 40. The effect of diffusion of sunlight by both sheet 200 and sheet 100 results in a much reduced shadow 430 on panel 40. The observed output current from panel 40 was observed to be 800% higher than that observed from panel 45 with no refractive-reflective sheets present. In other words, the reduction in current compared to the panel 45 on which there is no shadow is only 20%. FIG. 8B is a perspective view of the embodiment of FIG. 8A without the shadow of an object cast upon any of the two solar panels. In this case, the output current of panel 40 (0.09 A) is 90% of that of panel 45 (0.1 A). Combined with a small reduction in output voltage between panel 45 and panel 40, the output power of panel 40 has been observed to be approximately 88.76% that of the output power of panel 45. Advantageously, this arrangement greatly enhances the performance of a solar panel partly obscured by a shadow, with practically no loss in performance when no shadow is present.

In another embodiment, the refractive-reflective sheet 100 has a plurality of refracting elements on both the first side and the second side. When placed on the ground generally to the front of solar panel 40 sunlight 10 is reflected on the sheet 100 towards solar panel 40.

Figure 9A:
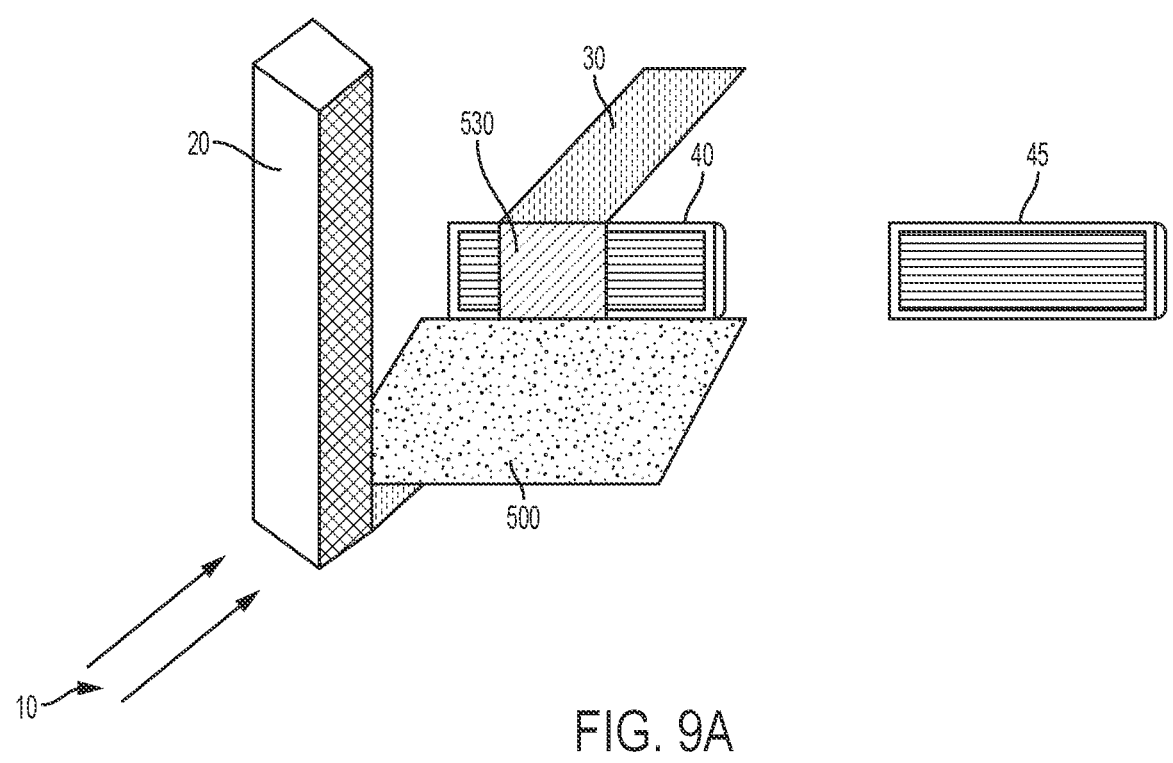
FIG. 9A is a perspective view of the system of FIG. 1B, including a reflective panel such as mirror for reflecting sunlight onto a solar panel partly obscured by a shadow, for amplifying the output power of the solar panel, as known in the art.

FIG. 9A is a perspective view of the system of FIG. 1B, featuring a reflective panel 500 placed in front of solar panel 40 in an attempt to reduce the shadow 30, as known in the art. The reflective panel 500 reflects sunlight onto the surface of solar panel 40. However, since the sunlight is concentrated onto a small area of the panel, there was no significant reduction in the shadow 30. The current readings from multimeters 60 and 65 were similar to their readings in FIG. 1B.

Figure 9B:
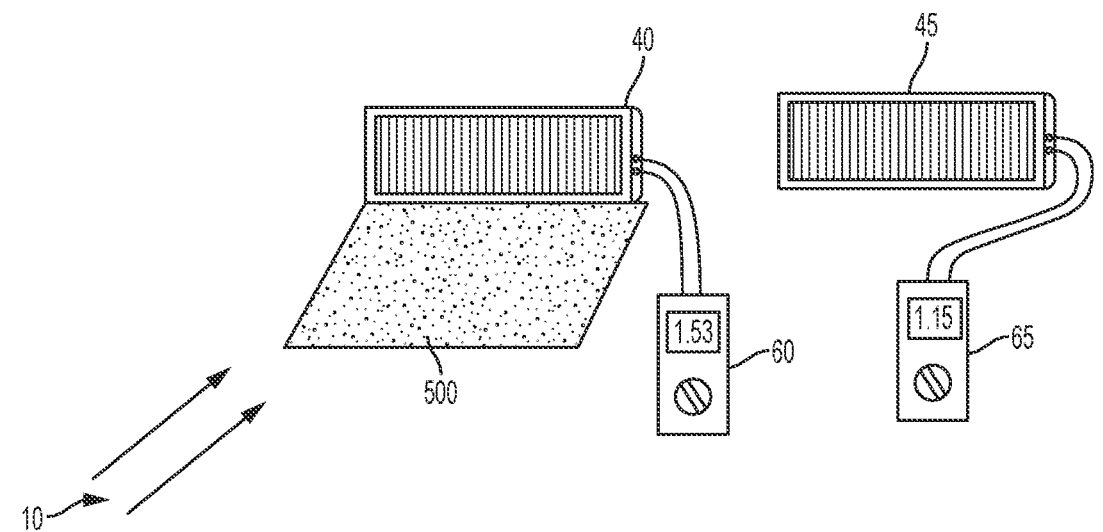
FIG. 9B is a perspective view of the system of FIG. 9A without the shadow of an object cast upon any of the two solar panels.

FIG. 9B is a perspective view of a system having a reflective panel 500 similar to that of FIG. 9A but featuring a system of panels similar to FIG. 1A without the shadow of an object cast upon any of solar panels 40 and 45. Solar panel 40 produces 1.66 A while solar panel 45 produces 1.19 A. In this case the output of solar panel 40 is about 33% higher than that of solar panel 45 since panel 40 receives both direct and reflected sunlight. However, using a mirror may void the warranty for the solar panel 40 as the reflection of the sun is concentrated into a small area on the solar panel which causes burning of the cells. For example, for FIG. 9A when sunlight 10 is in a different direction and there is no shadow on solar panel 40, or for FIG. 9B generally, the sunlight falling on solar panel 40 both directly and reflected off of reflective panel 500 will be concentrated in a small area and thus higher than the rating of the solar panel 40, causing burning of the cells on that area. The cell burning is not generally covered by the warranty of solar panels.

Figure 10:
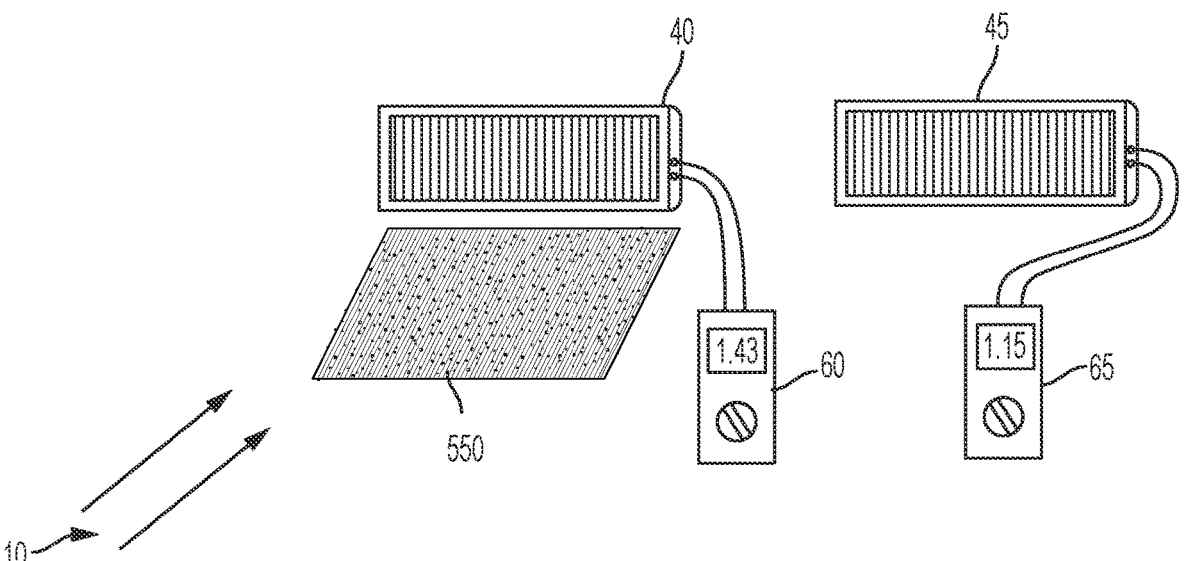
FIG. 10 is a perspective view of a system similar to that of FIG. 9B but using a refractive-reflective sheet coated with a reflective material.

FIG. 10 is a perspective view of a system similar to that of FIG. 9B but using a refractive-reflective sheet coated with a reflective material instead of a mirror. Refractive-reflective sheet is a linear lenticular sheet 550 coated with a reflective material and placed on the ground to in front of and near the lower edge of solar panel 40 with the lenticular lens side facing up. Sunlight 10 reflects on sheet 550 and then onto the surface of solar panel 40. The observed output current from solar panel was 1.43 A compared with 1.15 A for solar panel 45 which does not have a refractive-reflective or lenticular sheet placed in front thereof. Accordingly, the output current, and hence the output power, is increased by 24%. The observed output current for solar panel 40 is less than that observed with the use of a reflective panel such as a mirror as described in FIG. 9B. However, due to the plurality of lenticular lenses reflecting the sun rays in different directions, the reflected rays on solar panel 40 are distributed over the surface of the solar panel 40 and are not concentrated into a certain region. While producing a slightly smaller current than observed when using a mirror, the distribution of the sun rays ensures that the rating of the solar panel 40 is not exceeded and therefore no burn-in takes place. Advantageously, damage to the solar panel 40 is averted while significantly amplifying the output power.

Figure 11A:
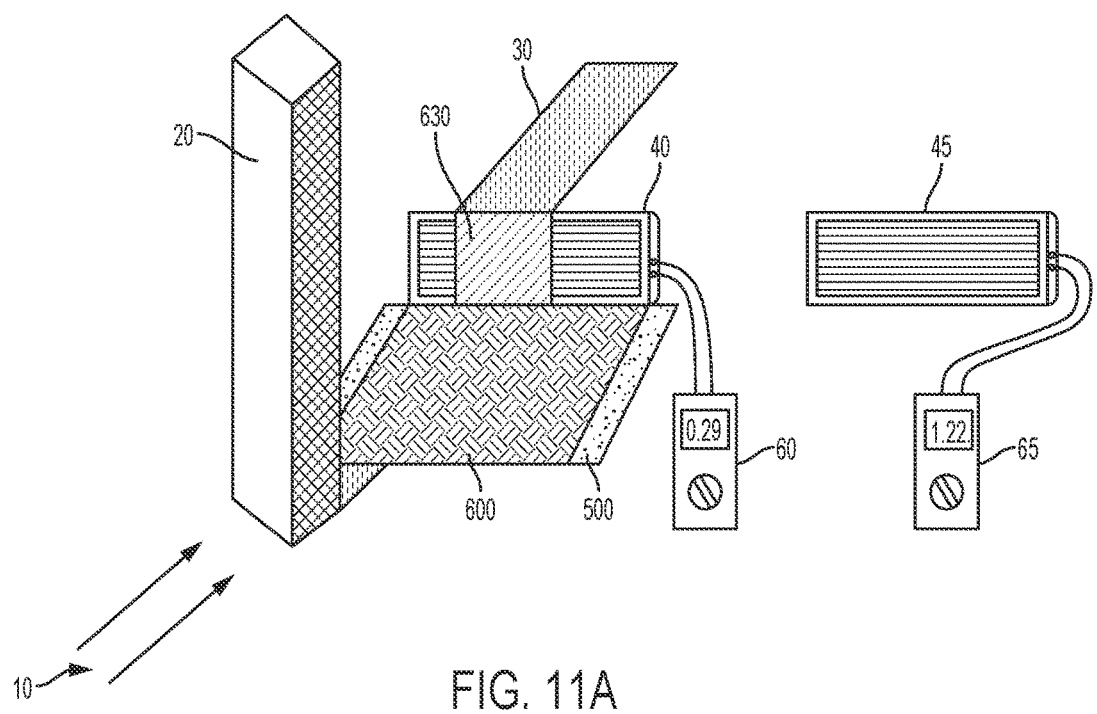
FIG. 11A is a perspective view of the system of FIG. 9A but including a refractive-reflective sheet placed on the reflective panel for amplifying an output power of a solar panel, in accordance with an embodiment of the present invention.

FIG. 11A is a perspective view of the system of FIG. 9A, featuring a reflective panel 500 and a refractive-reflective sheet 600 placed on the reflective panel 500 for reducing the shadow 30, in accordance with an embodiment of the present invention. The sunlight falling onto the refractive-reflective sheet 600 undergoes two paths. A portion of the sunlight is reflected onto the refractive reflective sheet 600 then to the surface of panel 40. Another portion of the sunlight passes through the refractive-reflective sheet 600, gets reflected on the reflective panel 500, passes through refractive-reflective sheet 600 again, and then lands onto the panel 40. Advantageously, more sunlight ends up falling on panel 40 and accordingly, the output current is increased compared to that produced by panel 40 obscured by a shadow as in FIG. 1B. Additionally, the power produced by solar panel 40 is close to that produced by solar panel 45 despite the shadow cast upon a portion of solar panel 40. For example, an output current of 0.29 A was observed from solar panel 40. Thus, the output current of panel 40 (0.29 A) is about 24% of the output current of panel 45. A test (not shown) performed with the same solar panels in the presence of a similar shadow cast upon panel 40 resulted in panel 40 producing only 0.09 A. Accordingly, the reflective panel 500 and refractive-reflective sheet 600 increased output power by 0.29 A/0.09 A=3.2 times, or 320%.

Figure 11B:
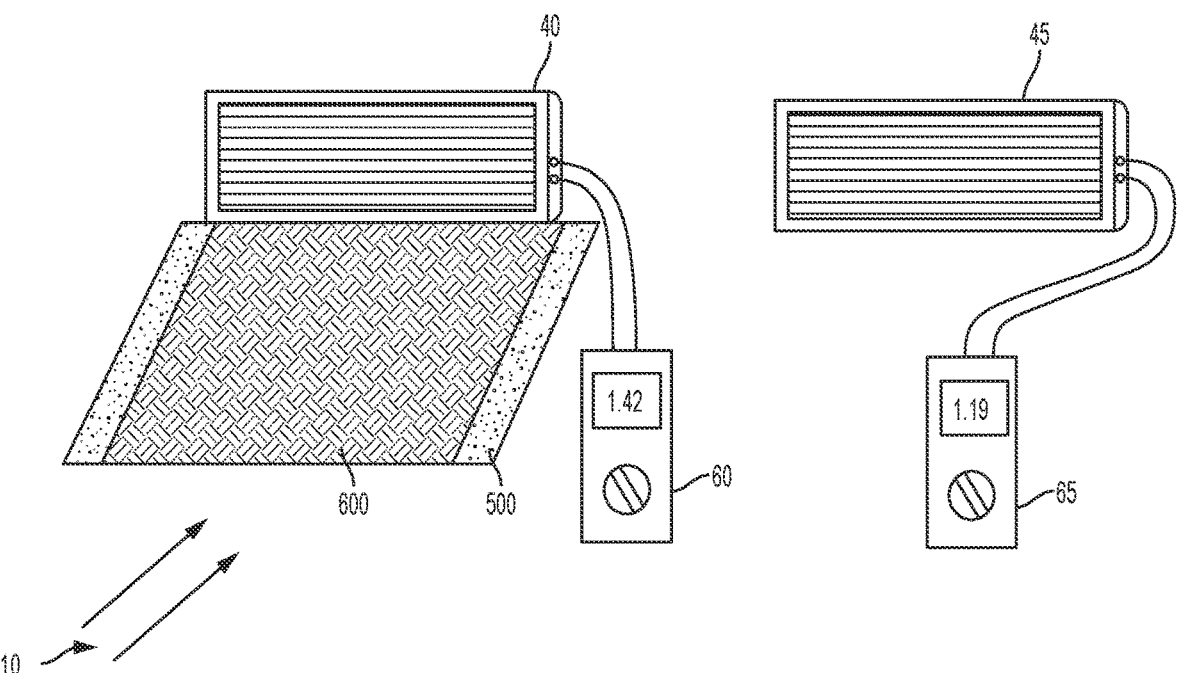
FIG. 11B is a perspective view of the embodiment of FIG. 11A without the shadow of an object cast upon any of the two solar panels.

FIG. 11B is a perspective view of the embodiment of FIG. 11A without the shadow of an object cast upon any of the two solar panels. In this case solar panel 40 produces approximately 20% more power than solar panel 45 as indicated by the fact that the output current of solar panel 40 is 1.42 A while that of solar panel 45 is only 1.19 A. In both FIG. 11A and FIG. 11B the use of the refractive-reflective sheet 600 diffuses the sunlight reflected off of the reflective panel 500 and across the cells of solar panel 40 thus preventing excessive sunlight from falling onto a particular small area of the solar panel 40 causing burning of the cells, while at the same time increasing output power over that of a solar panel which simply uses direct sunlight. While the power increase is slightly less than that of the system of FIG. 9B where a mirror alone was being used (which had a 40% increase in power), the advantage of averting burn-in of the cells and voiding the warranty more than makes up for the small different in power increase. In one embodiment, the reflective panel 500 comprises a bright colored surface. In another embodiment the reflective panel 500 comprises the reflective surface of a mirror.

Figure 12:
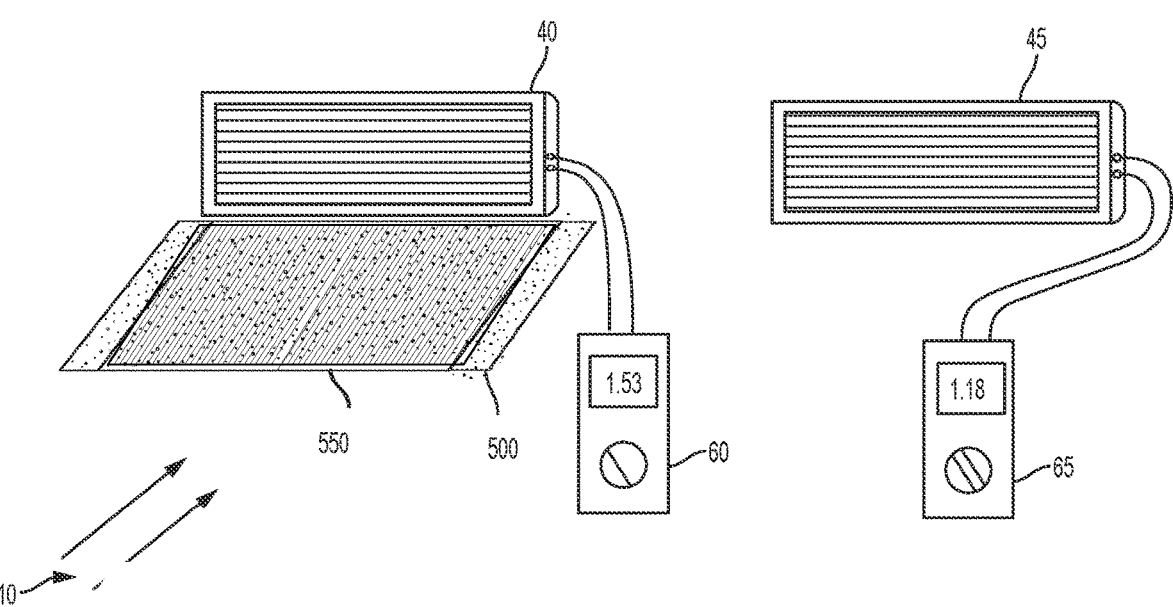
FIG. 12 is a perspective view of a system similar to that of FIG. 9B, but additionally having a refractive-reflective sheet coated with a reflective material placed on top of the reflective panel, in accordance with an embodiment of the present invention.

FIG. 12 is a perspective view of a system similar to that of FIG. 9B, but additionally having a refractive-reflective sheet 550 coated with a reflective material placed on top of the reflective panel 500, in accordance with an embodiment of the present invention. The observed current output from solar panel 40 in this case was 1.53 A, while panel 45 produced 1.18 A. This amounts to about 30.5% increase in output current (and hence output power since the voltage was largely the same). The small increase in output current observed in the system of FIG. 12 compared with the case of FIG. 10 where the refractive-reflective sheet 550 coated with reflective material was used alone with no reflective panel can be attributed to a small amount of reflectivity from the reflective panel 500 in addition to the reflectivity achieved by the reflective spray on sheet 550. Similarly, the small increase in output current observed in FIG. 12 over the system of FIG. 11B can be attributed to the reflective coating applied to sheet 550 as compared with the use of a refractive-reflective or linear lenticular sheet 600 which does not have a reflective coating placed on top of a reflective panel 500.

Figure 13:
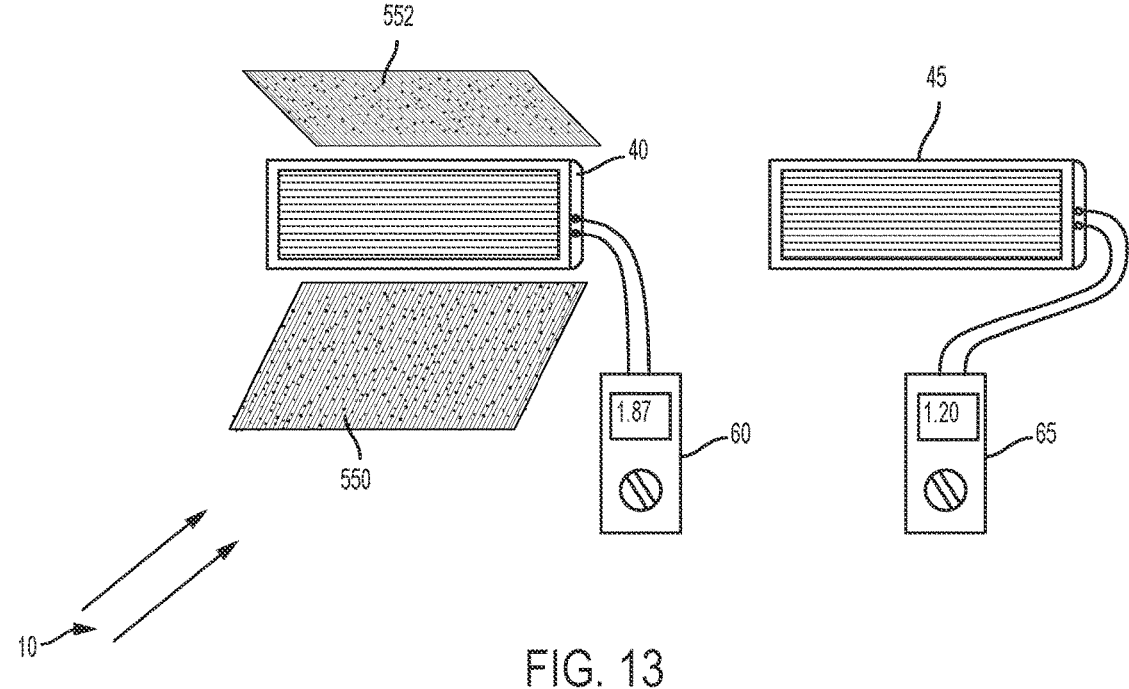
FIG. 13, is a perspective view of the system as shown in FIG. 12 but with one refractive-reflective sheet coated with a reflective material placed on the ground in front and near the lower edge of one of the solar panels, and another refractive-reflective sheet coated with a reflective material positioned near the top edge of the same solar panel and angled for reflecting sunlight onto the surface of that solar panel, in accordance with an embodiment of the present invention.

FIG. 13, is a perspective view of a system similar to that of FIG. 12, but utilizes an additional refractive-reflective sheet 552 coated with reflected material and positioned above the solar panel 40 such that the coated surface of each of the sheets 550 and 552 is oriented to reflect sunlight onto the solar panel. For example, refractive-reflective sheet 550 may be a linear lenticular sheet having the lens-side thereof coated with a reflective material, and it is placed on the ground in front and near the lower edge of solar panel 50. Similarly, refractive-reflective sheet 552 may be a linear lenticular sheet having the lens-side thereof coated with reflective material, and is positioned near the top edge of solar panel 40 and oriented so that the coated lens-side reflects sun rays 10 onto the surface of solar panel 40. The output current of panel 40 was observed to be 1.87 A, compared with an output current of 1.20 A from panel 45. This amounts to a 56% increase, again with a distribution of rays on the solar panel 40 surface which advantageously causes no burning of the cells.

In another embodiment, both the color and/or the sheen of the coating may either be applied to the refractive elements or to the smooth side of the refractive-reflective sheet. Coloring the refractive side may produce more or less reflection onto the panel than coloring the smooth side which could be at the bottom (as the sheet is placed on the ground with the refractive-side facing up). The color may be varied in order to control the amount of light reflected off the refractive-reflective sheet and onto the solar panel. Advantageously, this allows the lens to be produced with a controlled reflective output as well as create an aesthetic addition to the refractive-reflective sheet, which is a visible component of the solar panel system. The coloration may be added to the manufacturing process whereby the material is produced in that color or colors, and does not need to be painted. The colors may be variegated whereby multiple colors are used, and the sheen may also be mixed, thereby creating a camouflage effect for the refractive-reflective sheet. This allows the refractive-reflective sheet to blend into the background, serve as dazzle camouflage where high contrast images may break up the outline of the refractive-reflective sheet, or simply serve as architectural color selection to help blend or contrast to the structure or environment, of a combination thereof. The coloring may also be used for advertising, artwork, simulated roof structures such as roof tiles or bricks.

Figure 14:
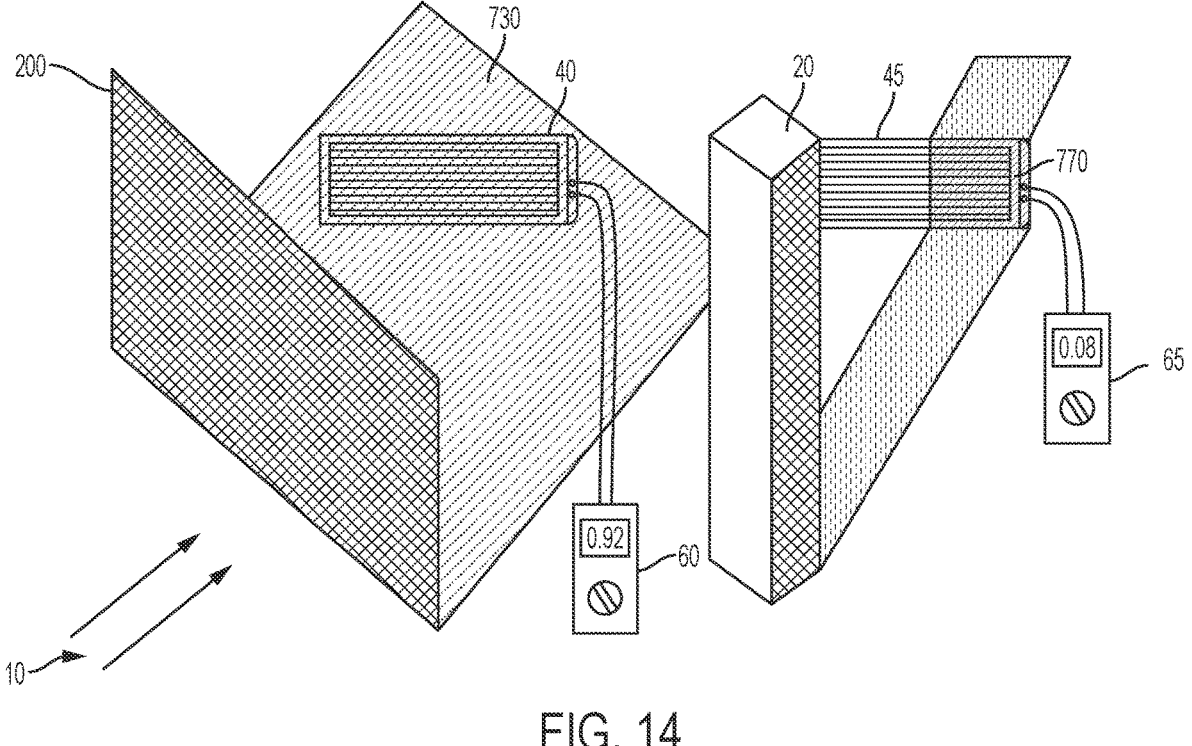
FIG. 14 is a perspective view of a system of solar panels similar to that of FIG. 1A for comparing the effect of the shadow cast by an upstanding refractive-reflective sheet and that of an opaque object, on the power produced by a solar panel.

FIG. 14 is a perspective view of a system of solar panels wherein a refractive-reflective sheet is 200 placed in front of a panel 40 upon which no shadow of an object is cast, and a shadow 770 of an object 20 is cast upon another panel 45. The sheet 200 casts a mild shadow 730 on panel 40. The system compares the current generated by solar panel 40 having the refractive-reflective sheet 200 placed to the front thereof, with that generated by solar panel 45 upon which the shadow 770 of object 20 is cast. As can be seen, panel 40 produces 0.92 A while panel 45 produces only 0.08 A.

Accordingly, the reduction in current generation as a result of placing the refractive-reflective sheet 200 in front of panel 40 is minimal compared with the reduction caused by even a partial shadow 770 of object 20 on panel 45.

Figure 15A:
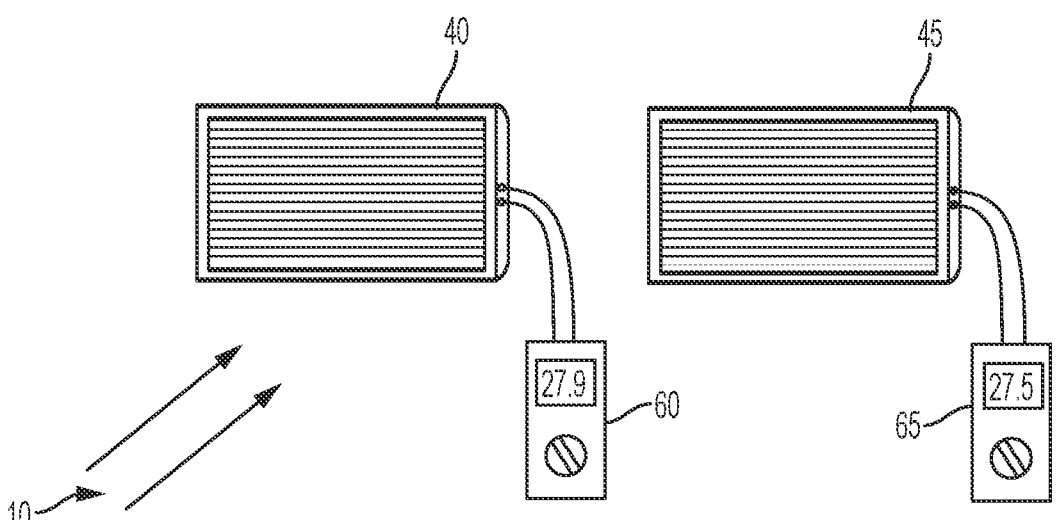
FIG. 15A is a system of two thin-film 7-watt solar panels shown with voltage measurements for establishing a baseline for comparison.
Figure 15B:
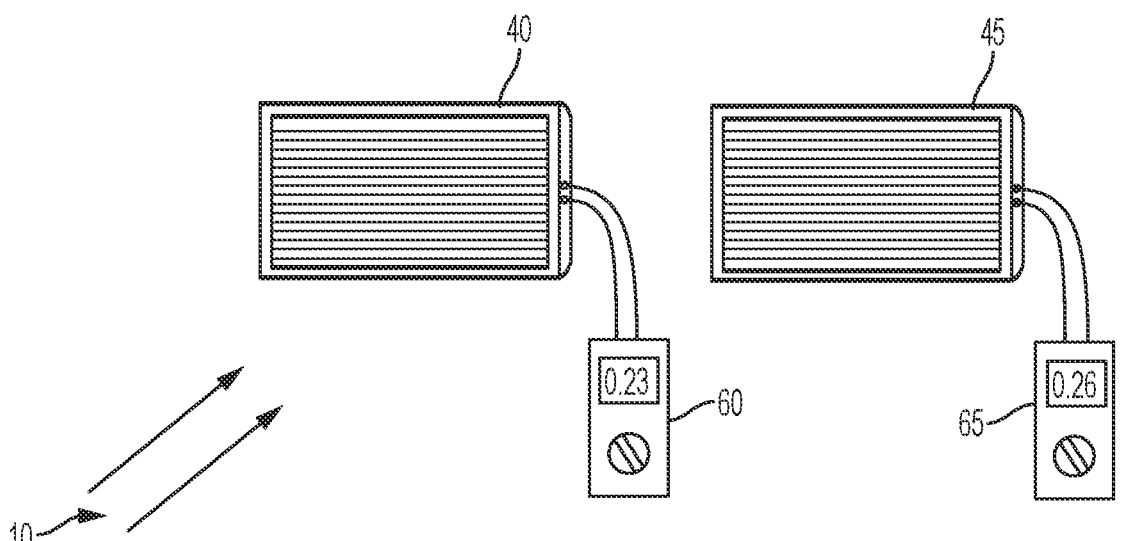
FIG. 15B is the system of solar panels of FIG. 15A shown with current measurements for establishing a baseline for comparison.

FIG. 15A and FIG. 15B show a system of two thin-film 7 W solar panels for use in testing the embodiments of the present invention. In FIG. 15A multimeters 60 and 65 were configured for voltage measurement. It was established that panel 40 produces 27.9V and panel 45 produces 27.5V. In FIG. 15B multimeters 60 and 65 were configured for current detection. It was found that panel 40 produced 0.23 A, while panel 45 produced 0.26 A. Those minor variations of generated voltage and current between panel 40 and panel 45 can be attributed to manufacturing differences.

Figure 16A:
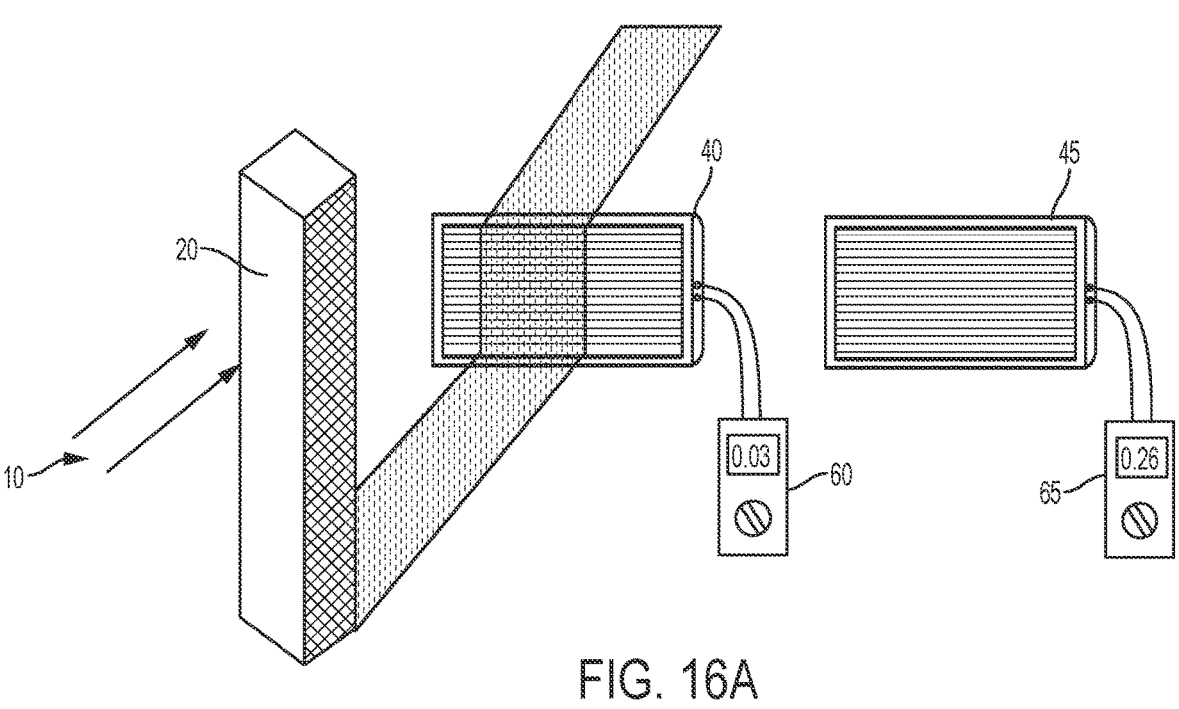
FIG. 16A is the system of solar panels of FIG. 15A with a shadow of an object cast upon one of the two solar panels shown with current measurements.
Figure 16B:
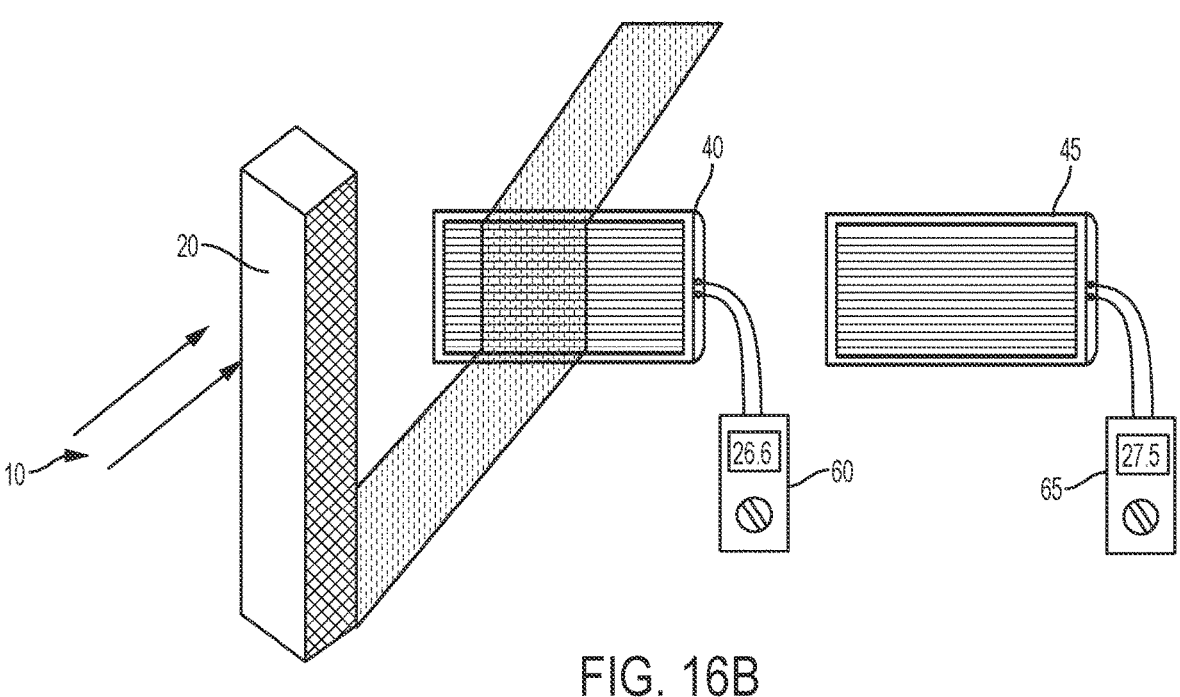
FIG. 16B is the system of solar panels of FIG. 16A shown with voltage measurements.

FIG. 16A and FIG. 16B show the system of FIG. 15A and FIG. 15B with a shadow of an object 20 cast upon solar panel 40. In FIG. 16A, it was found that solar panel 45 produced 0.26 A with no change from FIG. 15B, while solar panel 40, being partially obscured by the shadow of object 20, produced only 0.03 A compared with 0.23 A in FIG. 15A. With reference to FIG. 16B, it was observed that the voltage from panel 40 dropped from 27.9V to 26.6V, while panel 45 remained at 27.5V. By computing the power, which is the produce of voltage and current, it was found that for solar panel 40, the power equals 26.6V*0.03 A=0.798 W. By comparison, the power for the same solar panel 40 in the system of FIG. 15A and FIG. 15B was 27.9V*0.23 A=6.417 W. Accordingly, the shadow caused the power of solar panel 40 to drop to around 12.43% of the power produced in the no-shadow case.

Figure 17A:
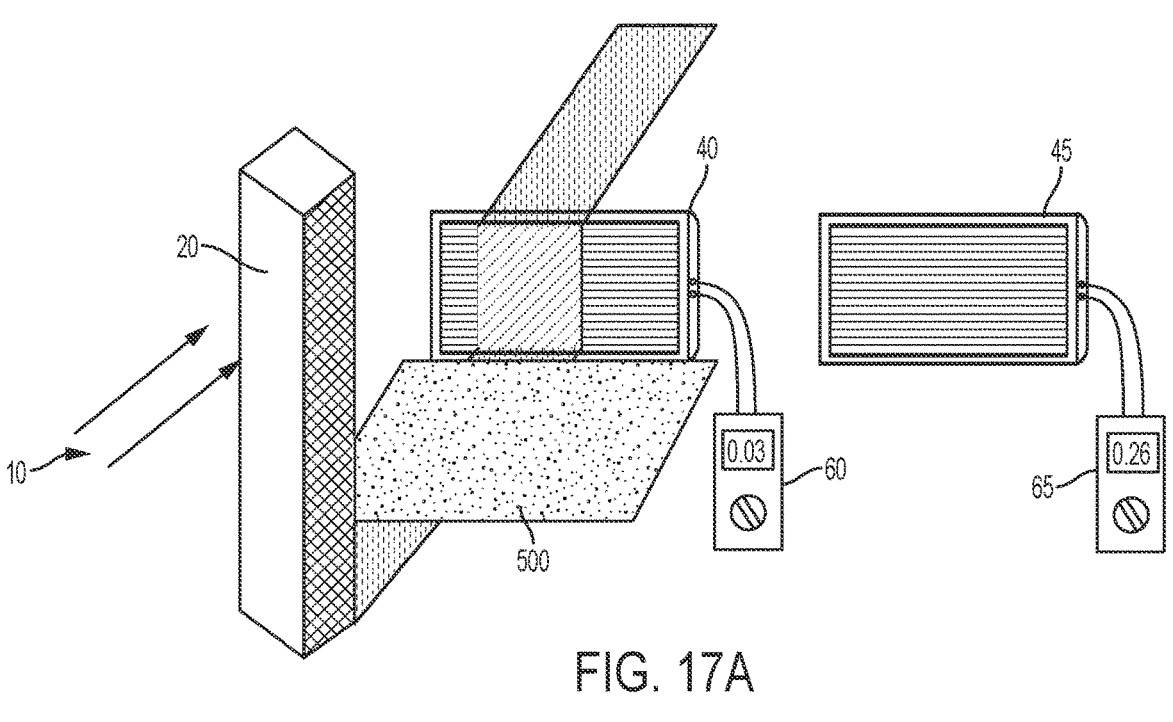
FIG. 17A is the system of solar panels of FIG. 16A including a reflective panel such as a mirror placed on the ground to the front of a solar panel near the lower edge thereof, shown with current measurements.
Figure 17B:
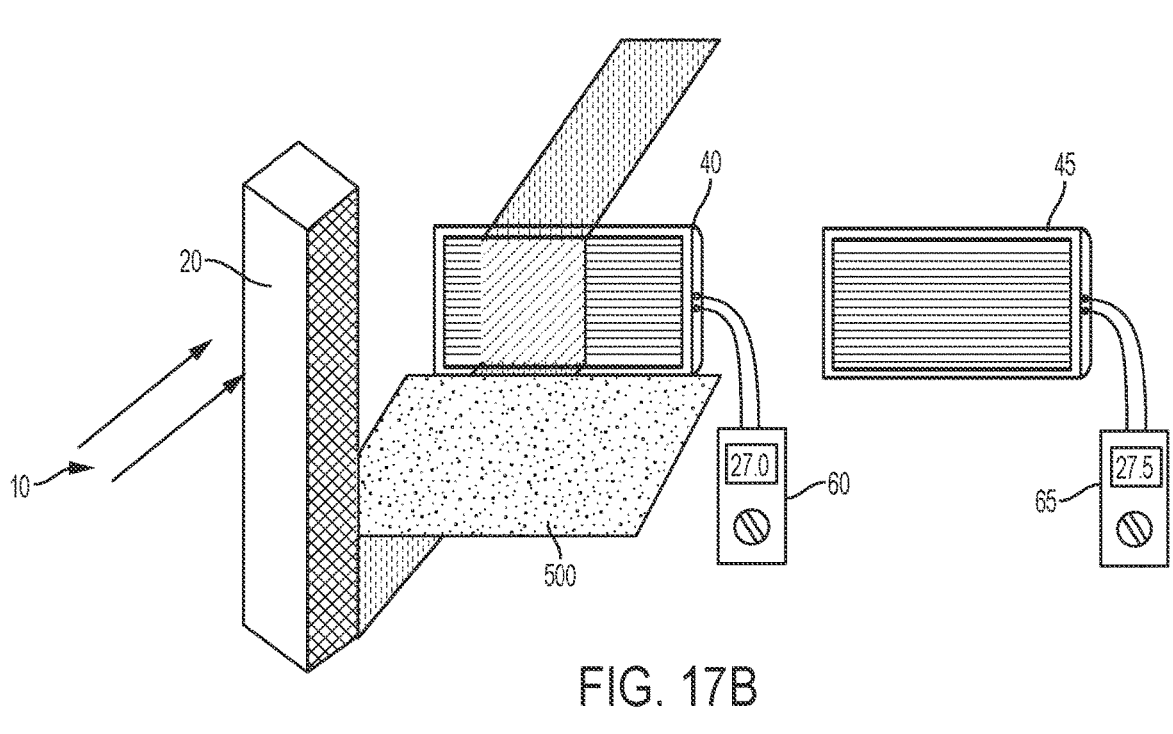
FIG. 17B is the system of solar panels of FIG. 17A but shown with voltage measurements.

FIG. 17A and FIG. 17B show a system in which a reflective panel 500 such as a mirror is placed in front of and near the lower edge of panel 40 for reflecting sunlight 10 onto the surface of panel 40. With a mirror the voltage produced by panel 40 was found to be 27.0V. However, there was no change in the current, as shown in FIG. 17A. Accordingly, the power produced by solar panel 40 was 27.0*0.03=0.81 W which is around 12.6% of the power produced by the same solar panel in FIG. 15A and FIG. 15B with no shadow. Accordingly, the mirror did not significantly improve the power produced by panel 40 in the presence of a shadow.

Figure 18A:
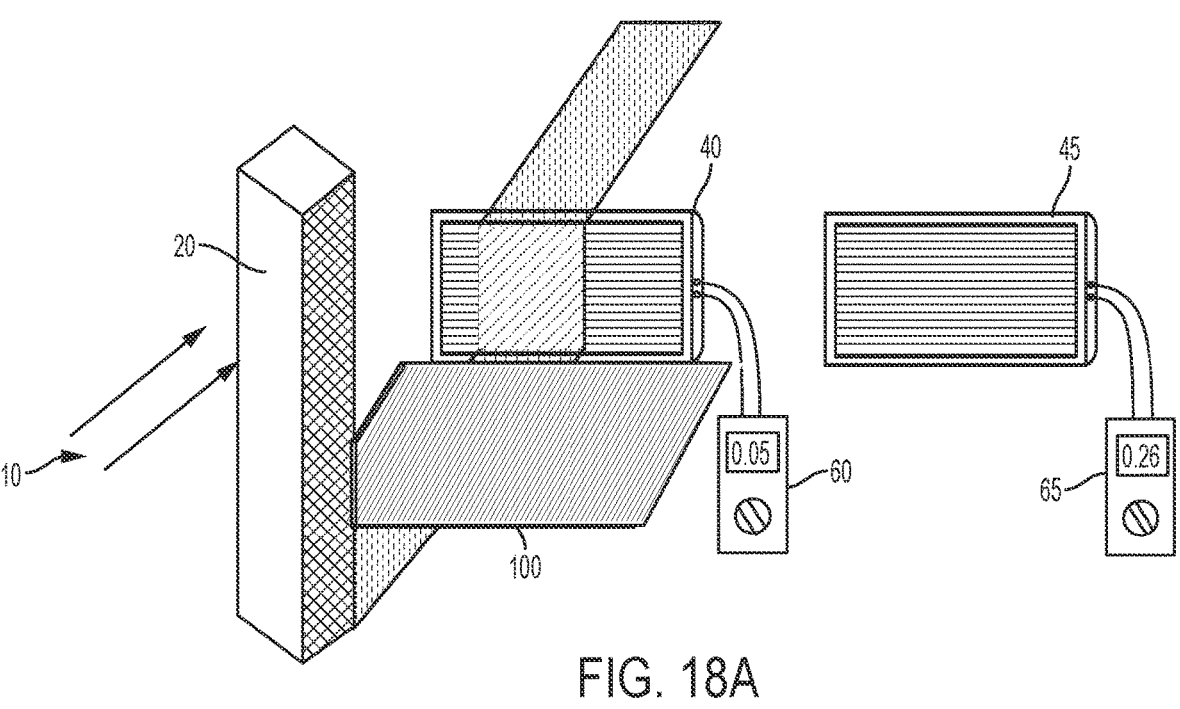
FIG. 18A is the system of solar panels of FIG. 16A including a refractive-reflective sheet placed on the ground to the front of a solar panel near the lower edge thereof, shown with current measurements.
Figure 18B:
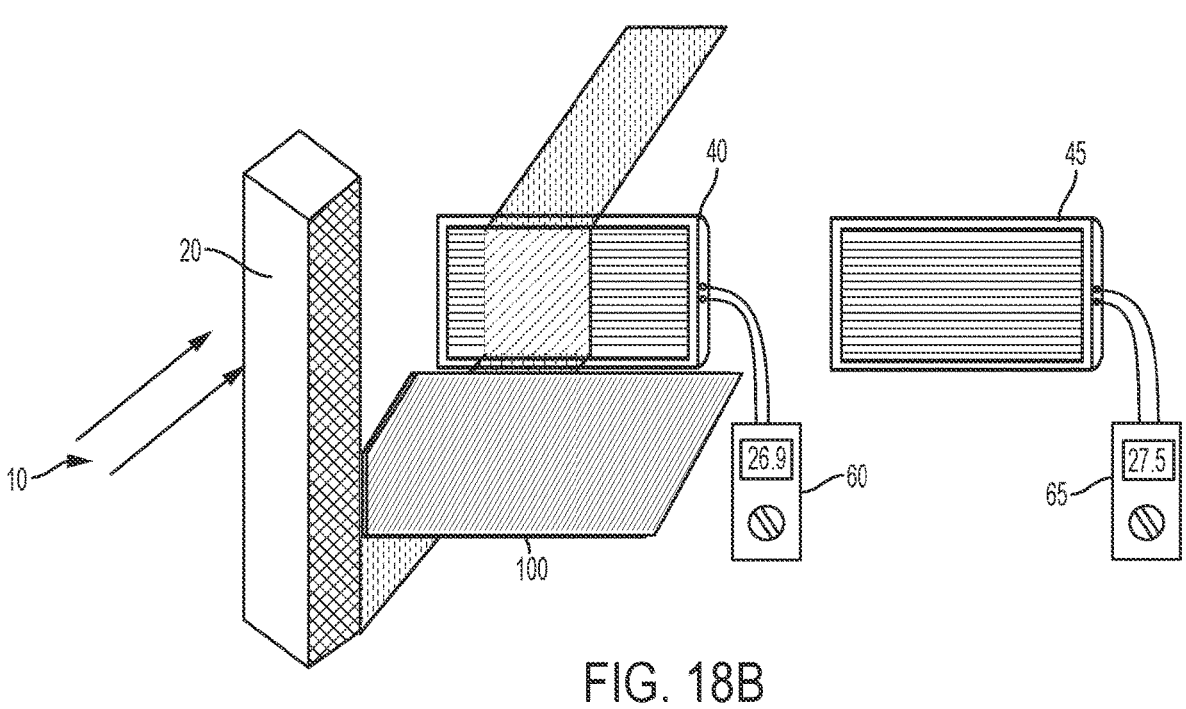
FIG. 18B is the system of solar panels of FIG. 18A shown with voltage measurements.

FIG. 18A and FIG. 18B show the system of FIG. 15A and FIG. 15B wherein a refractive-reflective sheet 100 is placed in front of and near the lower edge of panel 40 for reflecting sunlight 10 onto the surface of panel 40. In this case the measured current from solar panel 40 was 0.05 A, and the voltage was 26.9V. Accordingly, the power was 1.345 W which is around 21% of the non-shadow power produced by panel 40 in the system of FIG. 15A and FIG. 15B. Therefore, the refractive-reflective sheet 100 which may be a linear lenticular sheet or a similar sheet improves the power produced by panel 40 in the presence of a shadow.

Figure 19A:
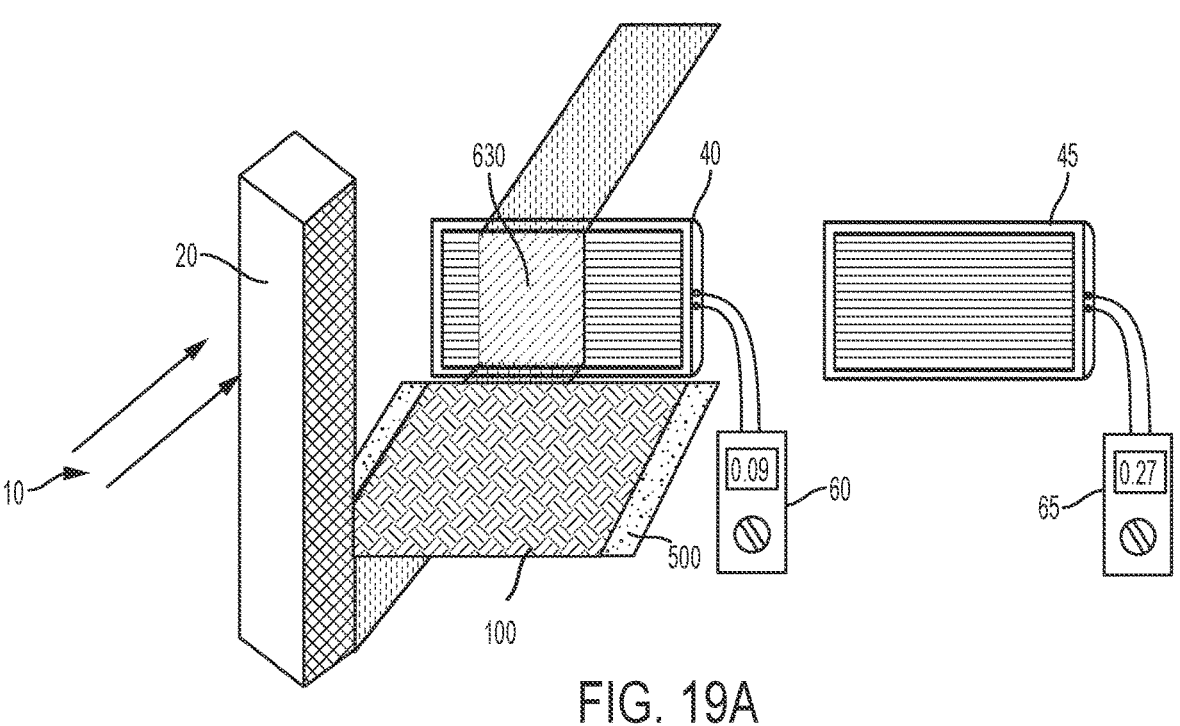
FIG. 19A is the system of solar panels of FIG. 16A including a reflective panel such as a mirror placed on the ground to the front of a solar panel near the lower edge thereof and a refractive-reflective sheet on top of the reflective panel, shown with current measurements.
Figure 19B:
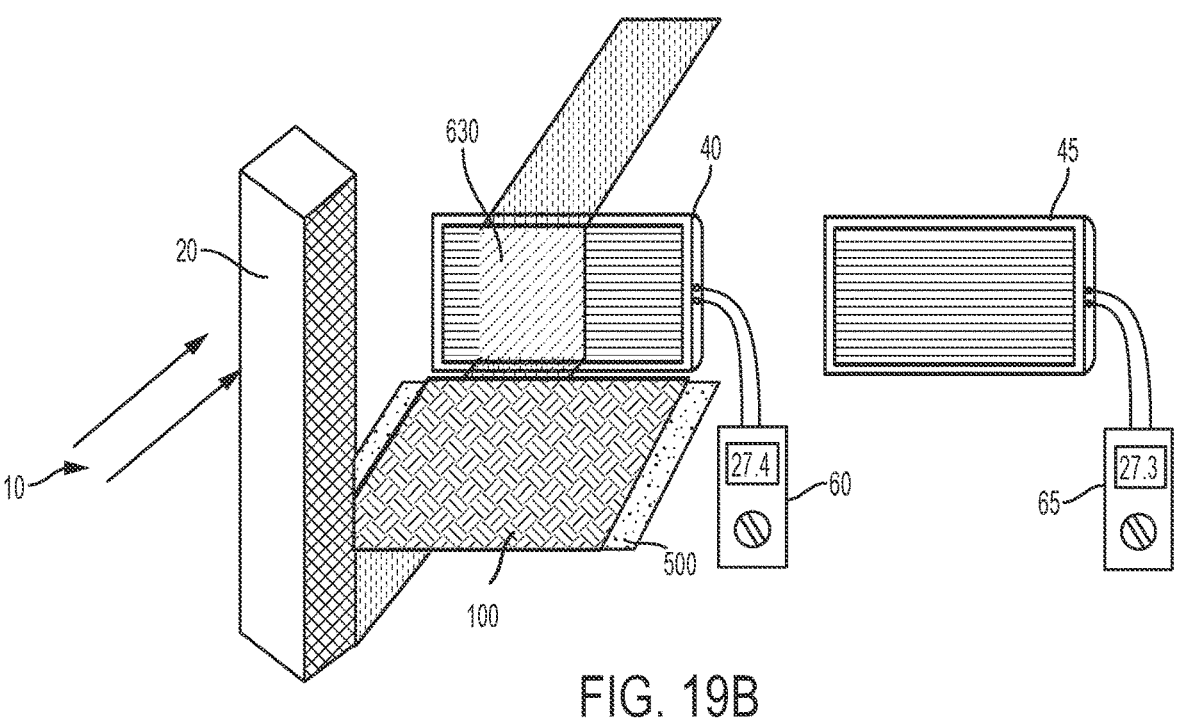
FIG. 19B is the system of solar panels of FIG. 19A, shown with voltage measurements.

FIG. 19A and FIG. 19B show the system of FIG. 15A and FIG. 15B wherein a refractive-reflective sheet 100 is stacked on top of a reflective panel 500, and both placed in front of and near the lower edge of panel 40 for reflecting sunlight 10 onto the surface of panel 40. In this case, the measured current form solar panel was 0.09 A, and the voltage was 27.4V. Accordingly, the power produced by solar panel 40 is 27.4V*0.09 A=2.466 W which is around 38% of the power produced by the same solar panel in the non-shadow configuration of FIG. 15A and FIG. 15B. Therefore, it can be seen that the combination of a reflective panel 500 and a refractive-reflective sheet stacked on top of it more effectively reduce the power lost by having a shadow cast on the solar panel. The shadow 630 formed on the surface of panel 40 is illuminated by sunlight both reflected by reflective panel 500 and refracted/spread out by refractive-reflective sheet 100, which may be a linear lenticular sheet or a similar material.

Figure 20A:
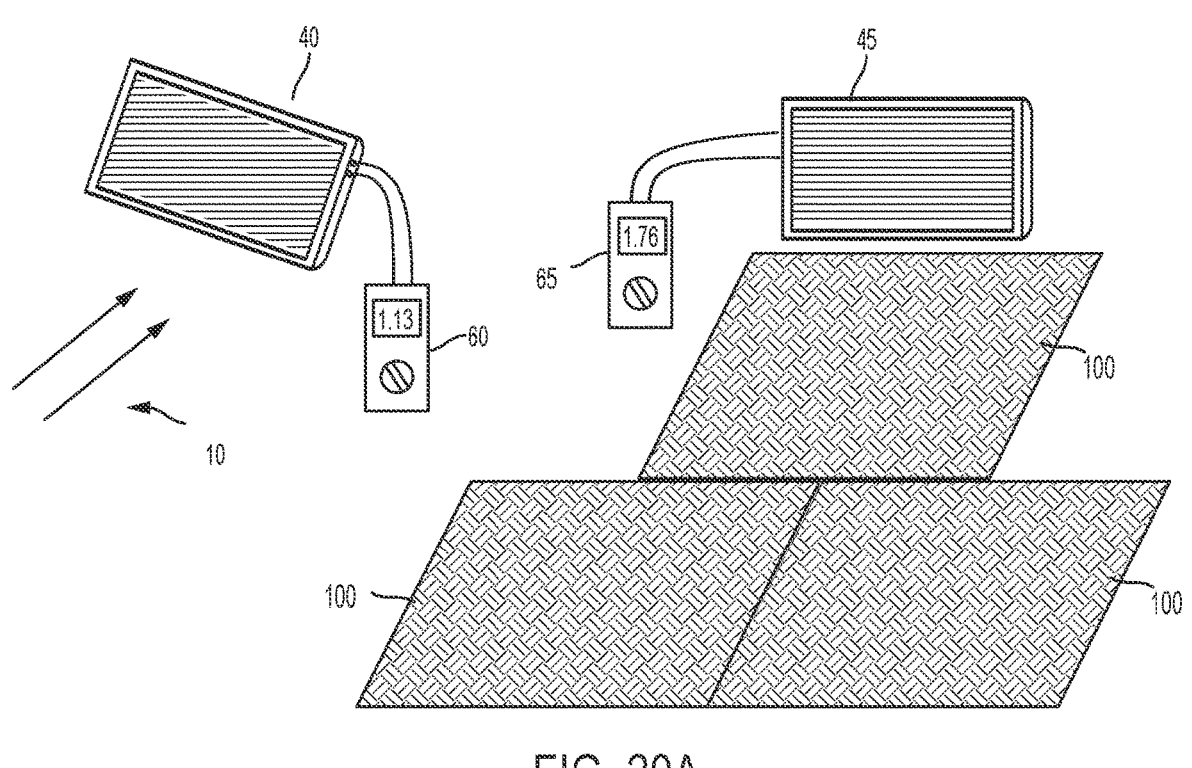
FIG. 20A is a system of solar panels as in FIG. 15A including three refractive-reflective sheets placed on the ground to the front of and at a right angle to a solar panel near the lower edge thereof, shown with current measurements.
Figure 20B:
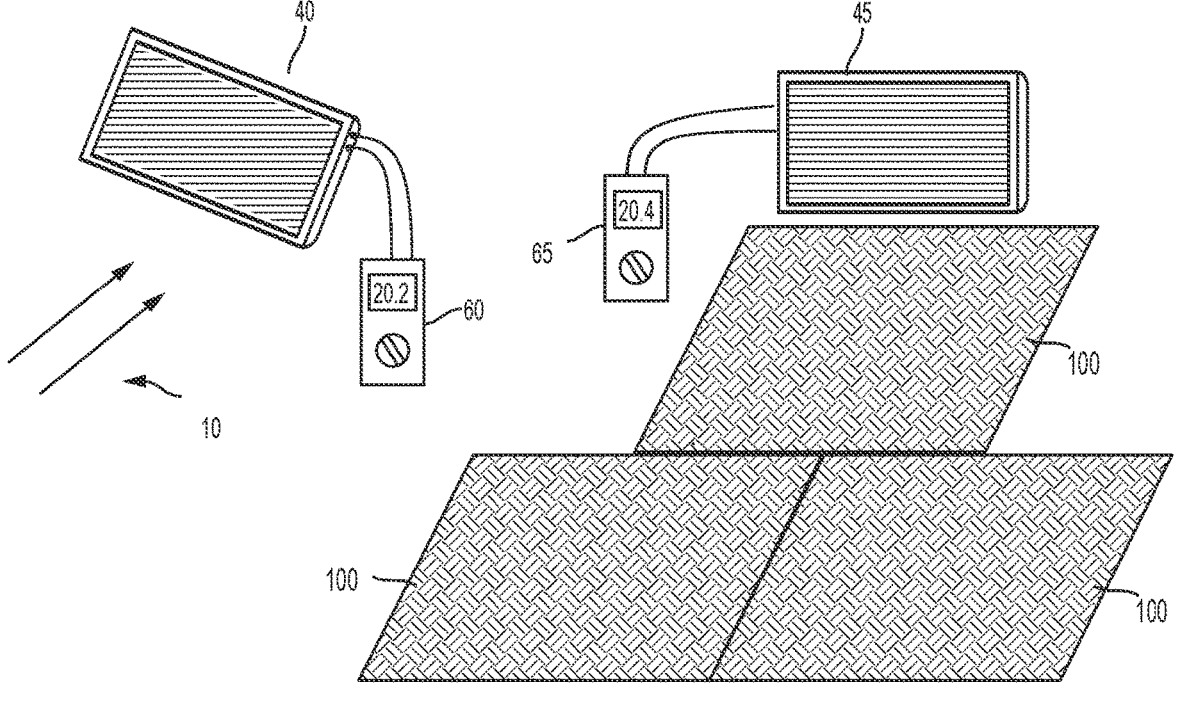
FIG. 20B is the system of solar panels of FIG. 20A shown with voltage measurements.

FIG. 20A and FIG. 20B show a system of two 30 Watt Monocrystalline solar panels 40 and 45. Three refractive-reflective sheets 100 were placed to the front of solar panel 45. A first sheet was placed near the lower edge of solar panel 45, and two adjacent sheets were placed adjacent the first sheet, as shown. Additionally, panel 45 was angled at approximately 90 degrees with respect to the sheets. Current measurements showed 1.76 A produced by panel 45, compared with 1.13 A produced by panel 40. Panel 45 showed a voltage of 20.4 whereas panel 40 produced 20.2 volts. Therefore power produced by panel 45 was 35.90 W, whereas power produced by panel 40 was only 22.83 W. Accordingly, the use of three refractive-reflective sheets as shown, as well as having the solar panel placed perpendicular to the sheets have produced 57% more power under similar sunlight conditions.

Figure 21:
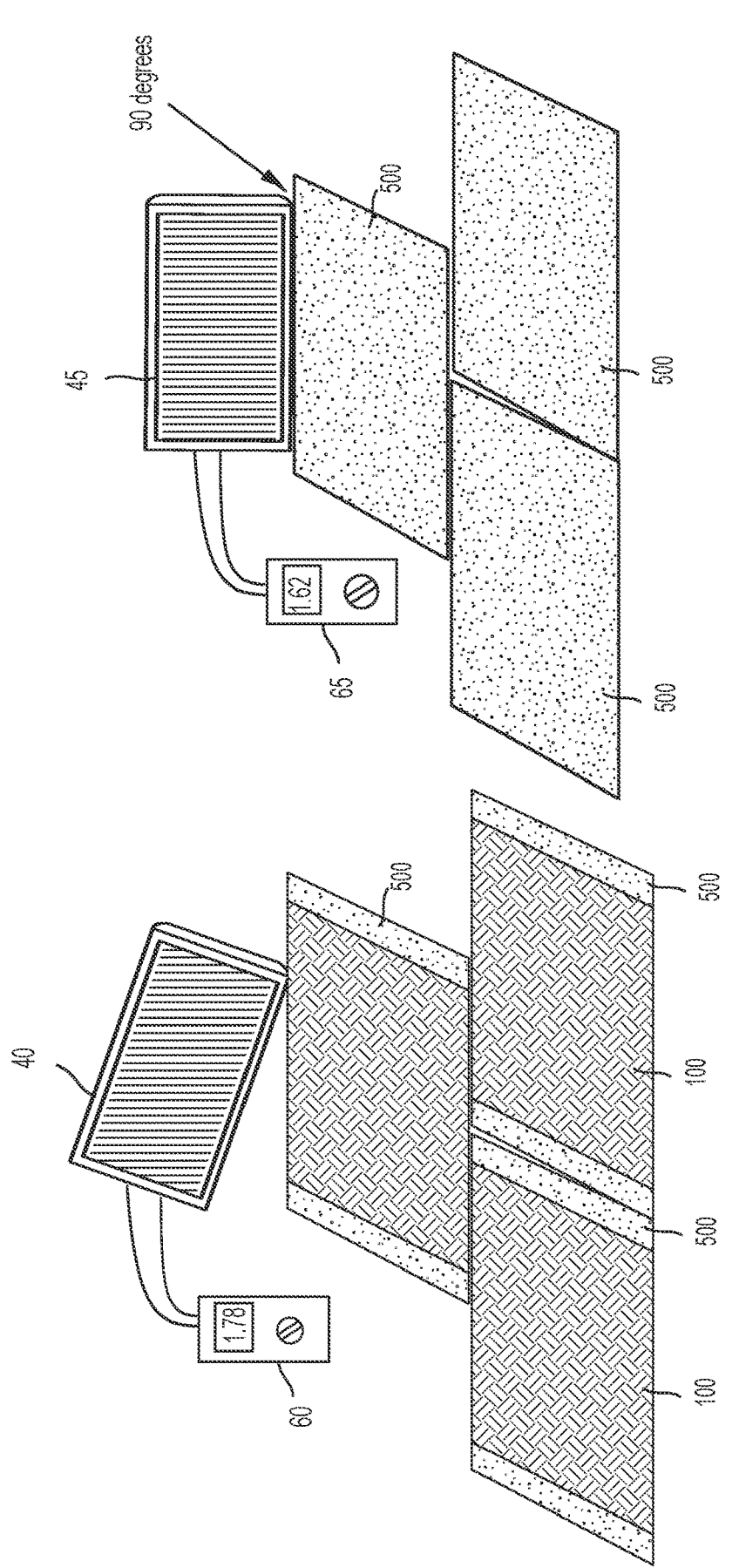
FIG. 21 is a system of solar panels including three reflective panels placed on the ground to the front of a first solar panel near the lower edge thereof and having a right angle thereto, and three reflective panels each having a refractive-reflective sheet on a top thereof placed on the ground to the front of a second solar panel near the lower edge thereof and having an optimal angle thereto.

FIG. 21 shows a system of two solar panels 40 and 45. Three reflective panels 500 (such as mirrors) were placed to the front of panel 45 in the same manner as described above with reference to FIG. 20A and FIG. 20B. Three reflective panels 500 (such as mirrors) each having a refractive-reflective sheet 100 stacked on it, were placed to the front of panel 40 in the same manner as that of the three reflective panels placed to the front of panel 45. Solar panel 45 was placed at a 90 degree angle to the reflective panels. Solar panel 40 was placed at an optimal angle (which reflects more sunlight onto the panel) to the sheets. It was found that solar panel 45 produced a current of 1.62 A whereas solar panel 40 produced a current of 1.78 A. It was also found that solar panel 45 produced a voltage of 20.5V while solar panel 40 produced a voltage of 20.4V.

Figure 22:
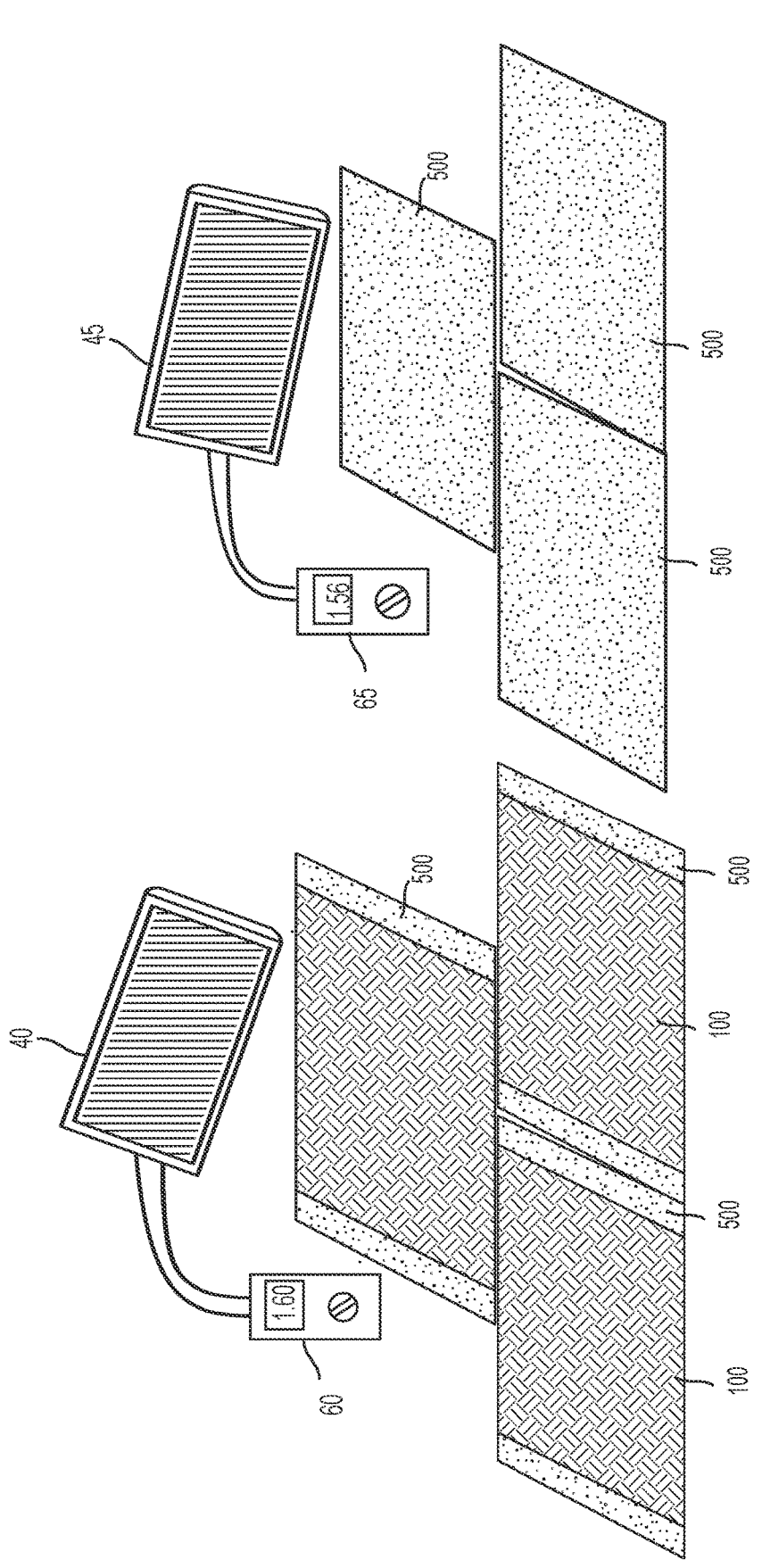
FIG. 22 is a system of solar panels similar to the system of FIG. 21 but with both panels having an optimal angle to the reflective panels.

FIG. 22 shows a system of two solar panels, similar to that of FIG. 21 except that both panel 40 and panel 45 are placed at an optimal angle (which reflects more sunlight on the panels). In this case, panel 45 produced 1.56 A and 20.8V while panel 40 produced 1.60 A and 20.6V. Accordingly, panel 45 produced 32.45 W while panel 40 produced approximately 33 W.

Figure 23:
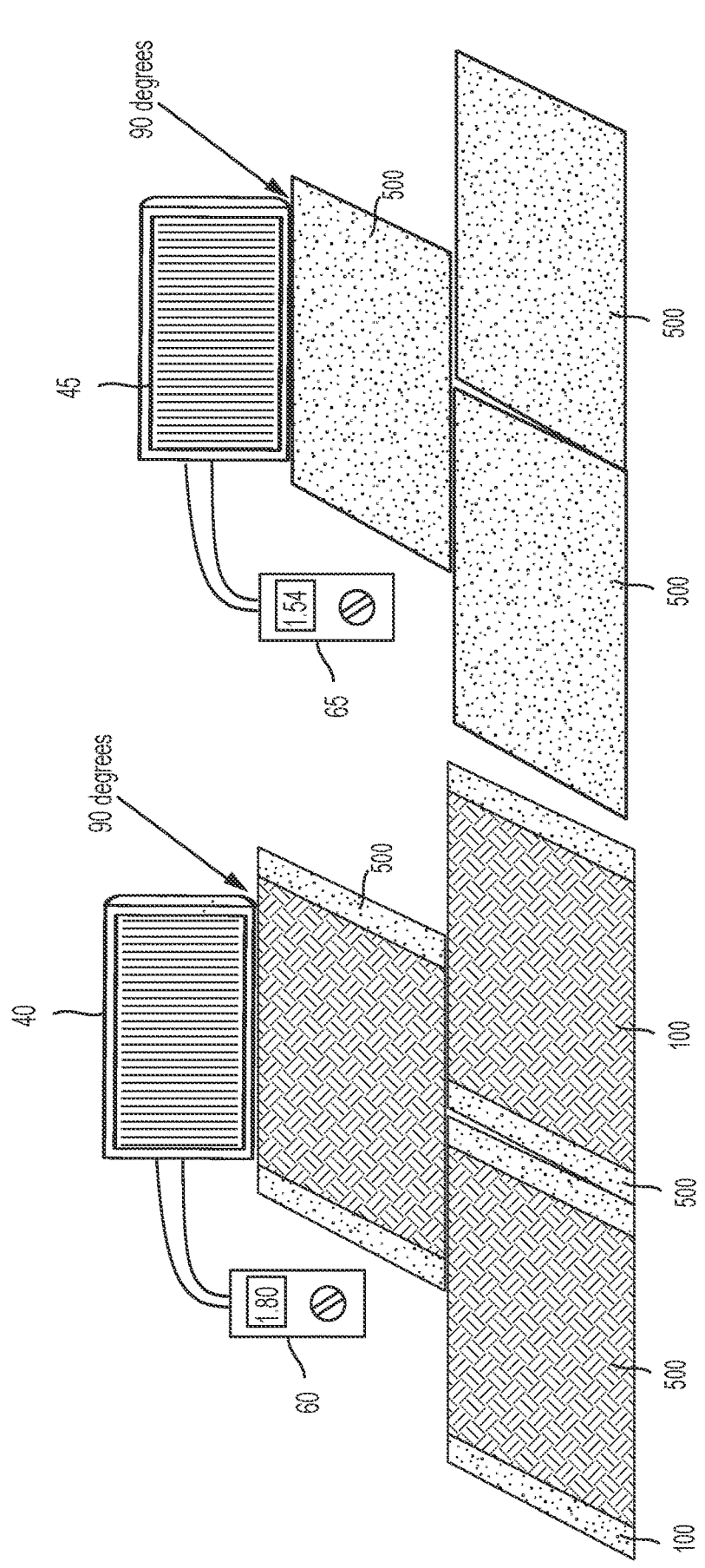
FIG. 23 is a system of solar panels similar to the system of FIG. 21 but with both panels having a right angle to the reflective panels.

FIG. 23 shows a system of two solar panels, similar to that of FIG. 21 except that both panel 40 and panel 45 are placed at a 90 degree angle. Panel 40 produced 1.8 A while panel 45 produced 1.54 A. Accordingly, the reflective panel with refractive-reflective material on top of it produces more current when the angle is not optimal, while reflective panels, such as mirrors, alone need an optimal angle or the produced current is reduced. Additionally, a 90 degree angle between the solar panel and the material was not the optimal angle for solar power generation using solar panels and mirror boosters.

While studies have shown that by adding reflectors, solar panel output can be increased up to a maximum of 30%, it has been demonstrated that the use of refractive-reflective sheets such as lenticular sheets can accomplish double the results with an improvement of almost 57%, as was shown in the system of FIGS. 20A and 20B. It should be noted that the panels in those figures were at 90 degree angle to the refractive-reflective sheet that was laid flat on the ground. Accordingly, the refractive-reflective sheet was not at the optimal angle for reflection, which is typically used in studies. It was also determined from the experiment of FIGS. 20-23 that 90 degrees is not the optimal angle for orienting solar panels with respect to mirror boosters.

From behind the solar panels, it was verified that the reflective panels, such as mirrors, reflect the sun light from a central point only. However, with the reflective panel having a refractive-reflective sheet, such as a lenticular sheet, on top of it the reflection of sun light is not as intense as the mirrors but is spread across the panel. Therefore it provides a lower intensity but spread over a greater surface area providing more usable sunlight by the solar panel than could otherwise be achieved with mirrors alone.

Additionally, it was found that the angle of reflected light off the refractive-reflective material placed on top of the mirrors was lower than the angle observed with mirrors alone. As the panels were oriented closer to 90 degrees, the current increased from 1.56 A to 1.76 A. However, orienting the panels that way (closer to 90 degrees) caused the current to decrease from 1.62 A to 1.54 A when used with mirrors only. While the optimal angle is variable due to the time and location, it is not limited to 90 degrees, and may be different than the optimal angle observed using standard calculations for solar panels without any amplification.

It was concluded that improvements could be made if the refractive-reflective material and the reflective panel under it were more rigid for producing a more uniform reflectance. Otherwise, irregularities in reflection may be observed as a result of irregularities in the surfaces of the reflective panel and/or the refractive-reflective surface placed on top thereof. Alternatively, a rigid refractive-reflective sheet may have reflective coating applied thereto to produce a uniform reflectance of sun light on the solar panel surface.

Figure 24A:
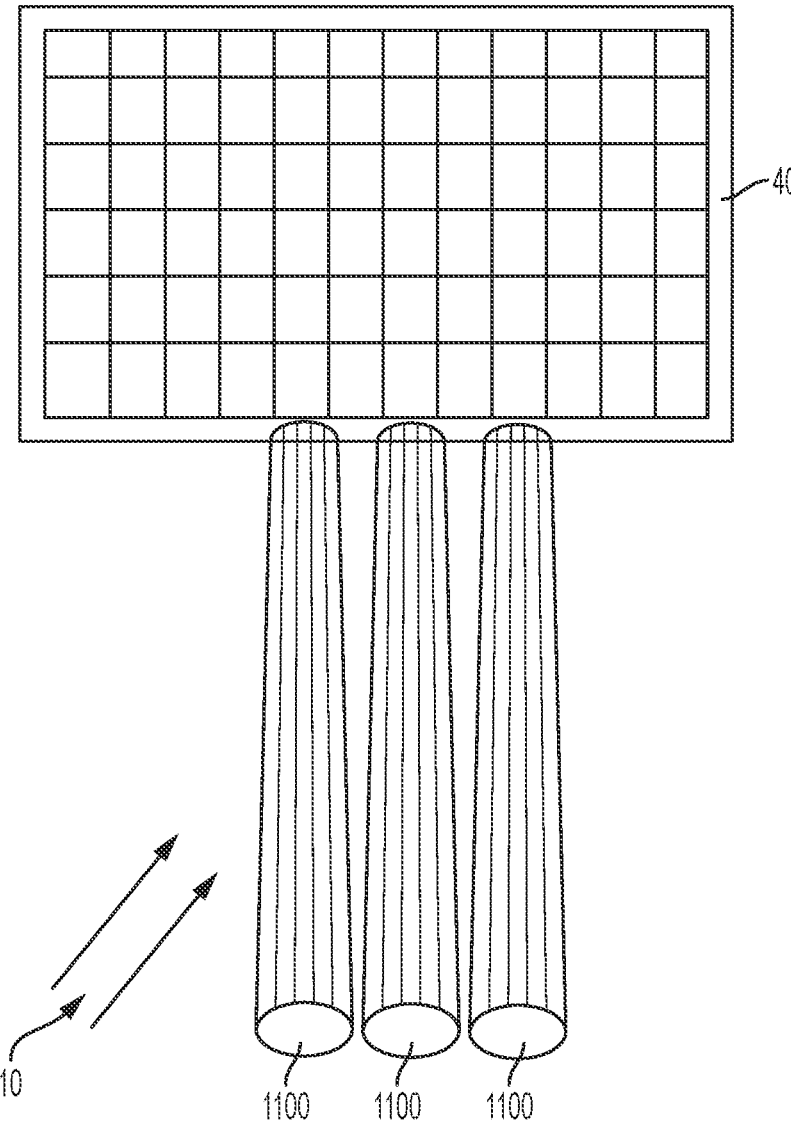
FIG. 24A is a front perspective view of a solar panel with a plurality of refractive-reflective cylinders in accordance with an embodiment of the present invention.

FIG. 24A is a front perspective view of a solar panel with a plurality of refractive-reflective cylinders in accordance with yet another embodiment of the present invention. In this embodiment 3 refractive-reflective cylinders 1100 are placed to the front of solar panel 40. The cylinders 1100 may be comprised of refractive-reflective rectangular sheets each wrapped to form a cylinder and kept in that shape by an adhesive. As an example a lenticular lens sheet may be rolled into a cylindrical tube 1100. Sunlight 10 is reflected off the round external surfaces of cylinders 1100 and is received by the solar panel 40. Solar panel 40 produces more power since it receives both directed and reflected sunlight. The use of more than 3 cylinders 1100 is contemplated. By balancing cost and solar power enhancement an optimal number and size of refractive-reflective cylinders can determined. The cylindrical shape advantageously provides robustness and durability. Additionally debris will not accumulate on the cylinders 1100 and is likely to be deflected off of their outer curved surface. The inner side curved surface of cylinders 1100 may also be coated with reflective material to reflect more sunlight 10 onto the panel 40. The cylinders may also be perforated for self-cleaning, by rain for example.

Figure 24B:
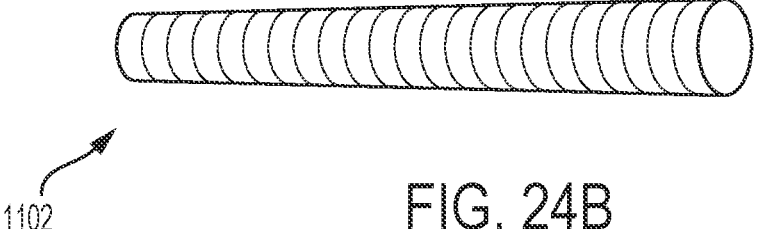
FIG. 24B is a cardboard cylinder made of reflective cardboard material.

FIG. 24B depicts a cylinder 1102 made with an external lateral reflective surface. The reflective cylinder 1102 may be made of cardboard and coated with a shiny metallic substance or have aluminum foil adhered to the external lateral surface thereof. As will be seen below, cylinder 1102 may be sized to fit inside cylinders 1100.

Figures 25A, 25B:
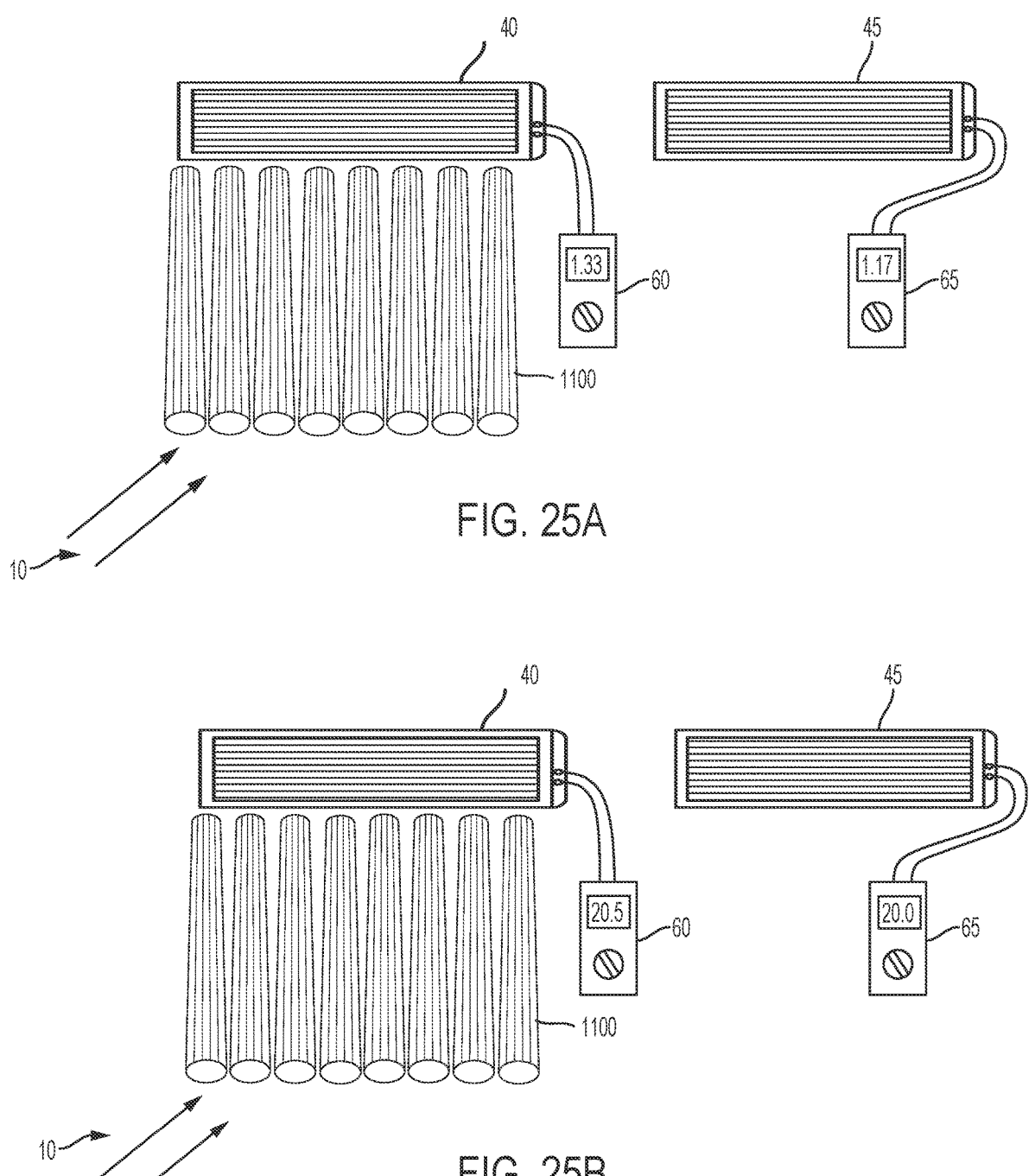
FIG. 25A is a perspective view of a system for comparing the current of a solar panel with refractive-reflective cylinders positioned in front of and near the solar panel's lower edge with a control solar panel.
FIG. 25B is a perspective view of a system for comparing the voltage of a solar panel with refractive-reflective cylinders positioned in front of and near the solar panel's lower edge, as shown in FIG. 25A, with a control solar panel.

FIG. 25A is a system for comparing the performance of a solar panel 40 with refractive-reflective cylinders 1100 placed to the front thereof with a regular (control) solar panel 45. The observed output current from panel 40 which has 8 refractive-reflective or lenticular cylinders 1100 placed in front of and near the lower edge thereof was 1.33 A. Compared with the output current of solar panel 45, the increase in output current was about 13.5%. FIG. 25B shows voltage measurements for the system of FIG. 25A and the measurements indicate largely similar voltage produced by panels 40 and 45.

Figures 26A, 26B:
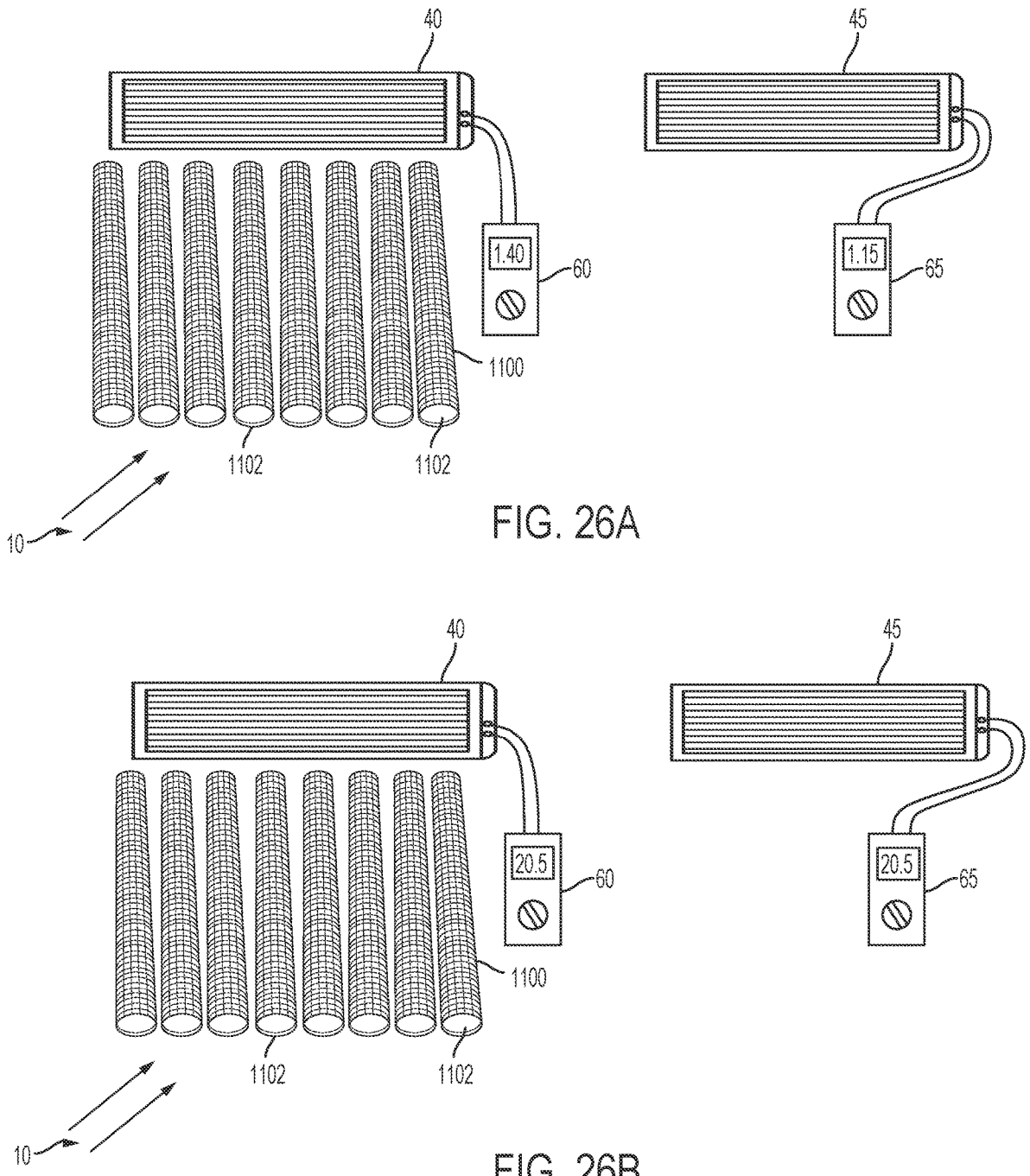
FIG. 26A is a perspective view of a system similar to that of FIG. 25A wherein the refractive-reflective cylinders are additionally fitted with cylinder made of reflective cardboard material as shown in FIG. 24B, shown with current measurements.
FIG. 26B is a perspective view of a system similar to that of FIG. 26A, shown with voltage measurements.

FIG. 26A is a system similar to that of FIG. 25A wherein the refractive-reflective cylinders 1100 are additionally fitted with the cylinders 1102 having an external reflective coating, in accordance with an embodiment of the present invention. With the addition of the cylinders 1102 having an external reflective coating inside the eight refractive-reflective cylinders 1100, the output power of solar panel 40 was observed to be 1.40 A. Accordingly, the output power was increased by adding a reflective panel to further reflect additional sun rays on the surface of solar panel 40. FIG. 26B shows voltage measurements for the system of FIG. 26A and the measurements indicate largely similar voltage produced by panels 40 and 45.

Figure 27A:
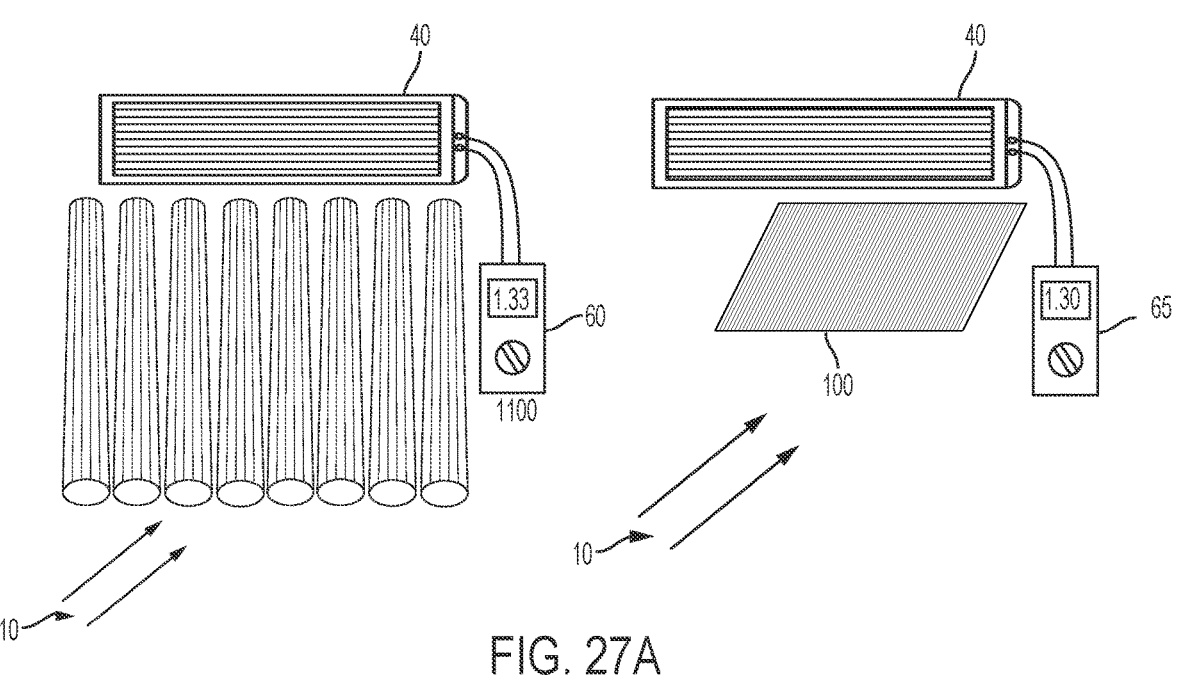
FIG. 27A is a perspective view of a system for comparing the performance of a solar panel with refractive-reflective cylinders positioned in front of and near the lower edge of the solar panel as shown in FIG. 25A, with that of another solar panel having a refractive-reflective sheet placed in front of and near the lower edge of the solar panel, shown with current measurements.
Figure 27B:
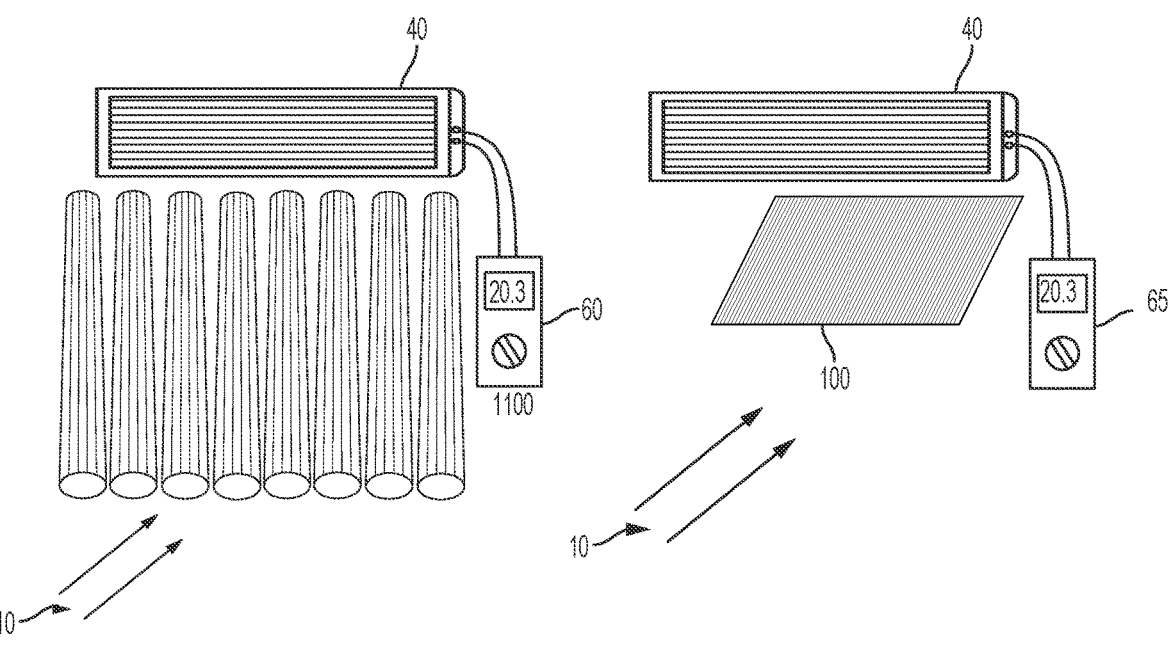
FIG. 27B is a perspective view of a system similar to that of FIG. 27A, shown with voltage measurements.

FIG. 27A is a perspective view of a system for comparing the performance of a solar panel 40 with refractive-reflective cylinders 1100 positioned in front of and near the lower edge of the solar panel 40 as shown in FIG. 24, with a solar panel having a refractive-reflective sheet 100 placed in front of and near the lower edge of the solar panel 45. The output current of solar panel 40 was observed to be 1.33 A, while that of solar panel 45 has been observed to be 1.30 A. Given that only eight cylinders were used but more could have been added, it is expected that increasing the number of cylinders may increase the output current of panel 40 as well. FIG. 27B shows voltage measurements for the system of FIG. 27A (also having eight cylinders) and the measurements indicate largely similar voltage produced by panels 40 and 45.

Figure 28:
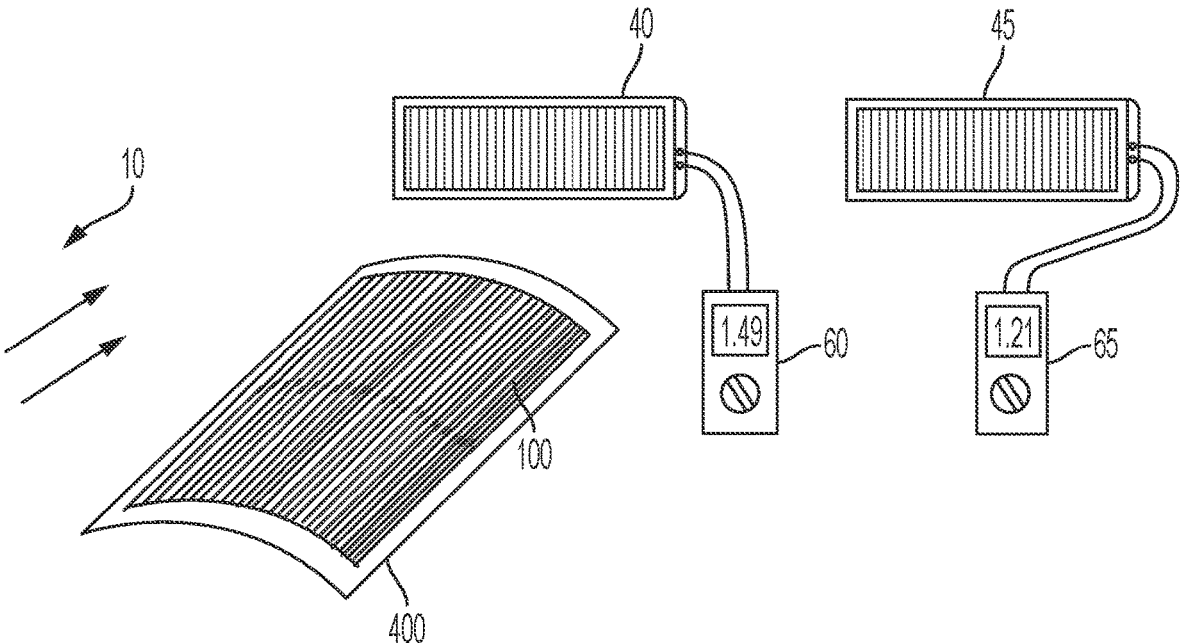
FIG. 28 is a perspective view of a system of solar panels with one panel having a transparent riot shield having a refractive-reflective sheet attached thereto for reflecting sun rays, the shield disposed to the front and near the lower edge of one of the solar panels.

FIG. 28 is a perspective view of a system of two solar panels. A transparent riot shield 400 having a refractive-reflective sheet 100 placed on top of it is placed to the front of panel 40 and near the lower edge thereof for reflecting sun rays 10 onto panel 40. The measured current from panel 40 was 1.49 A while that of panel 45 was 1.21. Accordingly the curved riot shield along with the refractive-reflective sheet 100 increased the output current by 23%.

Figure 29:
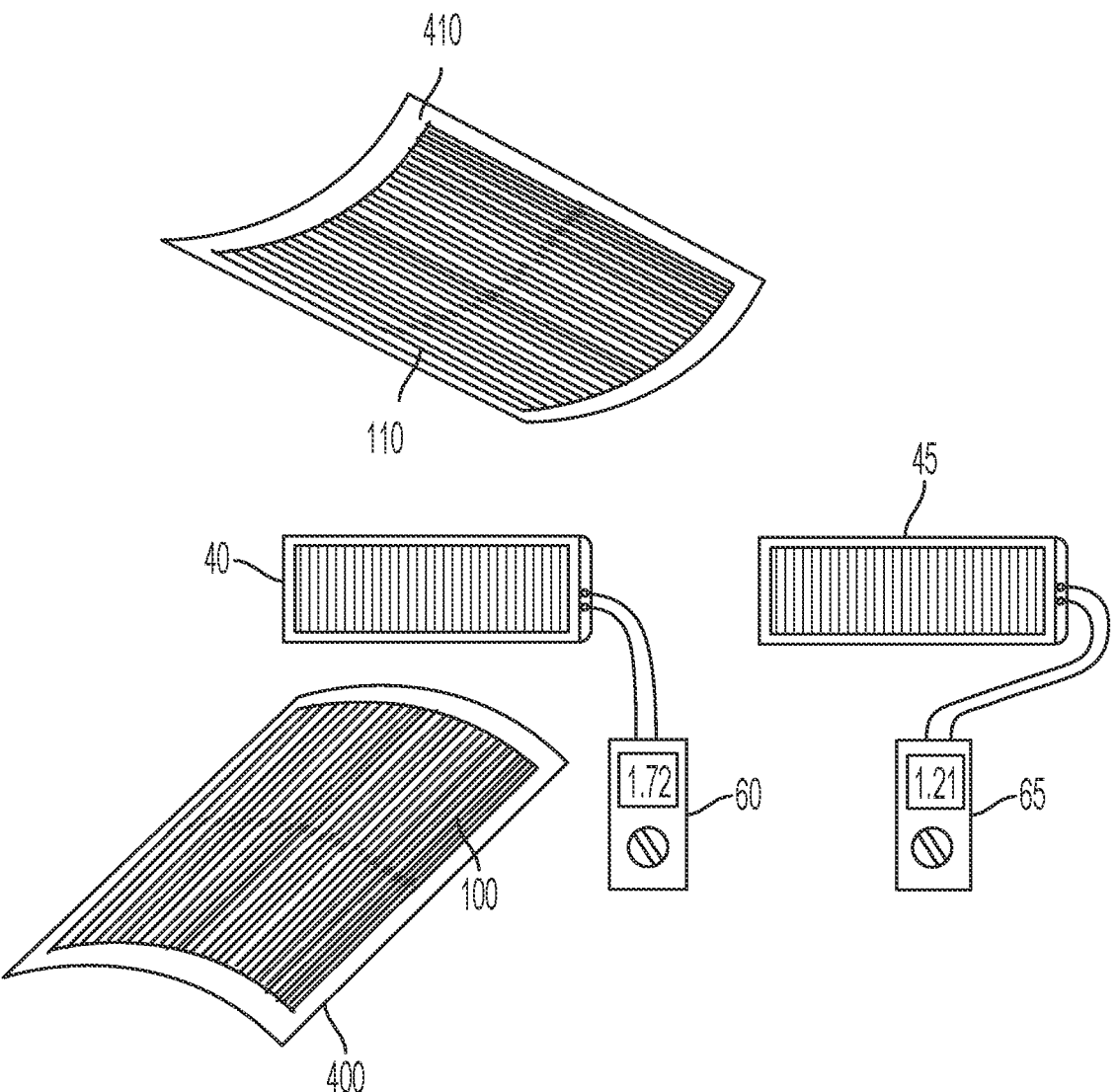
FIG. 29 is a perspective view of a system similar to that of FIG. 28 but having an additional riot shield having a refractive-reflective sheet attached thereto held above the top edge of the same solar panel.

FIG. 29 is a perspective view of a system similar to that of FIG. 28 but featuring an additional riot shield 410 and a refractive-reflective sheet 110 placed thereon with both the shield 410 and sheet 110 disposed above the top edge of panel 40 and oriented to reflect sun rays thereon. The observed current from panel 40 was 1.72 A which is around 42% over the 1.21 A produced by panel 45.

Figure 30:
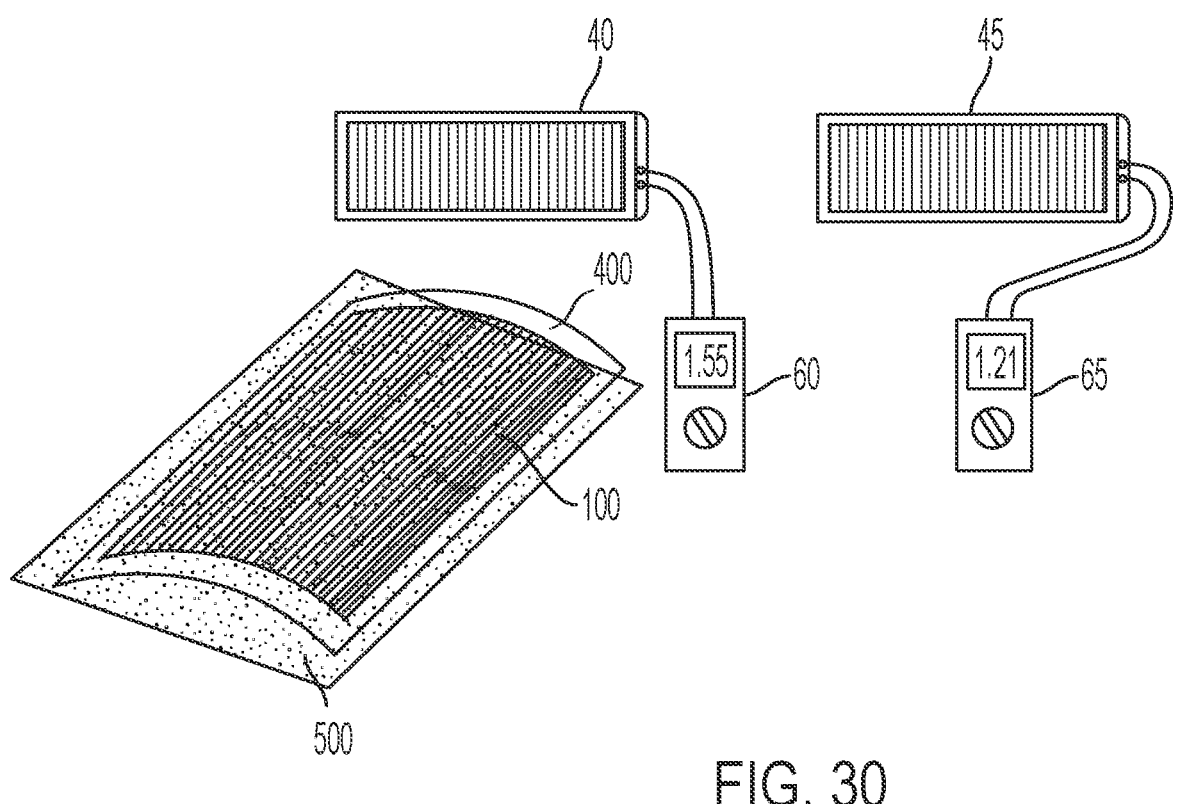
FIG. 30 is a perspective view of a system similar to that of FIG. 28 but having a reflective panel such as a mirror placed under the riot shield.

FIG. 30 is a perspective view of a system similar to that of FIG. 28 but additionally having a reflective panel 500 placed under the riot shield 400. The output current observed by panel 40 was 1.55 A which is 28% higher than the current of 1.21 A produced by panel 45. Compared with FIG. 28, the placement of the reflective panel 500, such as a mirror, under the riot shield caused more sun rays to shine on panel and thus caused panel 40 to generate more current.

Figure 31:
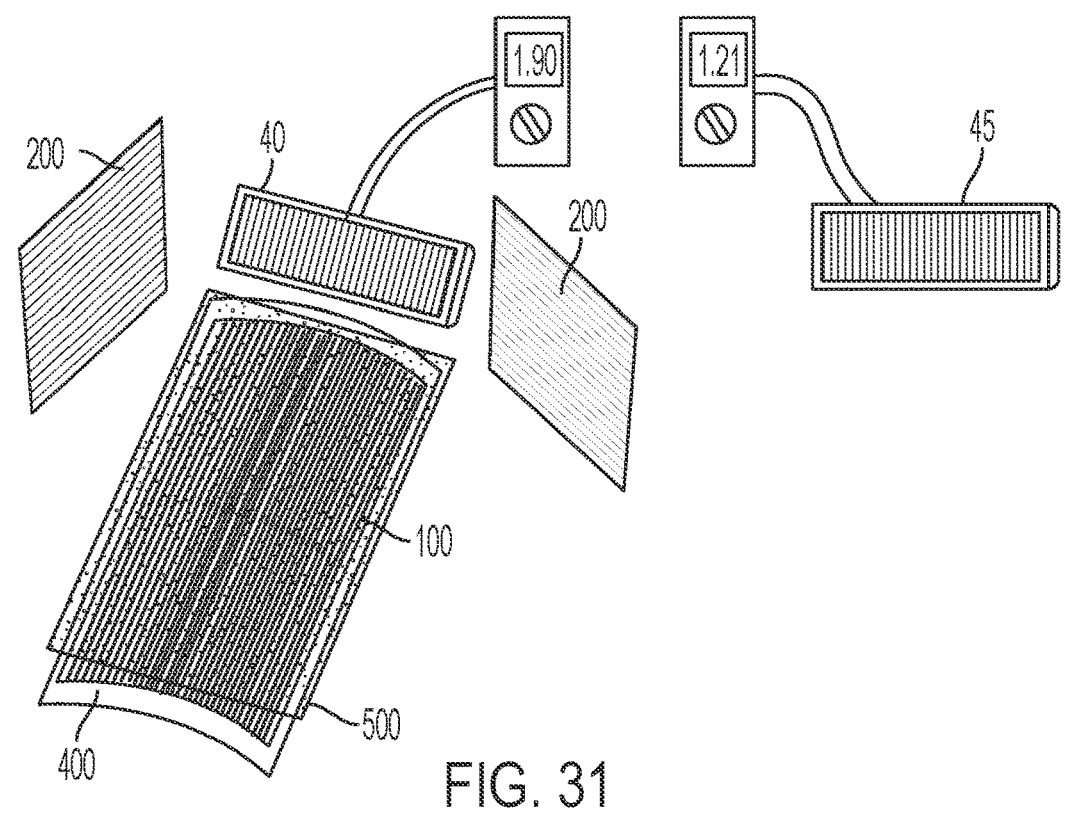
FIG. 31 is perspective view of a system similar to that of FIG. 30 but additionally having two upstanding refractive-reflective sheets placed to the sides of the same solar panel having the riot shield placed to the front thereof.

FIG. 31 is a perspective view of a system similar to that of FIG. 30, but additionally has two upstanding refractive-reflective sheets 200 placed on both sides of solar panel 40 and oriented for reflecting sun rays on panel 40. With this arrangement the current produced by panel 40 was 1.90 A which is 57% higher when compared with 1.21 A produced by panel 45. Accordingly, the addition of the upstanding sheets 200 which are depicted as linear lenticular sheets have caused a significant increase in the output current.

Figure 32:
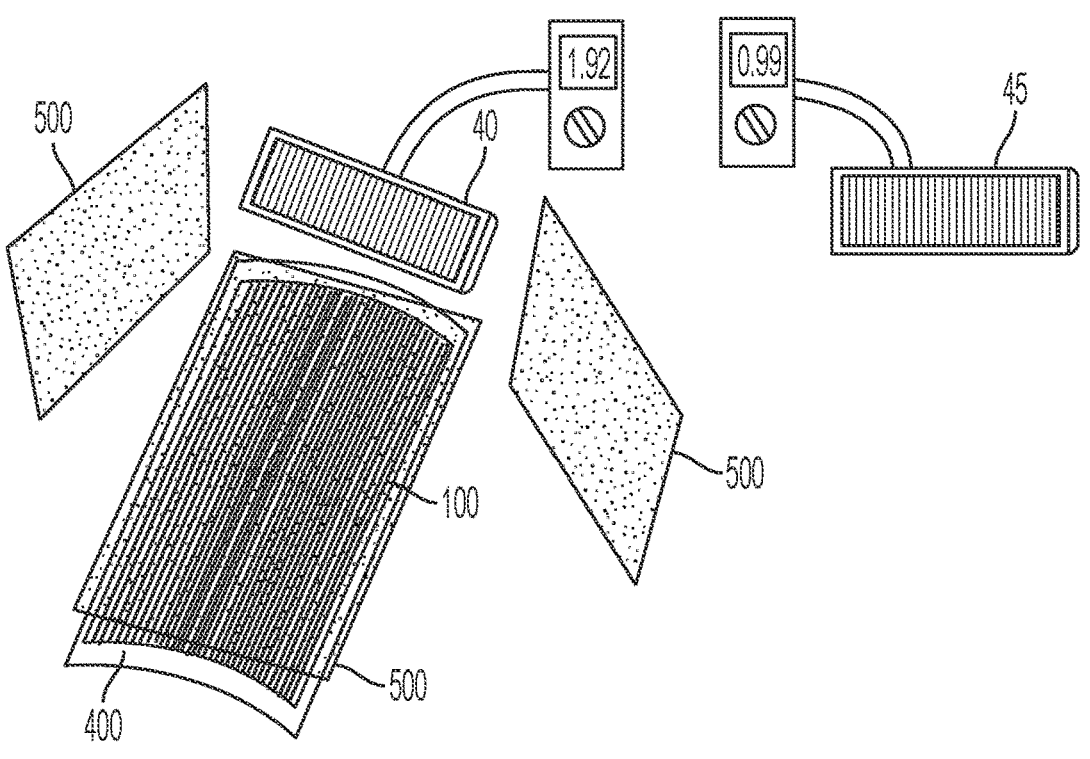
FIG. 32 is perspective view of a system similar to that of FIG. 30 but additionally having two upstanding reflective panels placed to the sides of the same solar panel having the riot shield placed to the front thereof.

FIG. 32 is a perspective view of a system similar to that of FIG. 31 except that two upstanding reflective panels 500 were used each having refractive-reflective sheet 200 mounted on the top thereof. The test was done when the sun was not at its peak strength, so panel 45 only produced 0.99 A. However, under the same sun condition, panel 40 produced 1.92 A. This represents a 94% increase in generated current by using the riot shield with refractive-reflective shield on top of it, a reflective sheet such as a mirror below it, and two upstanding refractive-reflective sheets such as linear lenticular sheets 200. When the test was repeated (not shown) closer to noon with the sun shining more strongly, a 103.25% increase of power for panel 40 over panel 45 was observed.

Figure 33:
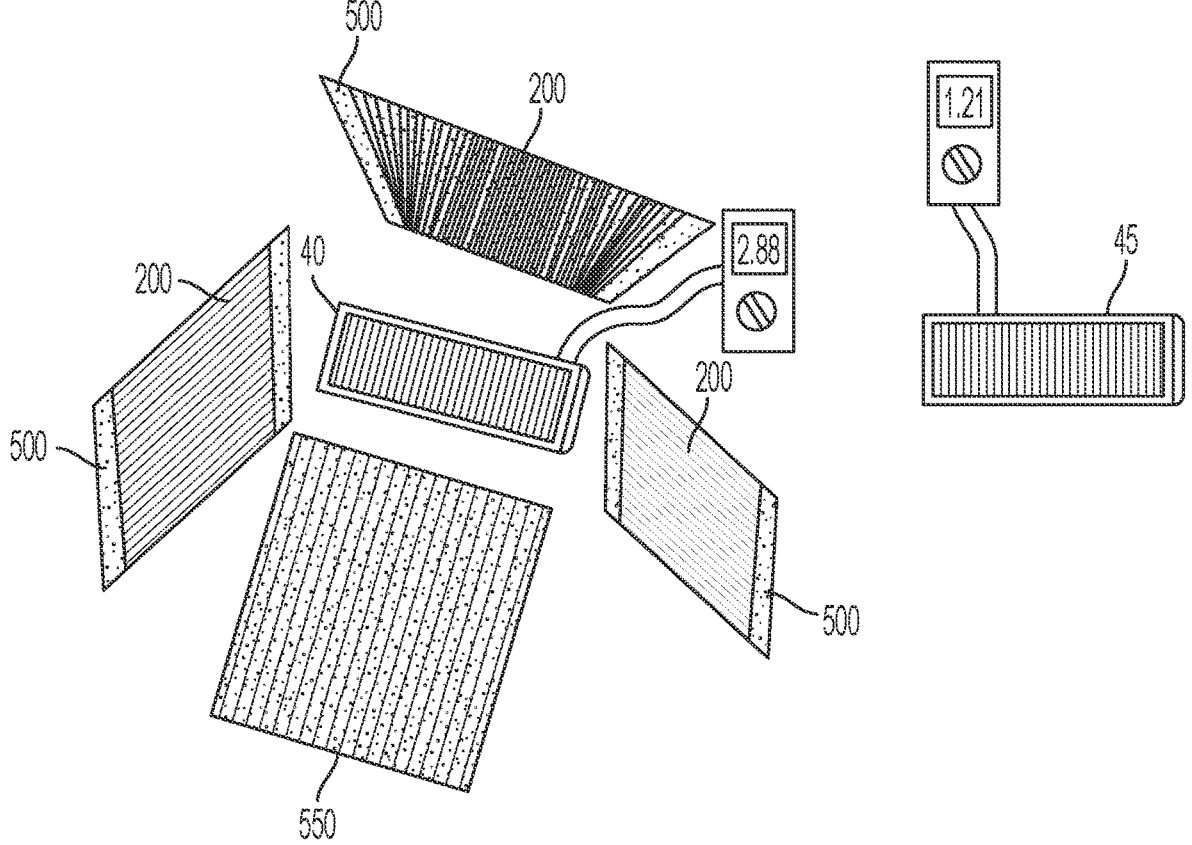
FIG. 33 is a perspective view of solar panels having a refractive-reflective sheet coated with reflective material placed to the front and near the lower edge of one panel, and three reflective panels placed to the sides and above the same panel for reflecting solar rays thereon.

FIG. 33 is a perspective view of a system of solar panels having reflectors on four sides of the solar panel 40. Panel 45 is a control panel with no objects in front thereof. Solar panel 40 has a refractive-reflective sheet 500 in the form of a linear lenticular sheet 550 coated with a reflective coating placed to the front and near the lower edge of solar panel 40 for reflecting sun rays thereon. Additionally two upstanding reflective panels 500 with refractive-reflective sheets 200 placed thereon, are placed on both sides of solar panel 40 and oriented for reflecting sun rays thereon. Furthermore, a third reflective panel 500 with a refractive-reflective sheet 200 is positioned above solar panel 40 and oriented for reflecting sun rays thereon. It was found that the current produced by solar panel was 2.88 A compared with 1.21A produced by solar panel 45. This amounts to an increase in output current of 138%. By varying the angle between the solar panel and the refractive-reflective sheet 500 for example the increase in output current was as high as 142% (not shown).

Figure 34:
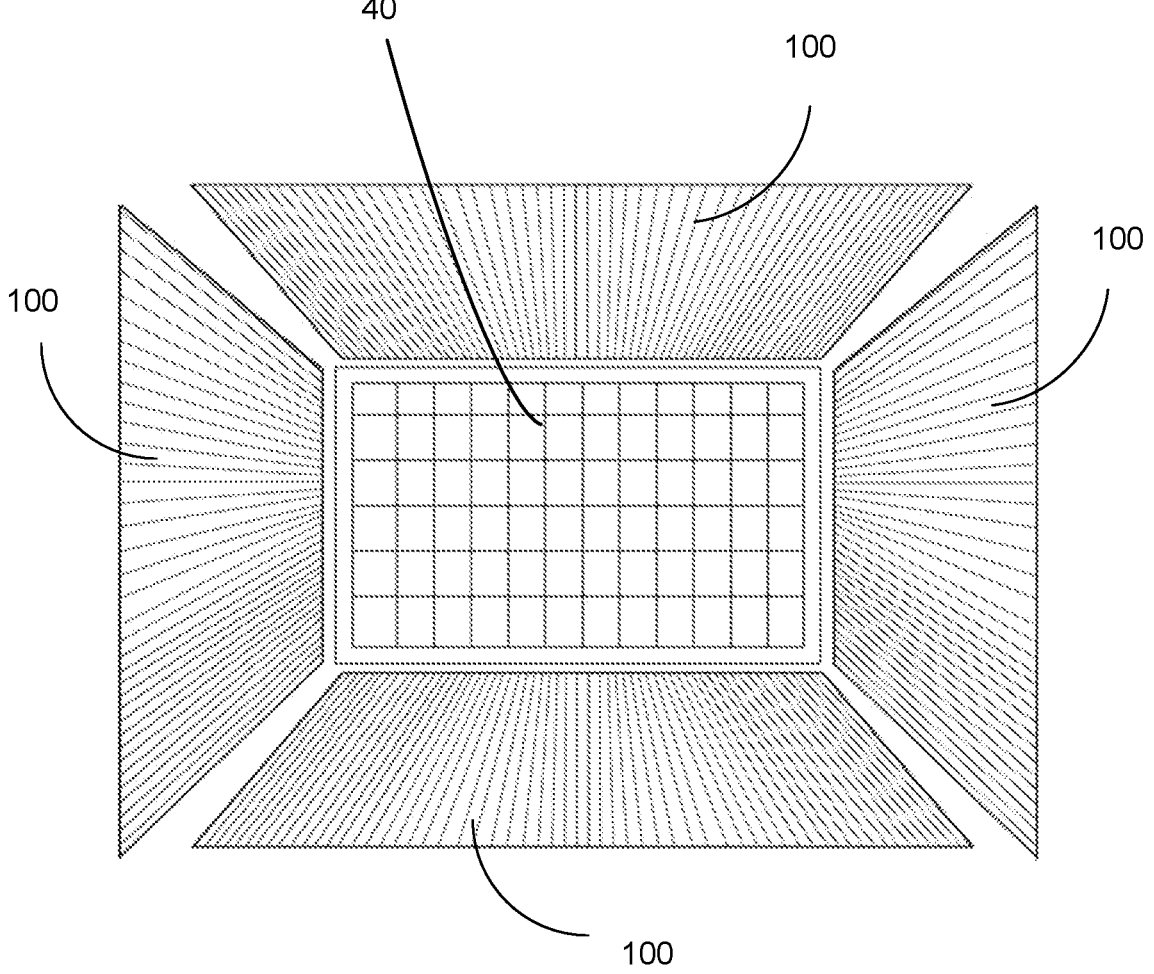
FIG. 34 is a diagram showing a solar plane surrounded by four linear lenticular sheets having what has been observed to be optimal polarity of the linear lenticular lenses for reflecting solar rays onto the solar panel.
Figure 35:
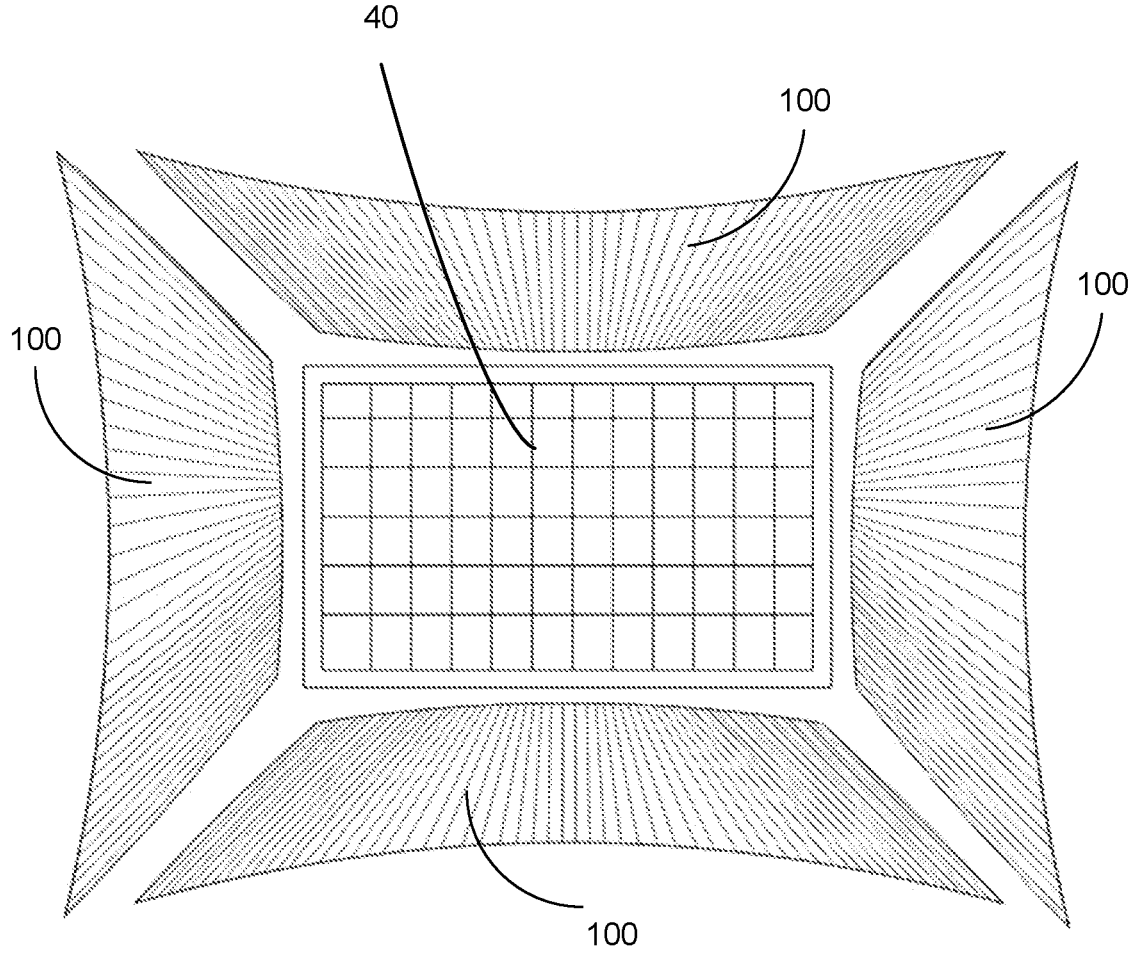
FIG. 35 is a diagram similar to that of FIG. 34 but with the four linear lenticular sheets being curved in a convex manner with respect to the solar panel.
Figure 36:
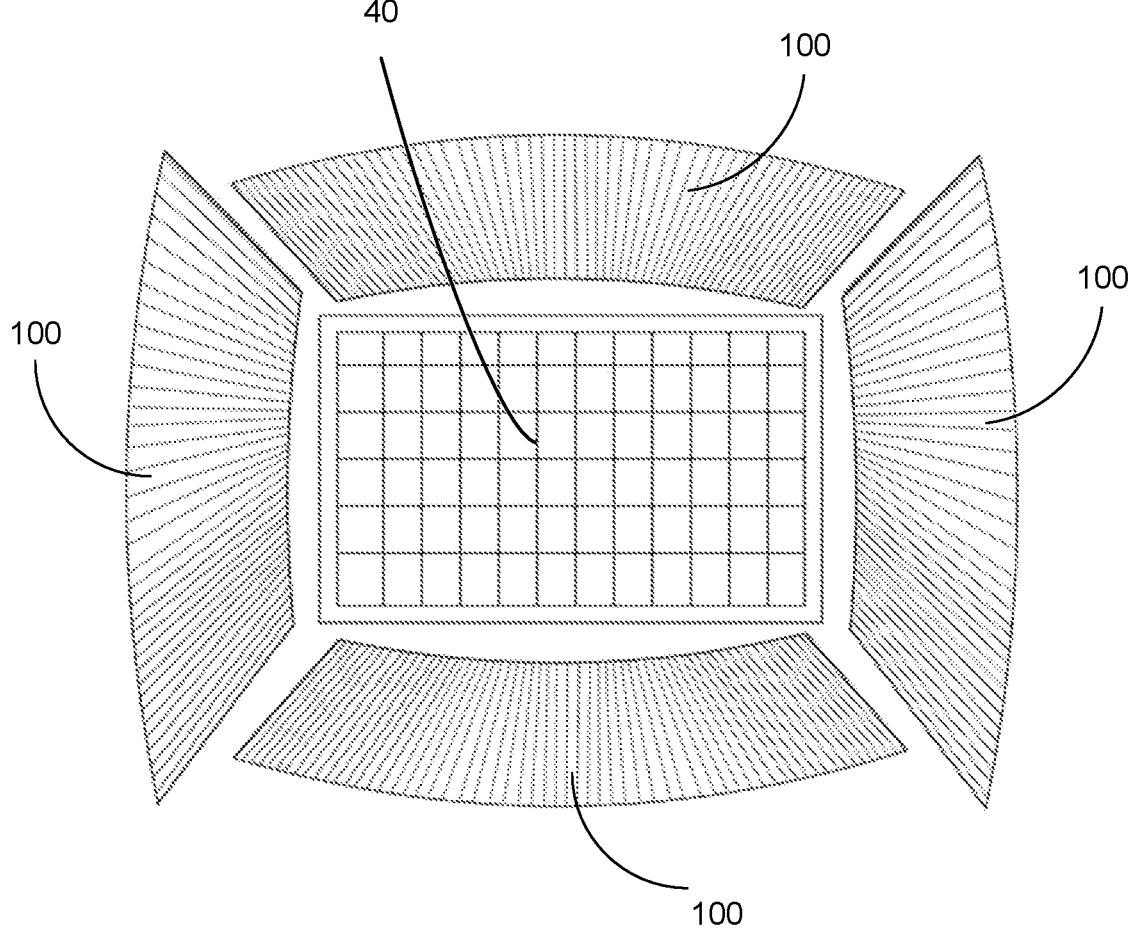
FIG. 36 is a diagram similar to that of FIG. 34 but with the four linear lenticular sheets being curved in a concave manner with respect to the solar panel.
Figure 37:
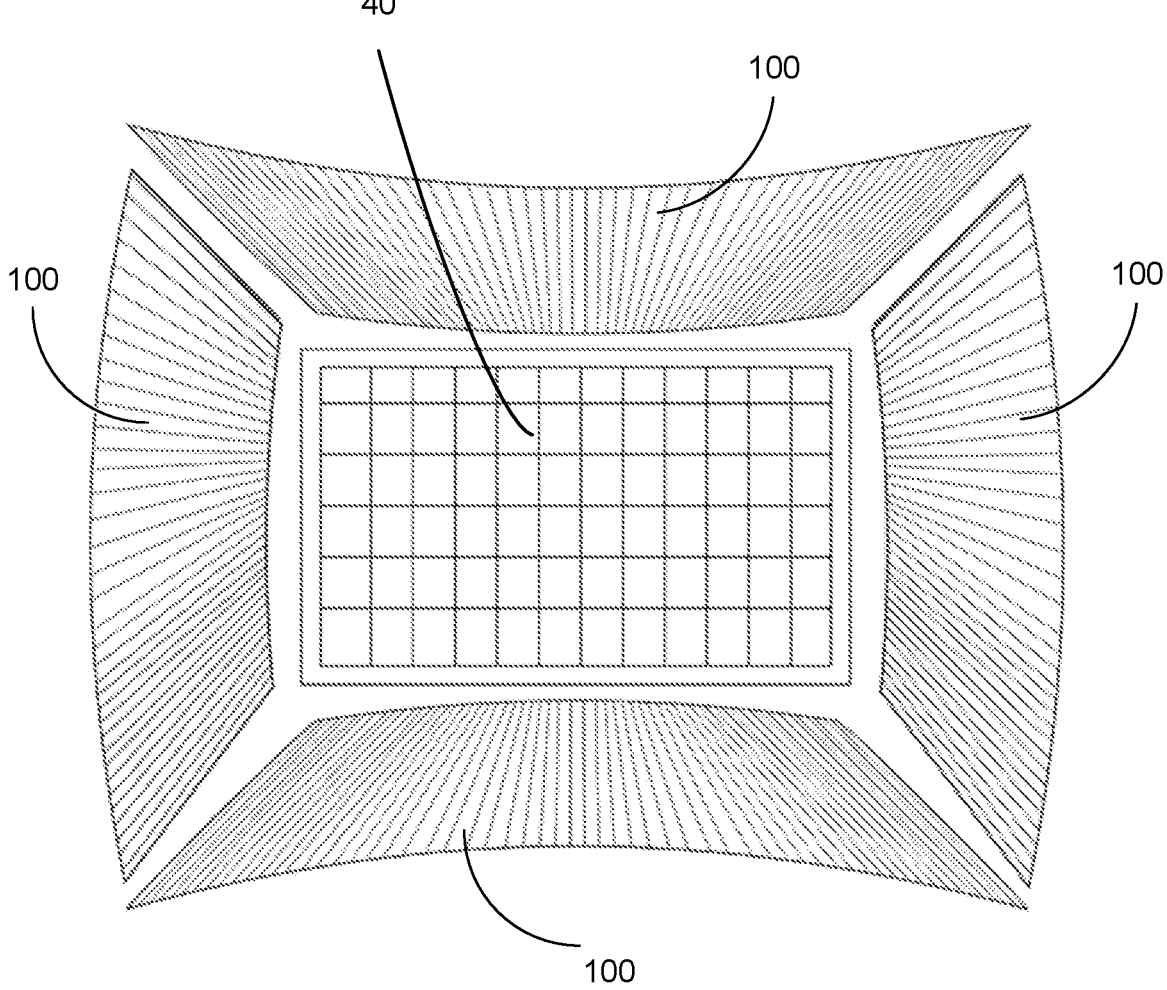
FIG. 37 is a diagram similar to that of FIG. 34 but with the two linear lenticular sheets being curved in a convex manner and two linear lenticular sheets curved in a concave manner with respect to the solar panel.
Figure 38:
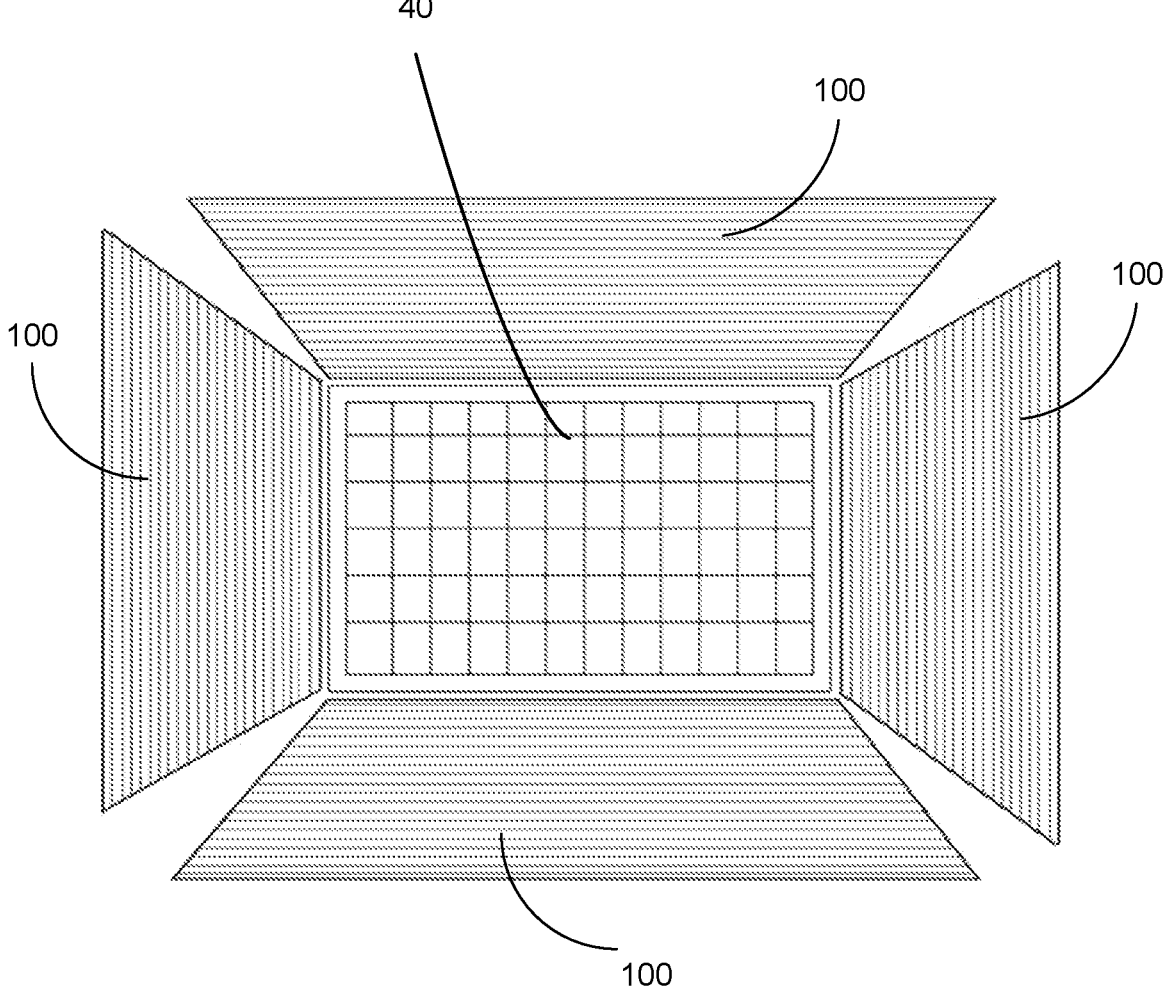
FIG. 38 is a diagram showing a solar plane surrounded by four linear lenticular sheets having what has been observed to be less than optimal polarity of the linear lenticular lenses for reflecting solar rays onto the solar panel.
Figure 39:
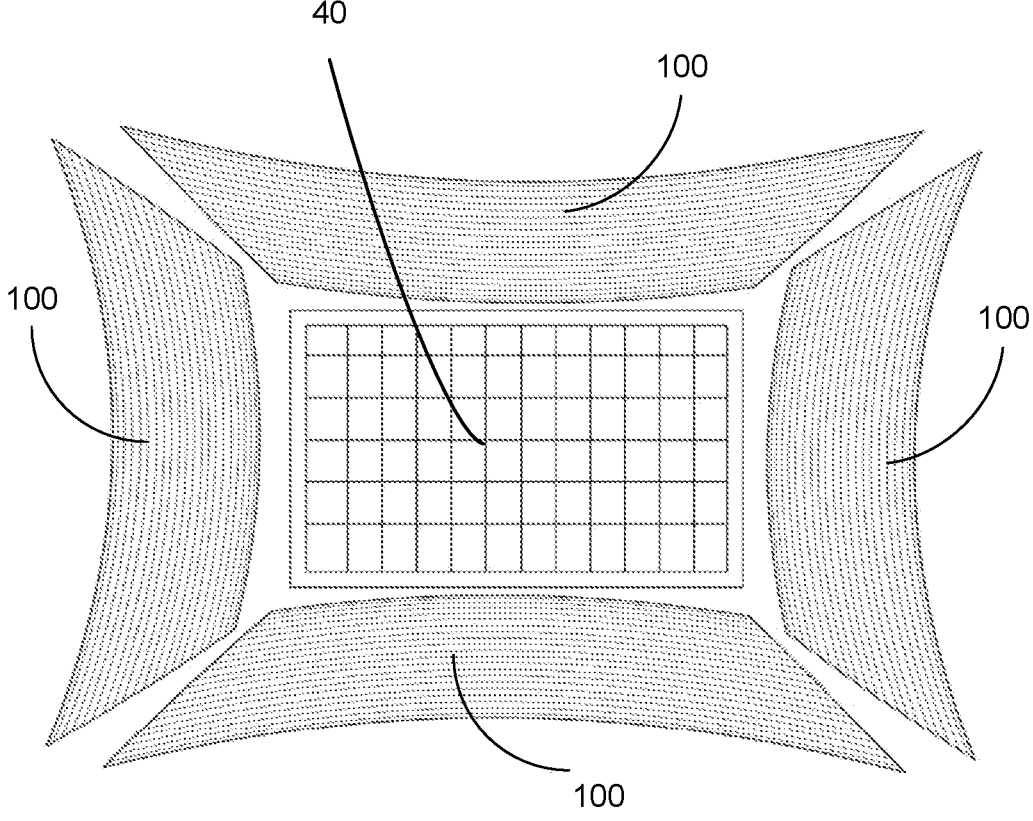
FIG. 39 is a diagram similar to that of FIG. 38 but with the four linear lenticular sheets being curved in a convex manner with respect to the solar panel.

FIGS. 34-39 are schematic diagrams depicting a solar panel 40 surrounded by 4 linear lenticular sheets 100. In FIG. 34 the lenticular sheets are oriented such that the linear lenticular lenses are running generally perpendicular to the surface of the solar panel. This has been shown to give better output current results and is considered to be the optimal polarity for the lenses. FIG. 35 is similar to FIG. 34 except that lenticular sheets 100 are curved in a convex manner with respect to the solar panel. FIG. 36 is similar to FIG. 34 except that the lenticular sheets 100 are curved in a concave manner with respect to the solar panel. FIG. 37 is similar to FIG. 34 except that two lenticular sheets are convex and two are concave. FIG. 38 depicts a solar panel 40 surrounded by 4 linear lenticular sheets 100 oriented in a less-than-optimal polarity. In this case the linear lenticular lenses on the lenticular sheets run parallel to the surface of the solar panel 40. FIG. 39 is similar to FIG. 38 except that the lenticular sheets 100 are convex with respect to solar panel 40.

Figure 40A:
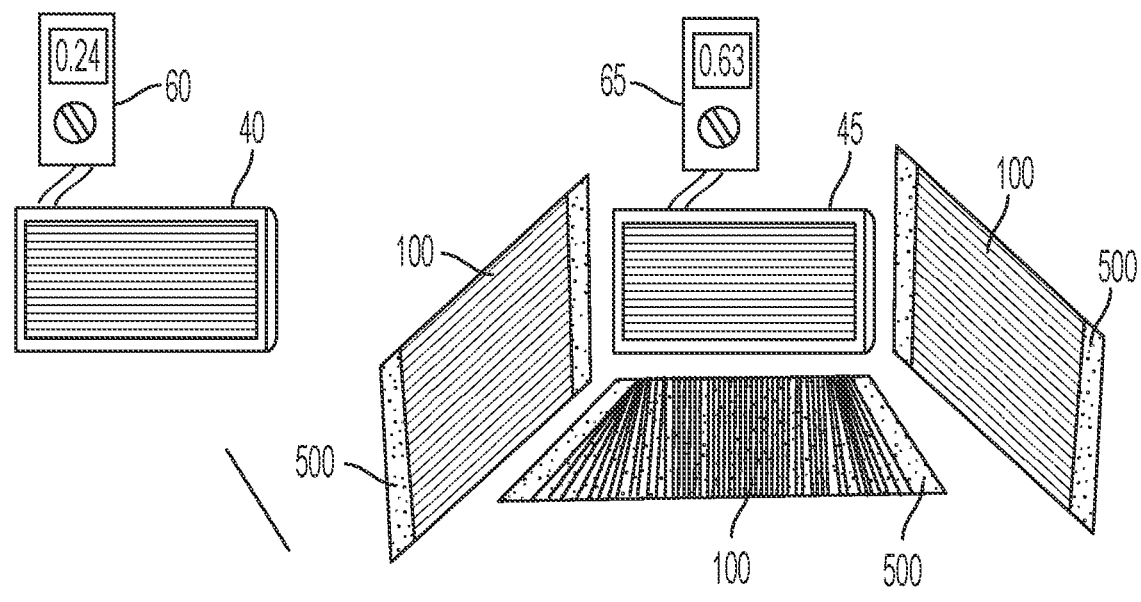
FIG. 40A is a perspective view of a system of solar panels with one panel surrounded from three sides by reflective panels each comprised of a reflective panel and a refractive-reflective sheet placed on top of the reflective panel, shown with current measurements.

FIG. 40A is perspective view of a system of solar panels similar to that of FIG. 33, but using only three reflective panel. A reflective panel 500, such as a mirror, with a lenticular sheet 100 on top thereof is disposed near the bottom edge and to the sides of solar panel 45. Additionally, two upstanding reflective panels, such as mirrors with a lenticular sheet 200 on top thereof are placed on either side of solar panel 45 for reflecting sunlight thereon. It has been observed that panel 40 produced 26.9V while panel 45 produced 25.0V. The drop in voltage can be attributed to the heating of the panel due to the additional sun rays falling thereon. The current produced by panel 45 was 0.63 A while that of panel 40 was only 0.24 A. The control panel 40 produced 0.24 A*26.9V=6.456 W. Panel 45 with the three reflective panels, produced 0.63 A*25.0V=15.75 W. Accordingly, the power produced when using three reflective panels as described herein is 2.44 times the power produced in a control panel with no reflective panels at all.

Figure 40B:
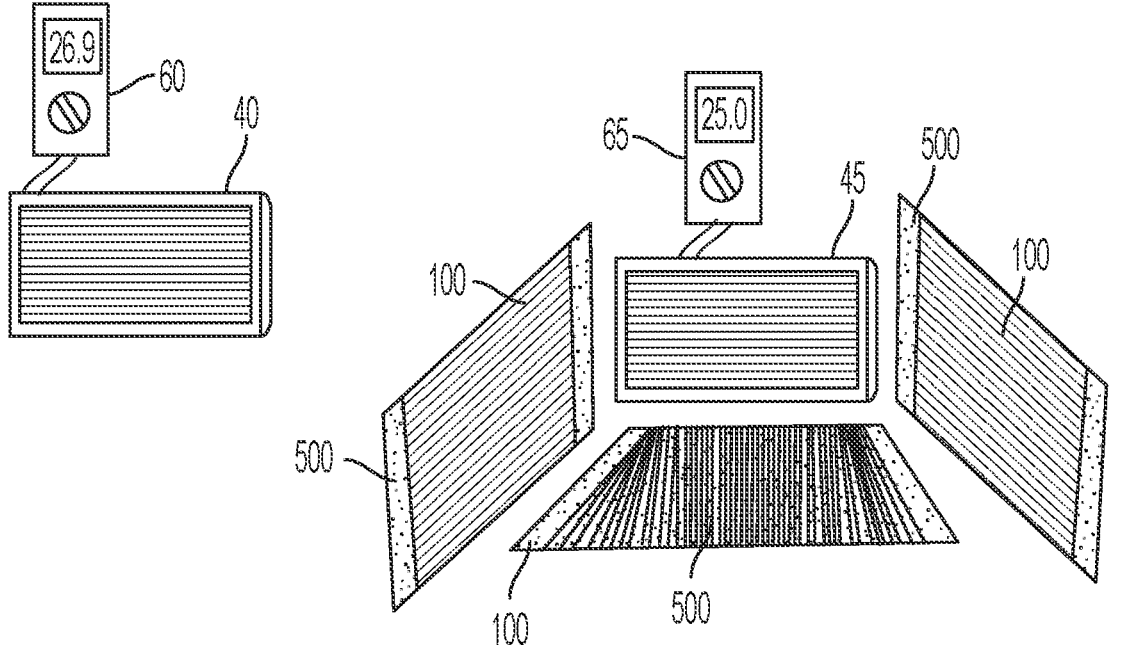
FIG. 40B is the system of FIG. 40A but shown with voltage measurements.
Figure 41A:
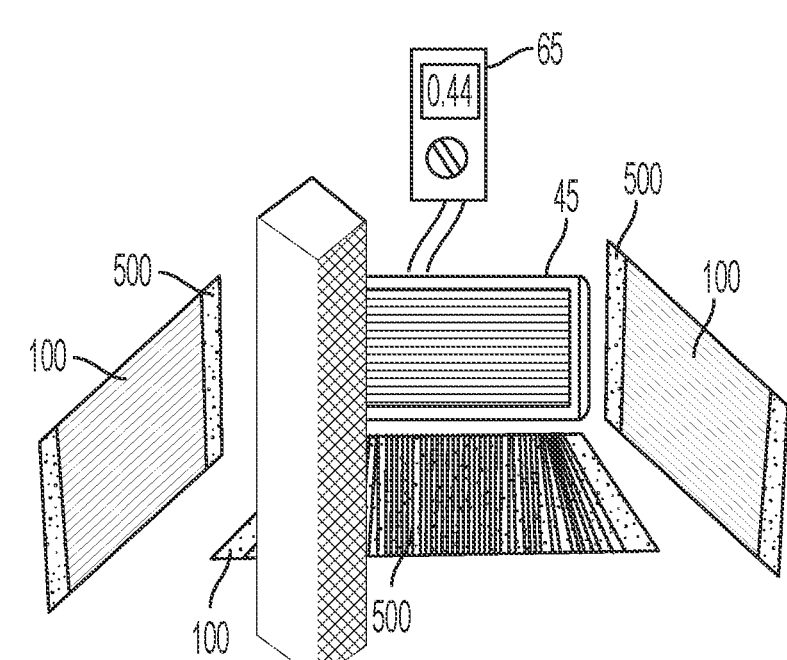
FIG. 41A is a system similar to FIG. 40A but also having a shadow cast on one of the solar panels.
Figure 41B:
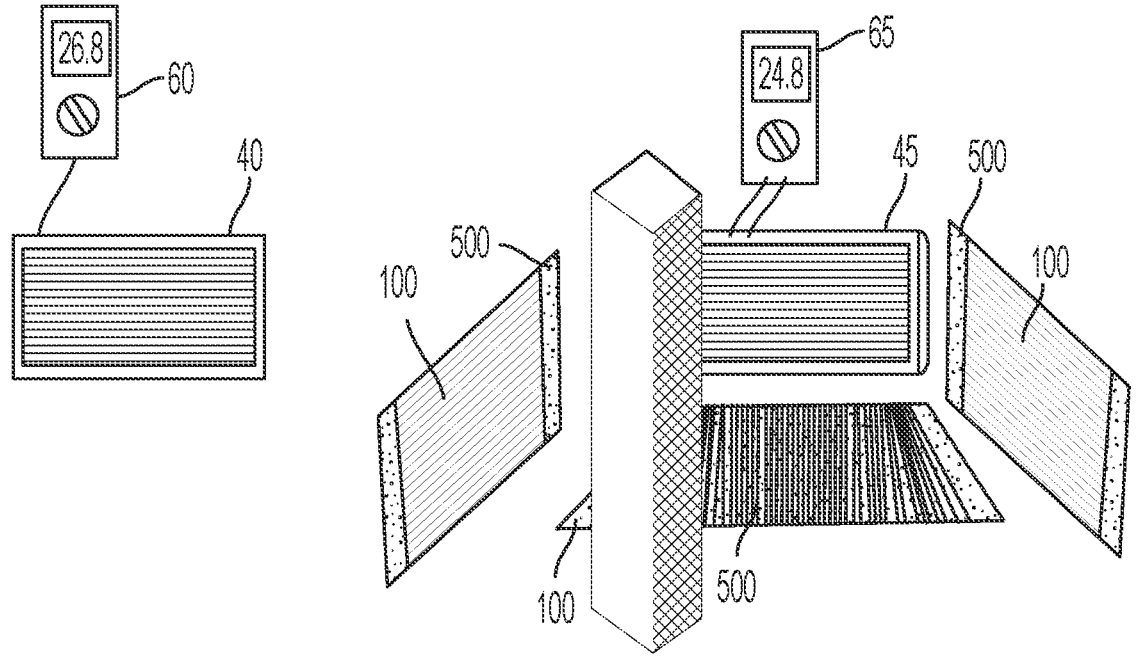
FIG. 41B is a system similar to FIG. 40B but also having a shadow cast on one of the solar panels.

The system described in FIGS. 40A and 40B was then used in conjunction with applying the shadow of an object onto panel 45 to see if the effect of the shadow can be completely negated by the use of the three reflective panels described above. The system and both voltage and current measurements are shown in FIGS. 41A and 41B. The voltage measured on control panel 40 was 26.8V while that of panel 45 was 24.8V. The drop in voltage on panel 45 is likely due to the heating of the panel. The current produced by panel 45 was 0.44 A compared with 0.24 A produced by control panel 40. When comparing power, control panel 40 had 0.24 A*26.8V=6.432 W. Panel 45 had 0.44 A*24.8V=10.91 W. Thus, not only was the effect of the shadow completely negated, the output power of panel 45 was approximately 1.7 times the power of the control panel 40 on which no shadow was cast.

Figure 42:
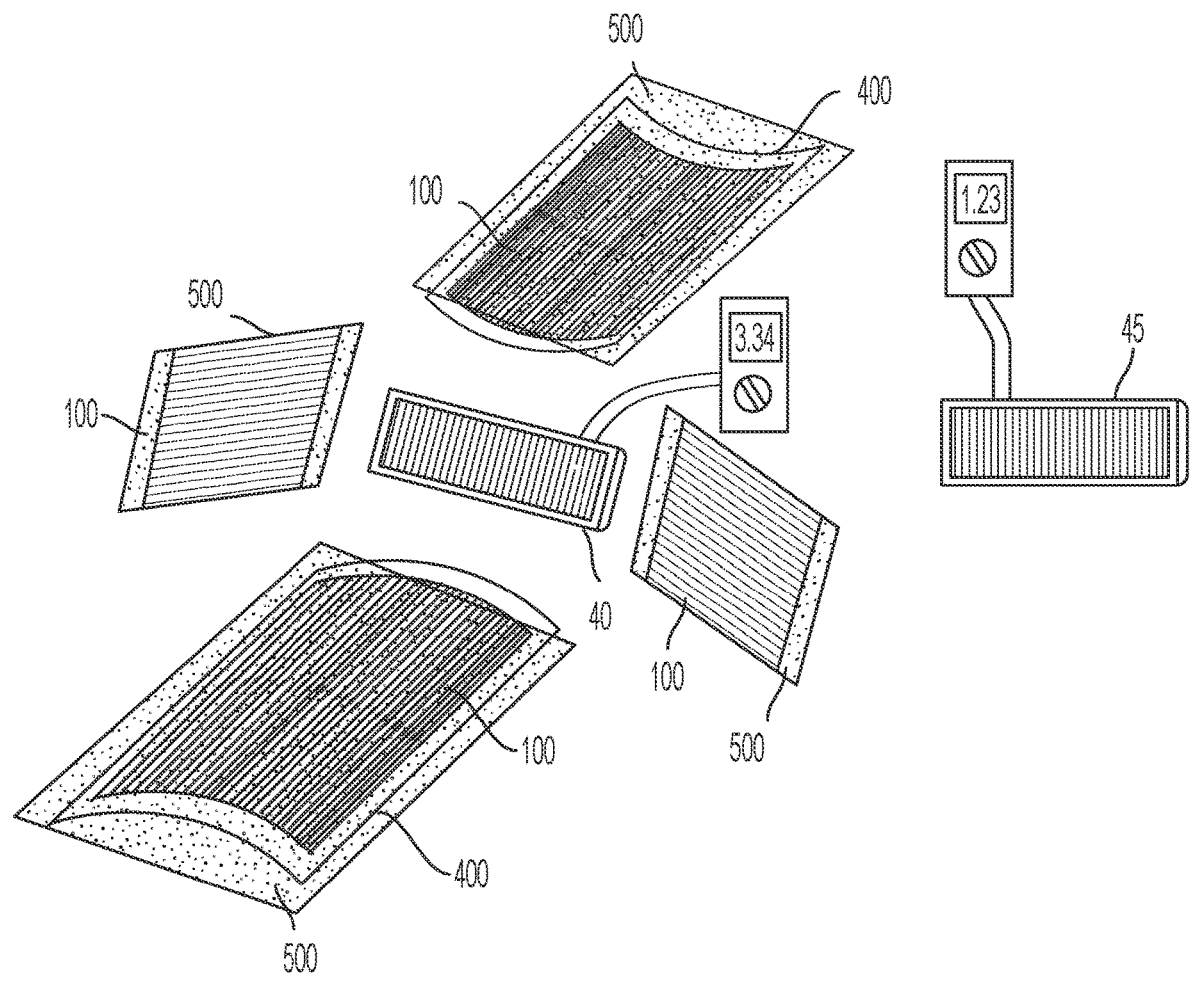
FIG. 42 is a perspective view of a system of solar panels with one solar panel surrounded from 4 sides with reflective panels, two of which are mirrors covered with lenticular sheets placed to the sides of the solar panel, and transparent riot shields having a mirror backing to the top and bottom.
Figure 43:
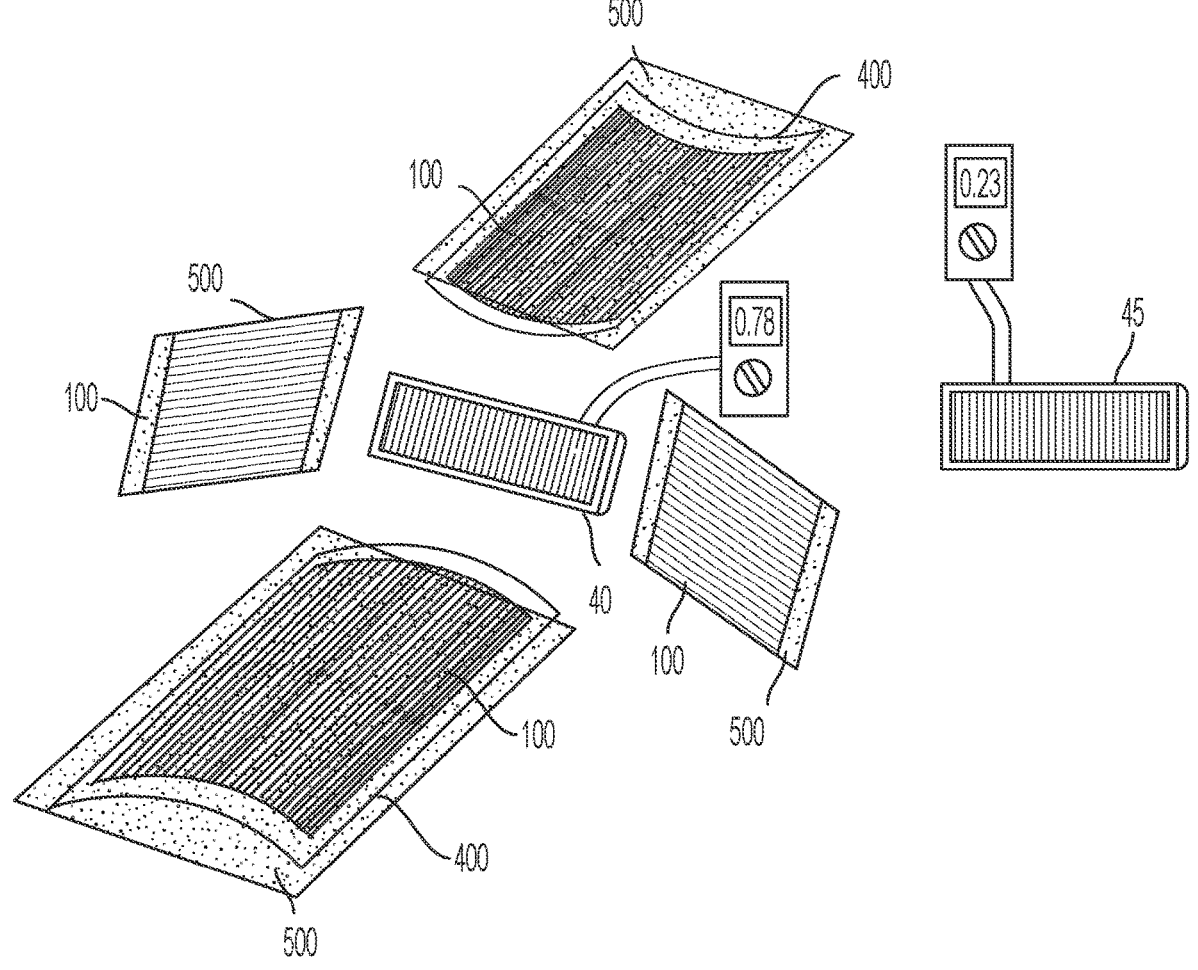
FIG. 43 is a perspective view of a system of solar panels with one solar panel surrounded from 4 sides with reflective panels, three of which are mirrors covered with lenticular sheets placed to the sides and bottom of that solar panel, and a transparent surface such as a riot shield covered with a lenticular sheet and having a mirror backing.

FIG. 42 depicts a system of solar panels wherein one panel 40 is surrounded by reflective panels from four sides. Placed to the front and near the lower edge of panel 40 is a transparent riot shield 400 with a reflective panel such as a mirror 500 placed behind it. A similar riot shield 400 and mirror 500, with the riot shield 400 having a lenticular sheet 100 placed on top thereof were held above the top edge of solar panel 40. To the left and right of solar panel 40 upstanding mirrors 500 with refractive-reflective sheets such as linear lenticular sheets 100 are placed in front of the mirrors. The measured current from panel 40 was 3.34 A while that of panel 45 was 1.23 A. Accordingly, the output current of a solar panel can almost be tripled by using the reflective panels as described FIG. 43 depicts a system of two thin film solar panels in which one panel 45 is surrounded from 3 sides by reflective panels. Held over the top edge of panel 45 is a transparent riot shield 400 covered with a refractive-reflective sheet such as linear lenticular sheet 100, and having a reflective panel behind it such as mirror 500. The riot shield with mirror and lenticular sheet was held at an optimal angle for reflecting sun rays onto panel 45. On the left and right sides upstanding lenticular sheets 100 with mirrors 500 behind each one of the lenticular sheets are placed. The observed current from panel 45 was 0.78 which was triple that of panel 40 which was 0.23 A. When voltage was factored in, panel 40 produced 6.1 W while panel 45 produced approximately 19 W which is triple the power of that of panel 40.

The experiment of FIG. 43 was also conducted using monocrystalline solar panels and without the riot shield on top. The panel 45 which had the reflectors produced 2.97 A and 18.8V, so the power was approximately 56 W. Solar panel 40, which was the control panel, produced 1.17 A and 20.4V, so the power was approximately 24 W. Thus the power with reflectors was approximately 2.35 times that of the power without reflectors, but not quite triple as was the case with thin film solar panels. This is due to the voltage drop with microcrystalline panels. Studies have shown that while voltage drops due to extra heat happen in both monocrystalline and thin film PV (also known as "amorphous solar panels"), the thin film PV panels are better able to withstand the heat and retain a higher voltage.

In another embodiment, two monocrystalline solar panels were used, one with reflectors and a control solar panel. Four reflectors were used: one riot shield on top and one riot shield on bottom with mirror behind each shield and a lenticular sheet on top of each shield; and two upstanding mirrors with lenticular sheets to the sides. The observed values for the control panel was 1.18 A*20.4V=24.072 W. And for the panel with reflectors: 3.59 A*18.8V=67.492 W. While the output power was 2.8 times higher for the solar panel with reflectors, it did not quite reach triple that of the control panel. This confirms the earlier findings that the additional heat causes a voltage drop in the output of monocrystalline panels.

The performance of solar panels is usually measured under a solar optimal rating of 1000 W/m². Such a solar condition is attainable: at the equator, at noon, under ideal clear sky conditions, and at a temperature of 25 degrees Celsius. At the equator at noon the sun is at 90 degrees to the earth surface. Other parts of the world experience different incident angle for sun rays. For example, in Vancouver Canada on Nov. 2, 2018 the sun was at approximately a 26 degree angle, and the maximum solar intensity was only 400 W/m² at noon. At an earlier time in the day, around 10:40 AM an experiment was conducted using the setup shown in FIG. 20A and FIG. 20B above but using polycrystalline solar panels, as depicted in FIG. 44.

Figure 44:
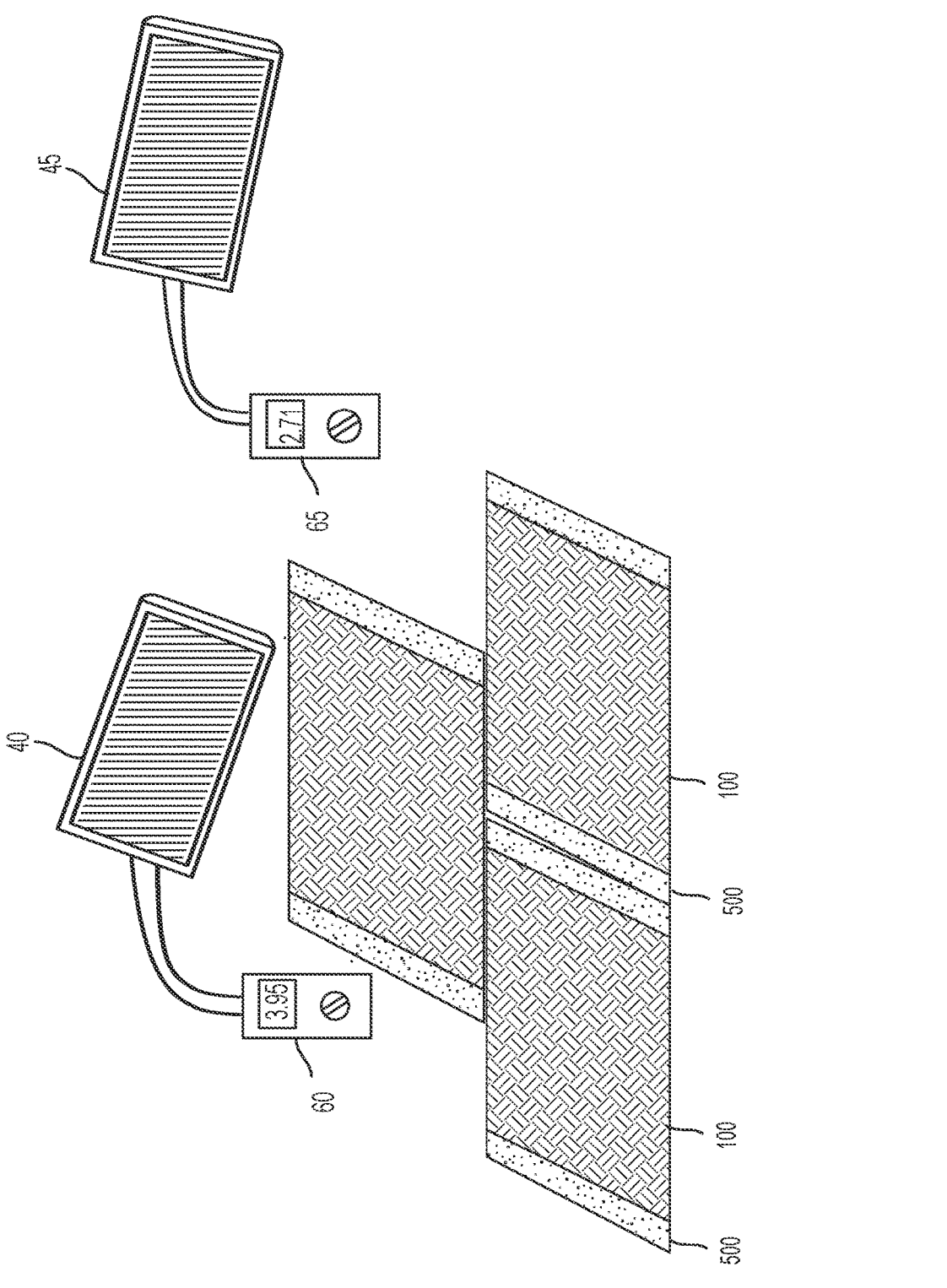
FIG. 44 is a perspective view of a system of solar panels with one panel having three reflective panels covered with a refractive reflective sheet placed to the front and near the lower edge of one of the solar panels.

FIG. 44 depicts a system of polycrystalline solar panels 40 and 45 for carrying out solar testing. Panel 40 has three reflective panels 500 each covered with a refractive-reflective sheet 100. Panel 45 is a control panel. At that time of day the solar rating was about 300 W/m², which is well below the optimal solar rating of 1000 W/m² discussed above. The results showed that panel 40 produced 21.5V*2.71 A=58.26 W, while panel 45 produced 21.9V*3.95 A=86.50 W. Therefore the amplified panel produced 48.47% more power. According to the information provided on the panels by the manufacturer, when testing these panels under no load, the maximum attainable power under 1000 W/m² (i.e. ideal solar conditions) is: 21.85V open circuit voltage, and 3.2 A short circuit current. In other words, the maximum power under ideal solar conditions is: 21.85*3.2=70 W approximately. The amplified panel produced 86.50 W under only 300 W/m² non idea non-ideal solar conditions, and it was still about 23% higher than what is expected at ideal solar and load conditions. The cost of adding the solar panels and the materials is insignificant compared to the additional power generated.

Figure 45:
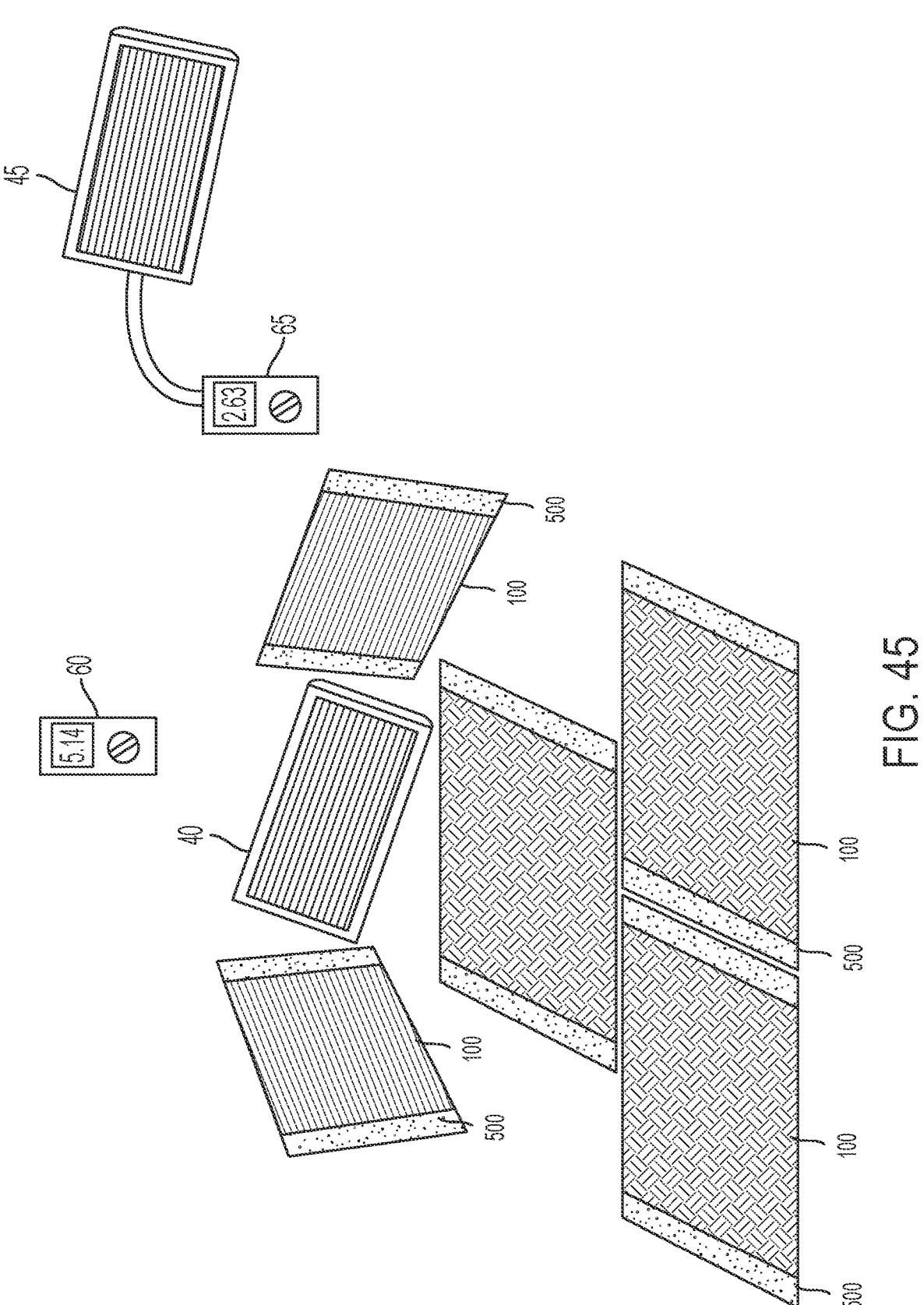
FIG. 45 is a perspective view of the system of FIG. 44, but additionally having two upstanding reflective panels with refractive-reflective sheet covers placed on both sides of the panel which has the reflective panels and refractive-reflective sheet covers.

FIG. 45 depicts a system similar to that of FIG. 20 with three refractive-reflective sheet with a mirror behind it, placed to the front of and near the lower edge of solar panel 40; but also features additional upstanding refractive-reflective sheets with a mirror behind each of them placed to the left and right of solar panel 40. The power produced by the panel 40 was: 20.7V*5.14 A=106.40, while the power produced by the control panel 45 was 21.6V*2.63 A=56.81 W. Therefore the amplified solar panel produced 1.87 times the power of the non-amplified one. Again it should be noted that the 106.4 W observed with the amplified panel is higher (in this case more than 50% higher) than what the manufacturer rates for those panels under ideal solar conditions explained above.

The above findings are of great significance since in many cities around the world, the adoption of solar panels is not high primarily because the produced power is relatively low that it takes a very long time to recoup the cost of a system of solar panels. This varies and depends on the location, hours of sunlight, and angle of sunlight. The closer a city is to the equator the better those conditions get. However, the above methods which significantly amplify the output power of solar panels mean that the cost of a solar panel system can be recouped sooner from the produced power. Accordingly, many cities around the world may become a viable market for solar panels.

In one experiment conducted using the system of FIG. 40A and FIG. 40B the control panel 40 had 20.2V*1.20 A=24.4 W, while panel 45 with the reflectors had 18.4V*2.21 A=40.66 W (about 68% more power). The 1.8V difference between the control panel 40 and panel 45 is due to the extra heat that the amplification system of reflectors creates. By measuring the temperature for each of the panels it was found that panel 40 was at 124 degrees Fahrenheit, while panel 45 was at 187.5 degrees Fahrenheit. This could allow for improved solar thermal water hating or even a combined solar panel with a solar heating system mounted behind it to both help cool the solar panel and heat water at the same time.

FIG. 46 is a perspective view of a system, similar to that of FIGS. 40A and 40B, but additionally having a refractive reflective sheet 130 placed over the amplified solar panel 45 to act as a cover. For the system used the control panel 40 produced a power of 20.2V*1.20 A=24.4 W. The amplified panel 45 produced 19.2V*2.06=39.55 W. The temperature of the control panel was around 118 F, while that of the amplified panel 45 around 170 F. However, removing the refractive-reflective cover sheet 130 from the amplified solar panel 45 (not shown) caused the temperature to rise to 200 F. At the same time removing cover caused the power of the amplified panel to be 18.9*2.47=46.7 W. Accordingly, the cover 130 had a substantial impact on the temperature keeping it about 30 degrees Fahrenheit cooler compared with no cover. The cover also reduced the power by about 18%(39.55 W versus 46.7 W) while still achieving a substantial power boost of about 63% over the control panel. The trade-off in power output versus temperature control may allow the solar panel to achieve a much longer lifespan with a lens cover since overheating may cause deterioration of the cells over time. It may also limit hot spots of a heavily amplified system.

Figure 46A:
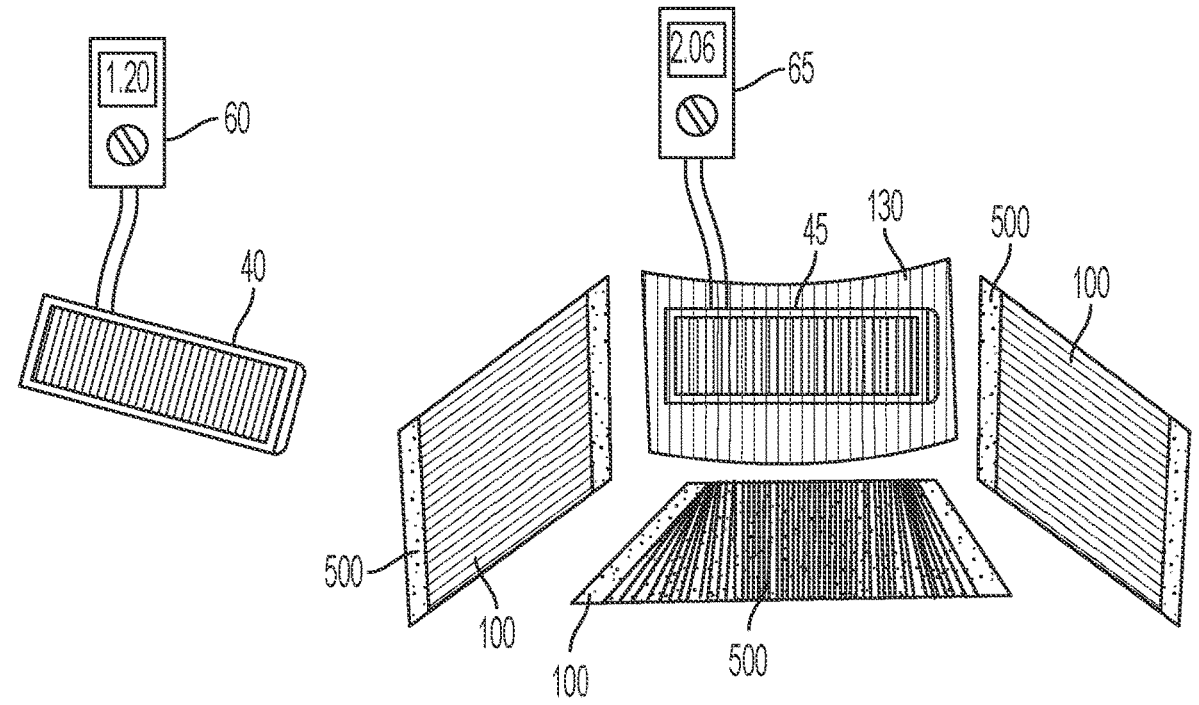
FIG. 46A is a perspective view of the system of FIG. 40A but additionally having a refractive-reflective sheet, such as a lenticular sheet curved and placed to the front of the pane having the reflector panels.
Figure 46B:
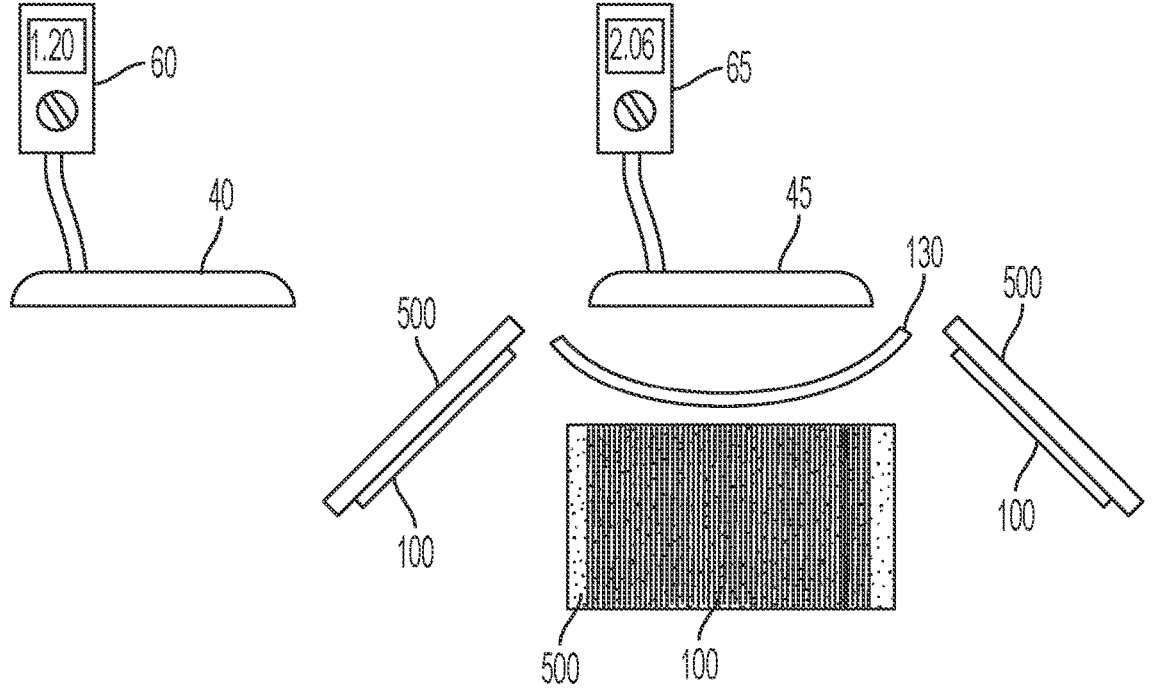
FIG. 46B is a top view of the system of FIG. 46A.
Figure 47:
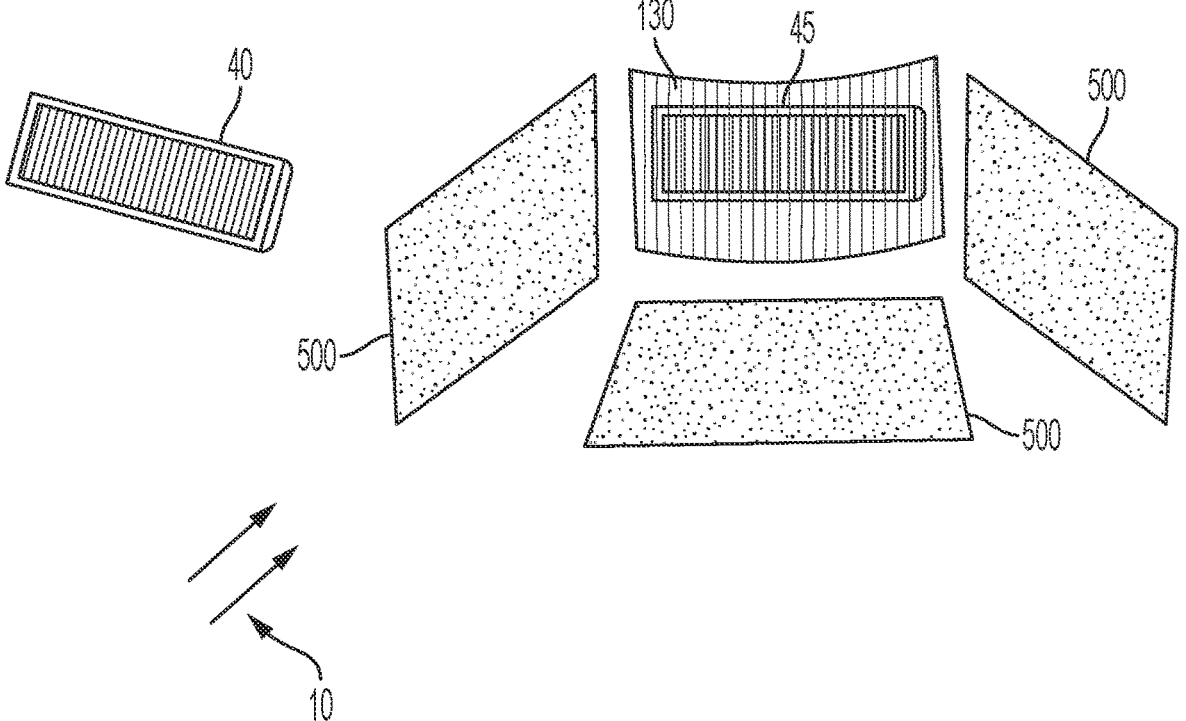
FIG. 47 is a perspective view of a system similar to that of FIG. 46A but without refractive-reflective sheets placed on the three reflective panels.

FIG. 47 shows a system similar to FIGS. 46A and 46B, but with the refractive reflective sheets 100 not placed over the mirrors 500. Instead panel 45 is surrounded by reflective panels or mirrors 500, and has a single refractive-reflective sheet such as linear lenticular cover sheet 130 placed to the front thereof. Conducting a temperature reading prior to placing the cover sheet 130 in front of panel 45 (not shown) resulted in a temperature reading of 213 degrees Fahrenheit. Placing the cover sheet 130 in front of panel 45 dropped the temperature to around 163, a difference of about 50 degrees Fahrenheit. For the control panel 40 the temperature was 115 degrees Fahrenheit. The control panel 40 with no reflectors had a power of 20.2V*1.04 A=21 W approximately. The amplified panel 45 without the cover 130 produced 18.8V*2.02=38 W approximately (over 80% more power than the control panel). With the cover 130 placed in front of solar panel 45, the output power was: 19.2V*1.78 A=34 W approximately (over 54% more power than the control panel). The amplified panel 45 with a cover 130 produced only 4 W less power (about 11%) than it did without a cover. Yet, the improvement in temperature reduction was around 50 degrees Fahrenheit. The system of FIG. 47 therefore has several advantages. Firstly, the cost is reduced since only one lenticular sheet 130 was used instead of three when compared with the system of FIG. 46. Secondly, the reduction in temperature which at 50 degrees was significant and contributes to the longevity of the solar panel as the cells are less likely to burn in the short term. Thirdly, the reduction in temperature came at a small reduction in power, at around 11%.

Figure 48:
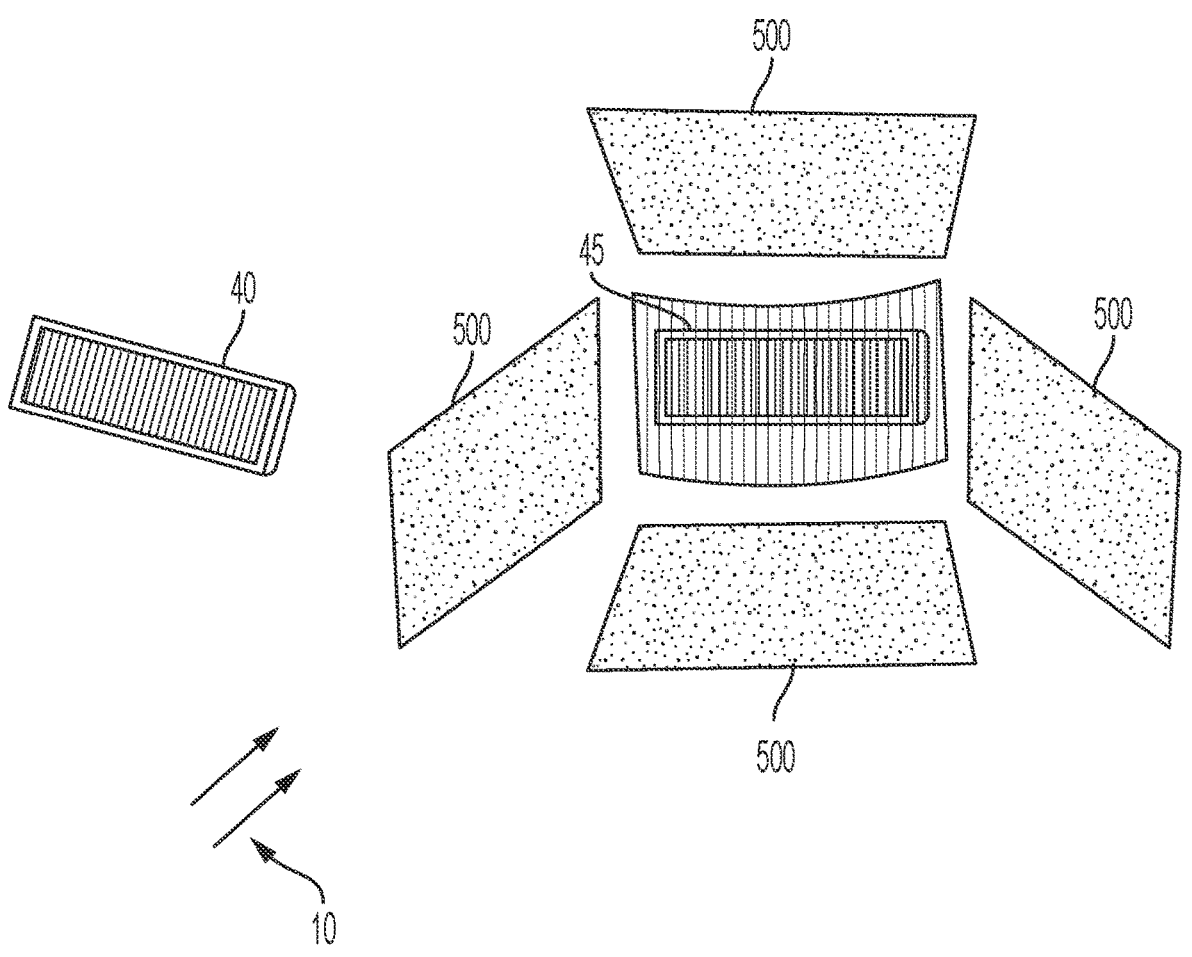
FIG. 48 is a perspective view of a system similar to that of FIG. 47 but additionally includes a reflective panel such as a mirror held above and near the top edge of the solar panel being surrounded by other reflective panels.

FIG. 48 shows a system similar to that of FIG. 47 but additionally has a fourth mirror 500 placed over the top edge of panel 45 for additionally reflecting sun light onto it. This arrangement improved the current to 2.37 A.

Figure 49:
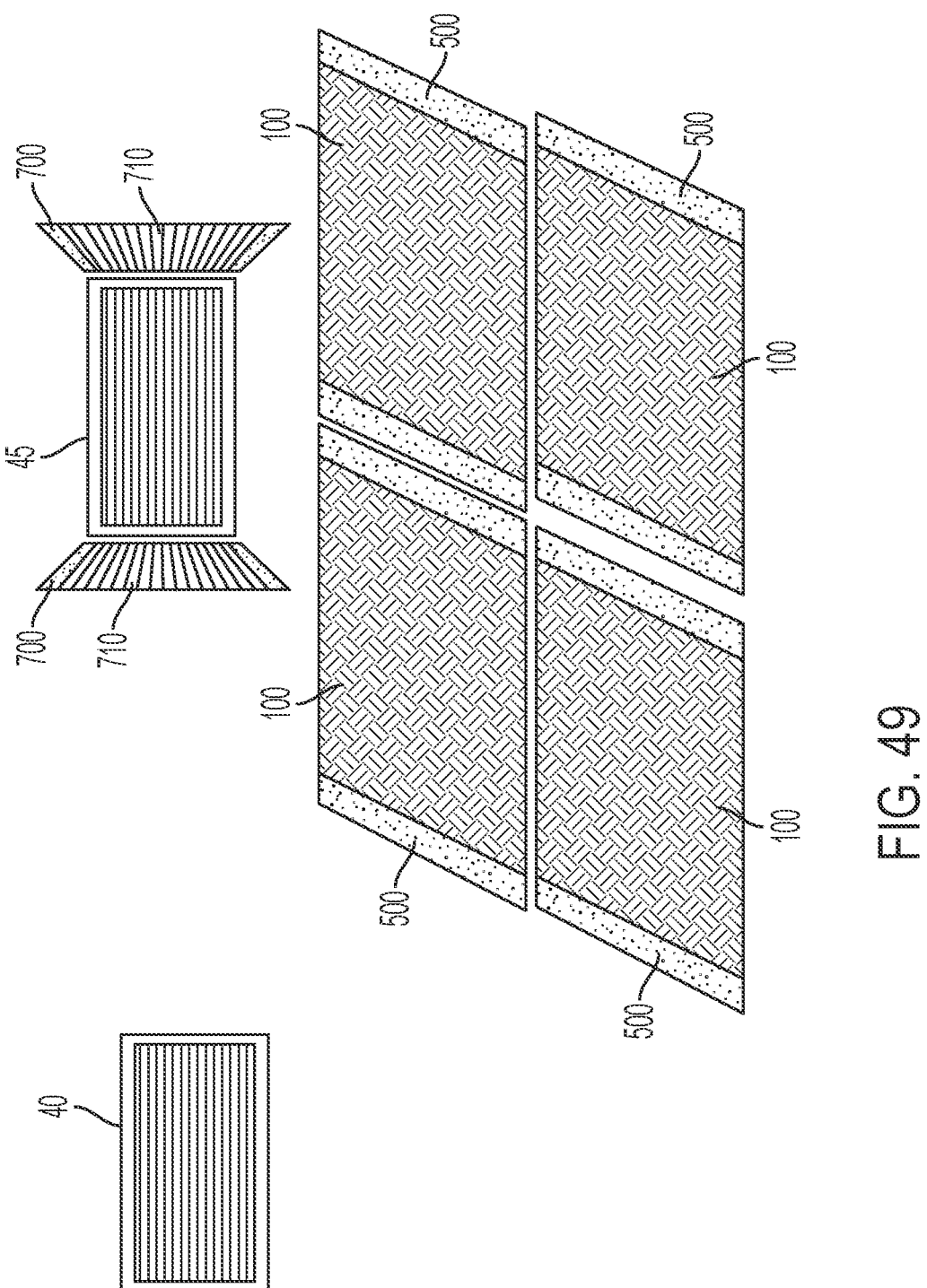
FIG. 49 is a perspective view of a system of solar panels with one panel having to the front and near the bottom edge thereof four reflective panels with a refractive-reflective sheet cover, and additionally two strips of reflective material having a refractive-reflective sheet cover attached to the side edges of that panel.
Figure 50:
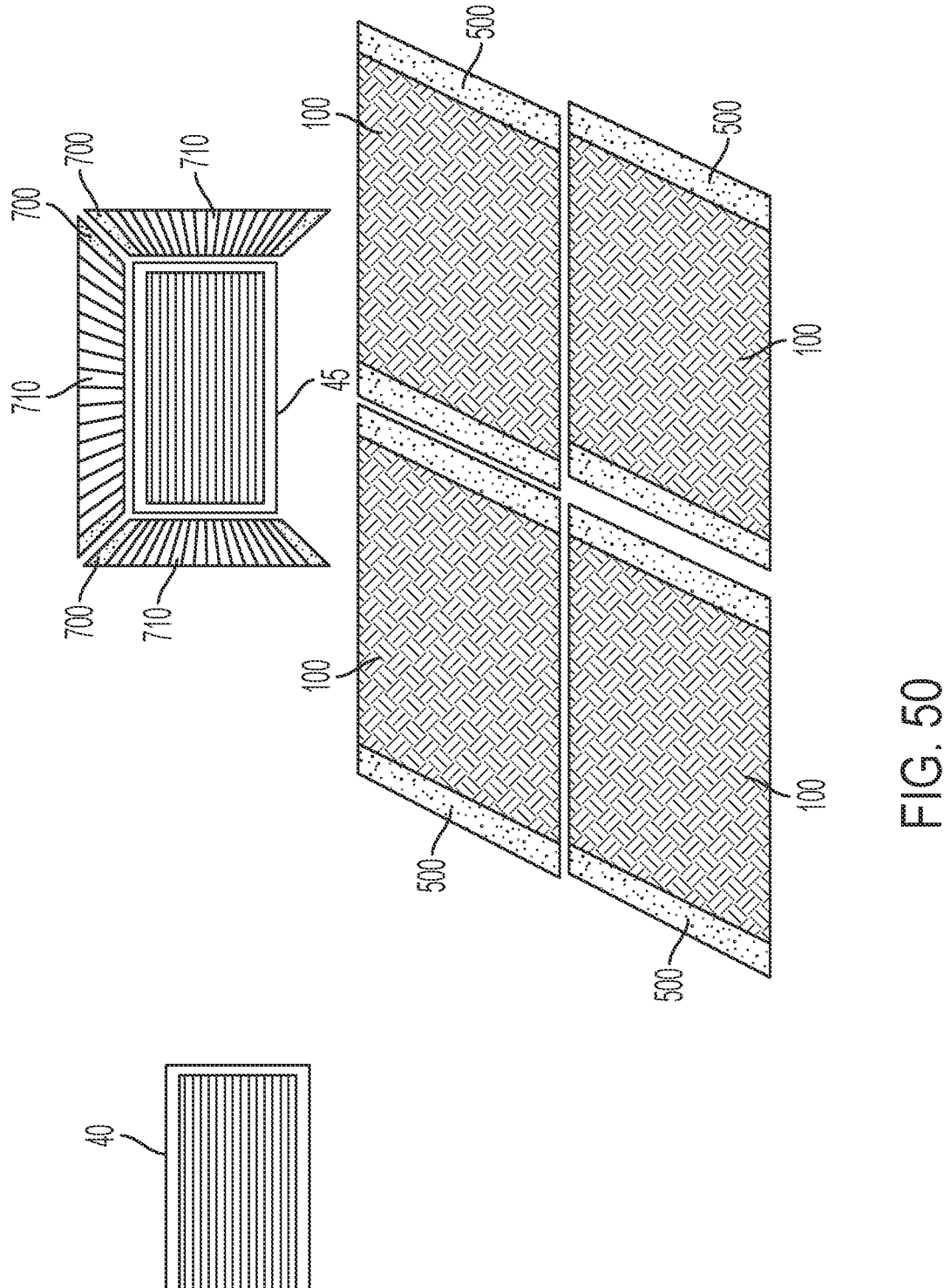
FIG. 50 is a perspective view of a system similar to that of FIG. 49, but featuring an additional strip of reflective material having a refractive-reflective cover attached to the top edge of that panel.

While the improvement when using 4 reflectors around a solar panel is significant, there are instances when adding such reflectors is not practical. For example, there may not be room around the solar panels for the side reflectors. Furthermore, large reflectors will produce shadow as the sun changes direction throughout the day. This led to the idea of having smaller side and (optionally top) reflector pieces so that their shadows do not interfere with the neighboring panels for example. In FIG. 49, side reflectors were added to solar panel 45. The side reflectors were made of slats of wood or other suitable material. The slats were covered with reflective material such as Mylar or foil 700, and then covered with a refractive-reflective material 710 of optimal polarization. The slats were then attached to the sides of solar panel 45 and oriented for reflecting additional sun light thereon. In front of panel 45 and at the ground near the lower edge, four reflective panels such as a mirror 500 covered with a refractive-reflective sheet such as linear lenticular sheet 100 were placed near the lower edge of panel 45. The observed power measurements were 21.3V*2.68 A=57.08 W for the control panel 40, and 20.9*40.06=84.85 W for the amplified panel 45. FIG. 50 is similar to FIG. 49 but adds a third similar slat 700 with reflective material, and covered with refractive-reflective material 710 such as a linear lenticular sheet with optimal polarization. With 3 slats, the output power for the amplified panel was 91.12 W while that of the control panel was approximately 57 W as was the case for the setup in FIG. 49. Accordingly, adding a third slate produced an 8% improvement in amplification over two slats (which was 84.85 W). These three slats provided an extra 12.84 Watts (16% more power) [91.12 Watts] compared to the amplified panel on the test with no slats [78.28 Watts].

Figure 51:
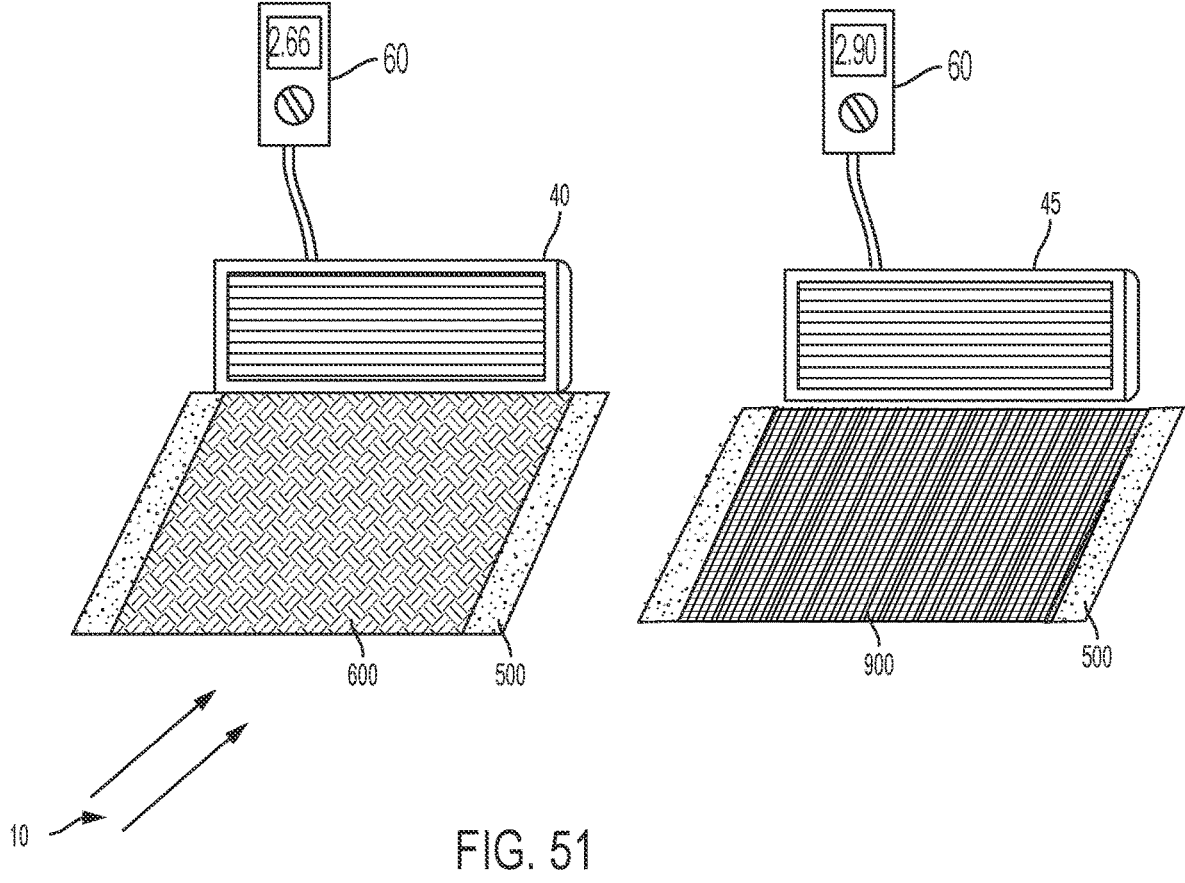
FIG. 51 is a perspective view of a system of two solar panels each having to the front and near the bottom edge thereof a reflective panel with a refractive-reflective cover sheet, and with one panel having additionally a diffraction grating sheet placed on top of the refractive reflective sheet.

FIG. 51 depicts a system for comparing the power amplification of two solar panels using two different structures. Panel 40 has placed to the front thereof and near its lower edge a reflective panel 500, such as a mirror covered with a refractive-reflective sheet 600 such as a lenticular sheet. Panel 45 has placed to the front thereof and near its lower edge a reflective panel 500 with a lenticular sheet (not visible) and a diffraction grating sheet 900 placed on top of the lenticular sheet. The diffraction grating sheet 900 used was an embossed HOE double axis sheet. Panel 45 produced a current of 2.9 A while panel 40 produced 2.66 A. The voltage for both was largely unchanged at around 22V. Accordingly, the power for panel 40 was around 58 W while that for panel 45 was around 63 W. Accordingly, adding the diffraction grating produced an increase of 9% in power output.

What was observed with the diffraction grating was that they spread out the reflection of the sun across a much larger area. For a double-axis sheet the sun is spread in the up and down as well as in the left and right directions. The spreading of sun in the various directions averts the need to track the sun and optimize the angle of reflection between the sheets and the panel as is the case with linear lenticular sheets.

Although only one diffraction grating sheet was tested, it is expected that adding more diffraction grating sheets to the setups of FIG. 51 would improve solar power amplification of the solar panels.

The testing with the double axis diffraction grating combined with the lenticular lens placed over a reflective panel took place near Vancouver, BC on Dec. 6, 2018 when the maximum solar radiation was around 300 W/m². It is expected that higher solar radiation levels in the Spring and Summer will increase the potential percentage power output to higher than the level measured in this solar radiation minimum point of the year.

It is also contemplated to combine a linear lenticular sheet, a diffraction grating and a reflective panel into one material. In one embodiment, a linear lenticular lens would have a coating of diffraction grating on the lens side thereof, and a reflective coating on the smooth side opposite the lens side.

In another embodiment, there are three separate materials: a diffraction grating sheet, a linear lenticular lens, and a reflective panel such as a mirror. The diffraction grating may be placed on top of the linear lenticular lens. Alternatively, in another embodiment, the diffraction grating may be placed below the linear lenticular lens but above the mirror.

In yet another embodiment, two diffraction grating layers may be used; one on top of the linear lenticular lens, and one between the linear lenticular lens and the reflective panel.

Although the various refractive-reflective sheets presented here are shown to be rectangular in shape and generally flat, other configurations are contemplated. For example, the refractive-reflective sheets may form a concave dish, a hemisphere, or a curved rectangle for directing sunlight from different angles towards the solar panel.

Although most embodiments utilized refractive-reflective sheets such as linear lenticular sheets, similar results could be obtained by using diffraction grating sheets in place of the refractive-reflective sheets.

Although the embodiments presented showed stationary solar panels, both the solar panels and the refractive-reflective sheets may each or both be movable on a rotating platform or other equivalent means for tracking sunlight from different directions at different times of day or in different seasons. Alternatively the refractive-reflective sheet may be directed towards the sun at key times for improving sunlight collection. For example, the sheets may be placed and oriented such that they are in the path of sunlight only if the sunlight is in a path which contains objects that would generate a shadow.

Although the embodiments showed thin-film solar panels, monocrystalline solar cells, polycrystalline solar cells the methods presented are also applicable to other types of solar panels such as solar roof tiles or other forms of solar radiation collectors.

Although single panels were shown, the methods presented also apply to multiple solar panels mounted on towers. A refractive-reflective sheet placed between neighboring towers helps diffuse and minimize the shadow of one tower onto a neighboring tower thus amplifying the power output of that neighboring tower.

The above-described embodiments are intended to be examples of the present invention and alterations and modifications may be effected thereto, by those of skill in the art, without departing from the scope of the invention, which is defined solely by the claims appended hereto.

What is claimed is:

1. A system for amplifying a solar panel's output, comprising:

a solar panel having a light receiving surface and a frame having an upper edge and a lower edge;

at least one refractive-reflective cylinder having: an outer lateral surface including a plurality of refracting elements, and an inner surface; and a reflective cylinder having a reflective lateral outer surface disposed inside said at least one refractive-reflective cylinder, wherein said at least one refractive-reflective cylinder is disposed to the front of and near said lower edge for reflecting sunlight onto said light receiving surface of said solar panel thus amplifying said output.

2. The system for amplifying a solar panel's output, according to claim 1, wherein at least one of said inner surface and outer surface is coated with a reflective material for reflecting additional sunlight onto said light receiving surface of said solar panel thus further amplifying said output.

3. The system for amplifying a solar panel's output, according to claim 1 wherein said at least one refractive-reflective cylinder reflects additional sunlight onto said light receiving surface of said solar panel thus further amplifying said output.

4. A system for amplifying a solar panel's output, comprising:

a solar panel having a light receiving surface and a frame having an upper edge and a lower edge;

at least one refractive-reflective cylinder having: an outer lateral surface including a plurality of refracting elements, and an inner surface;

at least one diffraction grating cylinder disposed on said refractive-reflective cylinder for diffusing reflected sunlight onto said light receiving surface of said solar panel; and a reflective cylinder having a reflective lateral outer surface disposed inside said at least one refractive-reflective cylinder, wherein said at least one refractive-reflective cylinder is disposed to the front of and near said lower edge for reflecting sunlight onto said light receiving surface of said solar panel thus amplifying said output, and wherein said diffusing further amplifies said output while also preventing burning of the solar panel.

* * * * *